(12) United States Patent
Jung et al.

(10) Patent No.: US 10,717,433 B2
(45) Date of Patent: Jul. 21, 2020

(54) VEHICLE CONTROL DEVICE MOUNTED ON VEHICLE AND METHOD FOR CONTROLLING THE VEHICLE

(71) Applicant: LG Electronics Inc., Seoul (KR)

(72) Inventors: Soonhong Jung, Seoul (KR); Moonjung Kim, Seoul (KR); Aram Kim, Seoul (KR); Hyongguk Kim, Seoul (KR); Hyeongjin Im, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/172,350

(22) Filed: Oct. 26, 2018

(65) Prior Publication Data
US 2019/0184981 A1    Jun. 20, 2019

(30) Foreign Application Priority Data
Dec. 19, 2017 (KR) .................. 10-2017-0175536

(51) Int. Cl.
*G06F 19/00* (2018.01)
*B60W 30/06* (2006.01)
(Continued)

(52) U.S. Cl.
CPC ............ *B60W 30/06* (2013.01); *B60W 30/09* (2013.01); *B60W 30/095* (2013.01);
(Continued)

(58) Field of Classification Search
CPC ... B60W 30/06; G05D 1/0088; G05D 1/0212; G05D 1/0238; G05D 2201/0213; G06K 9/00805; G06K 9/00812
(Continued)

(56) References Cited

U.S. PATENT DOCUMENTS

| | | | |
|---|---|---|---|
| 2005/0236894 A1* | 10/2005 | Lu ........................ | B60T 8/1755 303/139 |
| 2006/0271278 A1* | 11/2006 | Sakakibara ........ | B62D 15/0275 701/523 |
| 2010/0283632 A1* | 11/2010 | Kawabata ............ | B62D 15/027 340/932.2 |

(Continued)

FOREIGN PATENT DOCUMENTS

| | | |
|---|---|---|
| DE | 102011107974 | 1/2013 |
| DE | 102013015348 | 4/2014 |

(Continued)

OTHER PUBLICATIONS

Extended European Search Report in European Appln. No. 18201400.1, dated Mar. 7, 2019, 8 pages.

*Primary Examiner* — Ronnie M Mancho
(74) *Attorney, Agent, or Firm* — Fish & Richardson P.C.

(57) ABSTRACT

A method for assisted parking of a vehicle performed by a parking control device. The method includes: determining a current position of a vehicle based on at least one of GPS information or environment information of the vehicle; generating traveling map information during manual driving of the vehicle, the traveling map information including a traveling path of the vehicle from the current position of the vehicle, based on at least one user input received through a vehicle manipulation device and at least one sensor value acquired through at least one sensor; and transmitting, based on receiving a rollback request signal, a rollback control signal that causes the vehicle to autonomously drive in a reverse direction along at least part of the traveling path from a rollback starting position of the vehicle.

22 Claims, 35 Drawing Sheets

(51) Int. Cl.
  *G05D 1/00* (2006.01)
  *G05D 1/02* (2020.01)
  *G06K 9/00* (2006.01)
  *B62D 15/02* (2006.01)
  *B60W 30/09* (2012.01)
  *B60W 30/095* (2012.01)
  *B60W 50/00* (2006.01)

(52) U.S. Cl.
  CPC ....... *B62D 15/0285* (2013.01); *G05D 1/0088* (2013.01); *G05D 1/0212* (2013.01); *G05D 1/0221* (2013.01); *G05D 1/0238* (2013.01); *G06K 9/00805* (2013.01); *G06K 9/00812* (2013.01); *B60K 2370/175* (2019.05); *B60W 2050/0089* (2013.01); *B60W 2520/06* (2013.01); *B60W 2540/215* (2020.02); *G05D 2201/0213* (2013.01)

(58) Field of Classification Search
  USPC .......................................................... 701/23
  See application file for complete search history.

(56) References Cited

U.S. PATENT DOCUMENTS

| | | | |
|---|---|---|---|
| 2015/0127222 A1* | 5/2015 | Cunningham, III | B60R 1/00 701/41 |
| 2015/0158527 A1* | 6/2015 | Hafner | B60D 1/245 701/41 |
| 2015/0203156 A1* | 7/2015 | Hafner | B62D 13/06 701/36 |
| 2015/0344028 A1* | 12/2015 | Gieseke | B60W 30/00 701/1 |
| 2017/0277353 A1 | 9/2017 | Mueller et al. | |
| 2017/0282717 A1* | 10/2017 | Jang | B60K 37/06 |
| 2017/0361726 A1* | 12/2017 | Widmer | G01S 19/42 |
| 2018/0061241 A1* | 3/2018 | Iwami | B62D 15/027 |

FOREIGN PATENT DOCUMENTS

| | | |
|---|---|---|
| DE | 102016211180 | 3/2017 |
| JP | 2013530867 | 8/2013 |
| JP | 2013210328 | 10/2013 |
| KR | 1020140036050 | 3/2014 |

\* cited by examiner

FIG. 1
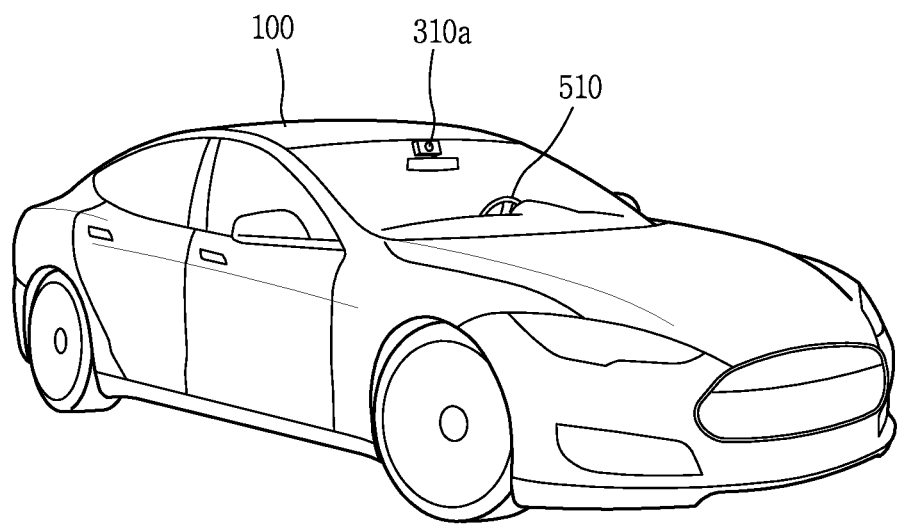
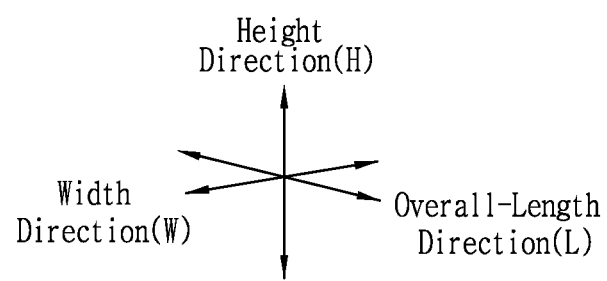

[POPUP WHETHER TO TRAIN PARK-OUT]

FIG. 29
(a)
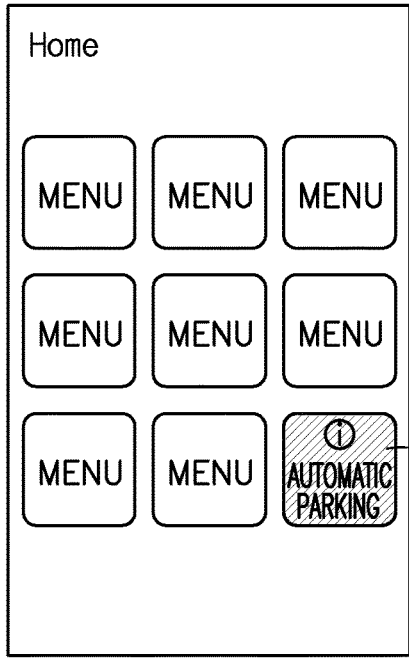
(b)
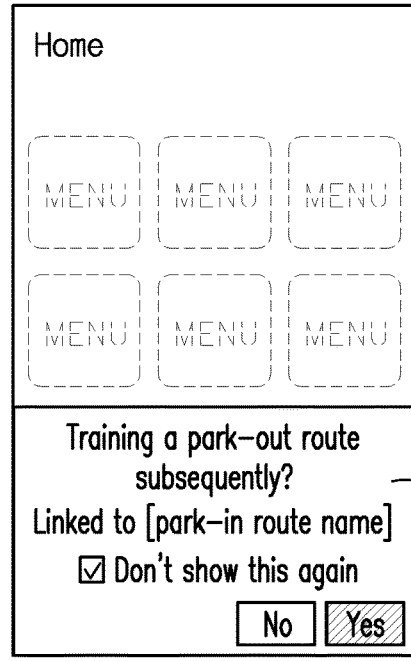
(c)
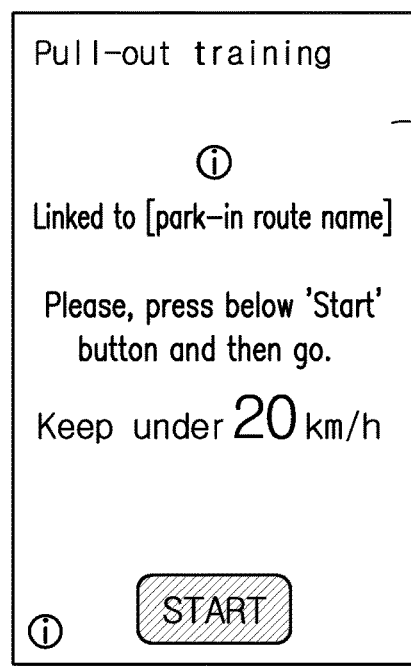
(d)
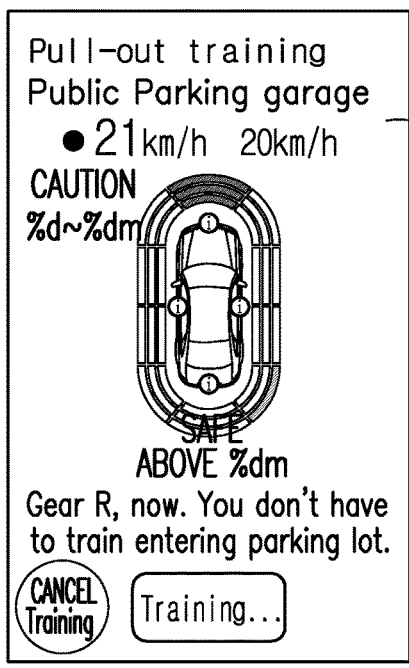

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2017-0175536, filed on Dec. 19, 2017, the contents of which are incorporated by reference herein in its entirety.

TECHNICAL FIELD

The present disclosure generally relates to a vehicle control device mounted on a vehicle and a control method of the vehicle.

BACKGROUND

A vehicle is a device configured to move in a desired direction by a user who is on board. Typically, an automobile will be taken as an example.

For convenience of users of a vehicle, various types of sensors and electronic devices are typically provided in a vehicle. In particular, for convenience of driving, research on an advanced driver assistance system (ADAS) is being actively carried out. Furthermore, development of an autonomous vehicle is being actively carried out.

SUMMARY

Implementations disclosed herein generally enable a vehicle control device that controls a vehicle to perform autonomous driving in an improved manner. For example, in some implementations, the vehicle control device may be configured to control a vehicle to perform autonomous driving based on information that was learned during manual driving of the vehicle.

In some implementations, the vehicle control device may be configured to control a vehicle to perform autonomous driving based on information learned regarding park-in operations, in which the vehicle performs parking.

In some implementations, the vehicle control device may be configured to provide an improved user interface that displays information related to learned park-in operations. The vehicle control device may also be configured to control the vehicle using the learned park-in information.

In one aspect, a method is disclosed for assisted parking for a vehicle performed by a parking control device. The method includes: determining a current position of a vehicle based on at least one of GPS information or environment information of the vehicle; generating traveling map information during manual driving of the vehicle, the traveling map information including a traveling path of the vehicle from the current position of the vehicle, based on at least one user input received through a vehicle manipulation device and at least one sensor value acquired through at least one sensor; and transmitting, based on receiving a rollback request signal, a rollback control signal that causes the vehicle to autonomously drive in a reverse direction along at least part of the traveling path from a rollback starting position of the vehicle.

In some implementations, the rollback starting position corresponds to a location at which the rollback request signal was received.

In some implementations, transmitting the rollback control signal includes: transmitting the rollback control signal that causes the vehicle to autonomously drive to a rollback ending position, wherein the rollback ending position includes a location that is designated by a user input.

In some implementations, the user input designating the rollback ending position includes at least one of (i) a user termination of the rollback request signal, or (ii) a user selection of a location corresponding to the rollback ending position.

In some implementations, generating the traveling map information includes storing the generated traveling map information in at least one memory device, and the parking control device is further configured to, based on receiving the rollback request signal, terminate generating the traveling map information or terminate the storage of the traveling map information in the at least one memory device.

In some implementations, the method further includes: based on the parking control device terminating the generating the traveling map information or terminating the storage of the traveling map information in the at least one memory device, loading data that was stored in the at least one memory device prior to the rollback request signal being received, wherein transmitting the rollback control signal includes transmitting the rollback control signal calculated based on the data loaded from the at least one memory device.

In some implementations, the method further includes generating a second control signal for deviating from the traveling path from the rollback starting position to the rollback ending position based on the vehicle having reversed direction a plurality of times along the traveling path or based on at least one obstacle being detected on the traveling path between the rollback starting position and the rollback ending position.

In some implementations, the method further includes resuming generation of the traveling map information or resuming storage of the traveling map information in the at least one memory device based on a termination of rollback driving that corresponds to automatic driving of the vehicle in a reverse direction along the traveling path.

In some implementations, the method further includes: receiving a user input indicating a termination of generating the traveling map information; and generating, on a display unit and based on the generated traveling map information, display information for displaying at least one of (i) the current position, (ii) a vehicle position at a time when generation of the traveling map information terminates, (iii) an image of an environment of the vehicle, (iv) a graphic object generated using the image of the environment of the vehicle, or (v) the traveling path.

In some implementations, transmitting the rollback control signal further includes generating the rollback control signal based on at least one of (i) speed information of the vehicle, which is detected through the at least one sensor, or (ii) information regarding at least one obstacle detected on the traveling path.

In some implementations, the method further includes: based on the vehicle reaching the rollback ending position or a new user input being received from the rollback ending position, deleting, from the at least one memory device, at least a portion of the traveling map information from the rollback starting position to the rollback ending position.

In some implementations, generating the traveling map information includes: based on a user input value received through the vehicle manipulation device exceeding a predetermined value, generating a traveling path that mitigates the user input value exceeding the predetermined value, wherein the predetermined value depends on whether the vehicle is traveling or parking.

In some implementations, the method further includes: as the vehicle resumes traveling at the rollback ending position, generating extended traveling map information, which includes an extended traveling path that is extended from the traveling path from the current position to the rollback ending position, based on the generated traveling map information and the sensor values.

In another aspect, at least one computer-readable storage medium is encoded with at least one computer program including instructions that, when executed, operate to cause at least one processor of a parking control device provided in a vehicle to perform operations including: receiving, through at least one interface apparatus of the vehicle, traveling control data that indicates information regarding travelling of the vehicle; generating, based on the received traveling control data, traveling map information that includes a traveling path of the vehicle; and transmitting, based on receiving a rollback request signal, a rollback control signal that causes the vehicle to autonomously drive in a reverse direction along at least part of the traveling path from a rollback starting position of the vehicle.

In some implementations, the traveling control data includes (i) sensing data, which includes GPS information and surrounding environment information of the vehicle, and (ii) a user input related to the vehicle, which is input through a vehicle manipulation device.

In some implementations, transmitting the rollback control signal includes: transmitting the rollback control signal that causes the vehicle to autonomously drive to a rollback ending position, wherein the rollback ending position includes a location that is designated by a user input.

In some implementations, the operations further include: storing the generated traveling map information in at least one memory device, and based on receiving the rollback request signal, terminating the generation of the traveling map information or terminating the storage of the traveling map information in the at least one memory device.

In some implementations, the operations further include: based on the parking control device terminating the generation of the traveling map information or terminating the storage of the traveling map information in the at least one memory device, loading data that was stored in the at least one memory device prior to the rollback request signal being received, wherein transmitting the rollback control signal includes transmitting the rollback control signal calculated based on the data loaded from the at least one memory device.

In another aspect, a device is configured to provide assisted parking of a vehicle, and the device includes an autonomous parking engine that is configured to: identify a traveling path for the vehicle based on processing at least one traveling data received during traveling of the vehicle; and generate, based on a user input being received prior to an end of the travelling of the vehicle, a rollback control signal that causes the vehicle to autonomously drive in a reverse direction along at least part of the traveling path, wherein the autonomous parking engine is configured to acquire the at least one traveling data through at least one sensor including a camera and through a vehicle manipulation device including a steering unit and a brake unit, wherein the traveling path extends from a third point where traveling data reception begins, to a first point where the user input is received, and wherein the rollback control signal is configured to cause the vehicle to autonomously drive to reach a second point along the traveling path.

In some implementations, the autonomous parking engine is further configured to store the traveling path in at least one memory device, and terminates the storage of the traveling path in the at least one memory device based on receiving the user input.

In some implementations, the autonomous parking engine is further configured to: based on terminating the storage of the traveling path in the at least one memory device, load data that was stored in the at least one memory device prior to the user input being received; and transmitting the rollback control signal that was generated based on the data loaded from the at least one memory device.

In some implementations, the autonomous parking engine is further configured to resume storage of the traveling path in the at least one memory device based on a termination of rollback driving that corresponds to automatic driving of the vehicle in a reverse direction along the traveling path.

Other details of implementations are included in the detailed description and the drawings.

In some scenarios, implementations of the present disclosure may have one or more of the following effects.

Some implementations may provide a new autonomous driving technique for a vehicle to perform autonomous driving based on driving information that was learned during manual driving of the vehicle.

Some implementations may provide a vehicle control device configured to park a vehicle in or out of parking spaces using information that was previously learned.

Some implementations may provide a new user interface configured to display learned park-in drive information for improved parking of a vehicle and park-out drive information for improved removal of a parked vehicle from parking spaces.

Some implementations may provide a new vehicle control device configured that controls a vehicle in an improved manner based on a user input received through a user interface during learning of park-in and park-out information.

Effects of the present disclosure are not limited to the above-mentioned effects, and other effects not mentioned herein may be clearly understood by those skilled in the art from the description of the claims.

BRIEF DESCRIPTION OF THE DRAWINGS

FIG. 1 is a diagram illustrating an example of an appearance of a vehicle according to an implementation of the present disclosure;

FIGS. 10, 11, 12, 13, 14, 15, 16, 17, 18, 19, 20, 21, 22, 23, 24, 25, 26, 27, 28, 29, 30, 31, 32, 33, 34, 35, and 36 are diagrams illustrating examples of the control method illustrated in FIG. 9.

DETAILED DESCRIPTION

Implementations are disclosed herein that enable autonomous driving of a vehicle based on information that was learned regarding previous driving of the vehicle.

A vehicle according to an implementation of the present disclosure may be any suitable motorized vehicle, including cars, motorcycles, and the like. Hereinafter, examples of a vehicle will be described based on a car.

The vehicle according to the implementation of the present disclosure may be powered by various sources of power, and may be implemented as an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating an appearance of a vehicle according to an implementation of the present disclosure.

Figure 2:
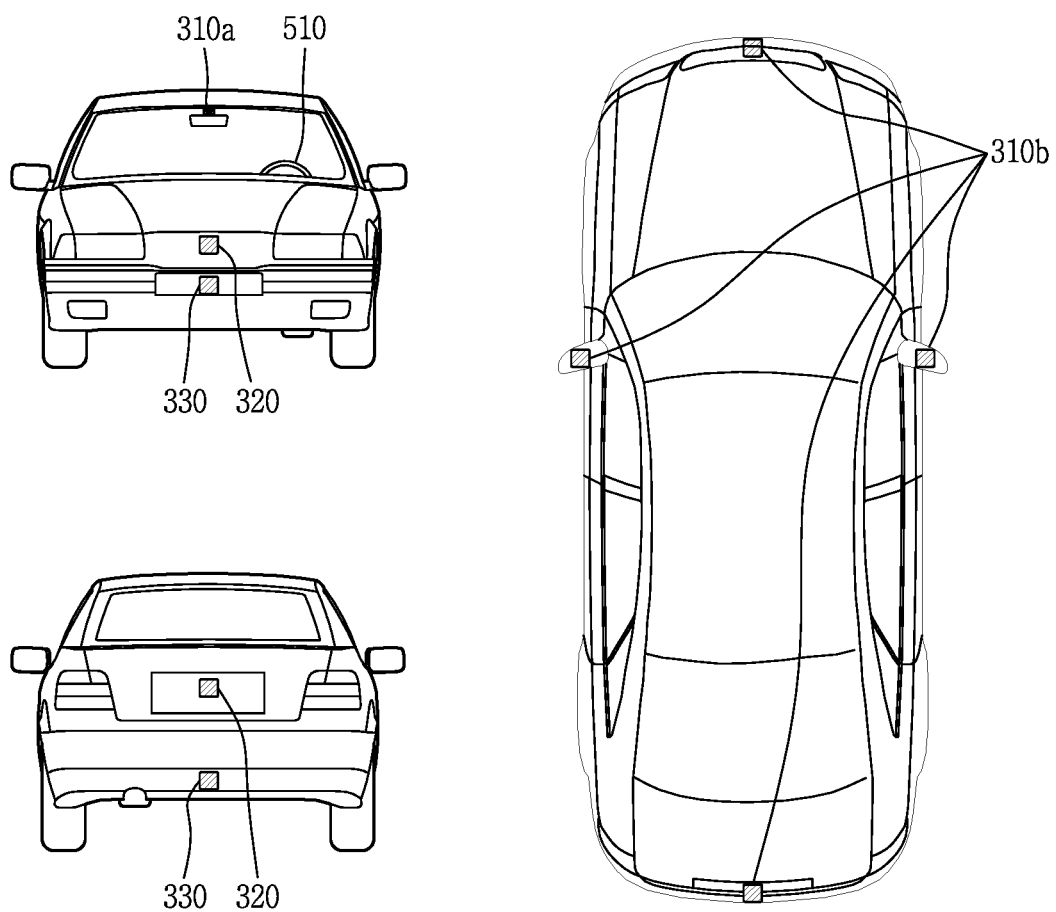
FIG. 2 is a diagram illustrating an example of a vehicle according to an implementation of the present disclosure when viewed at various angles from outside the vehicle.

FIG. 2 is a view in which a vehicle according to an implementation of the present disclosure is viewed at various angles from the outside.

Figure 3:
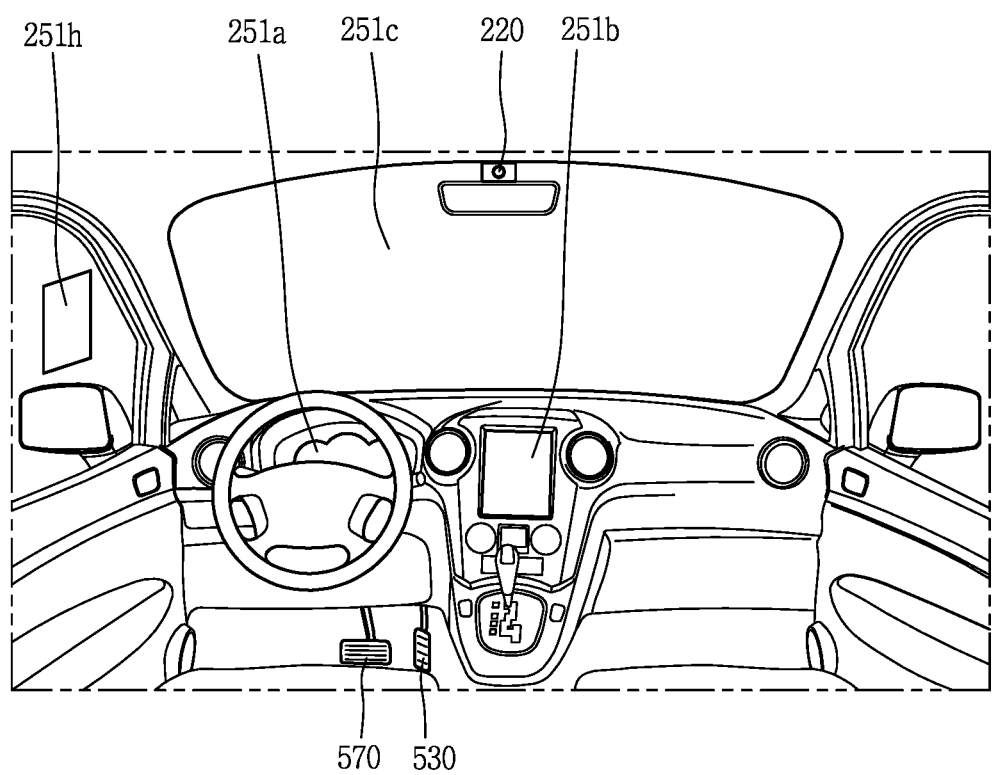
FIGS. 3 and 4 are diagrams illustrating examples of an inside of a vehicle according to an implementation of the present disclosure.
Figure 4:
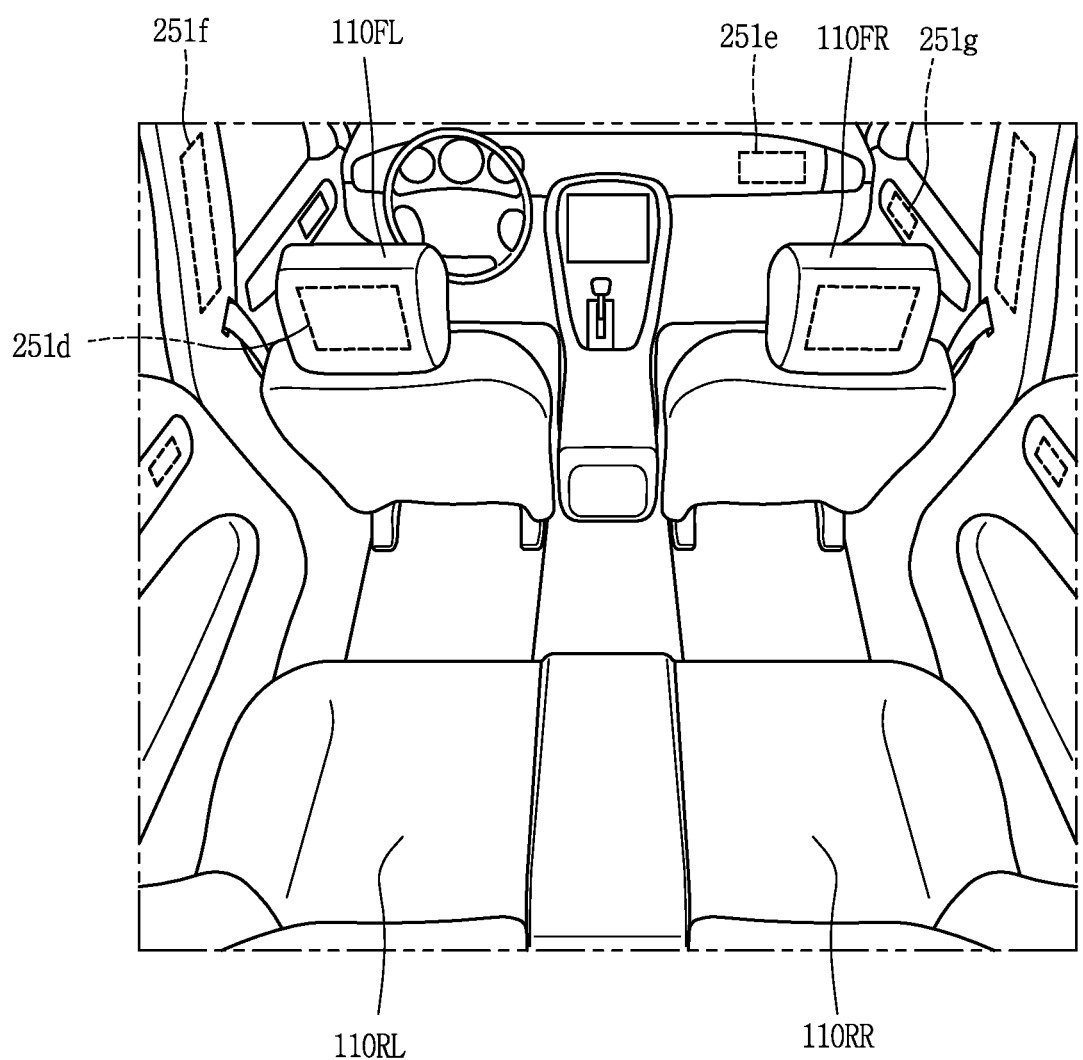

FIGS. 3 and 4 are views illustrating an inside of a vehicle according to an implementation of the present disclosure.

Figure 5:
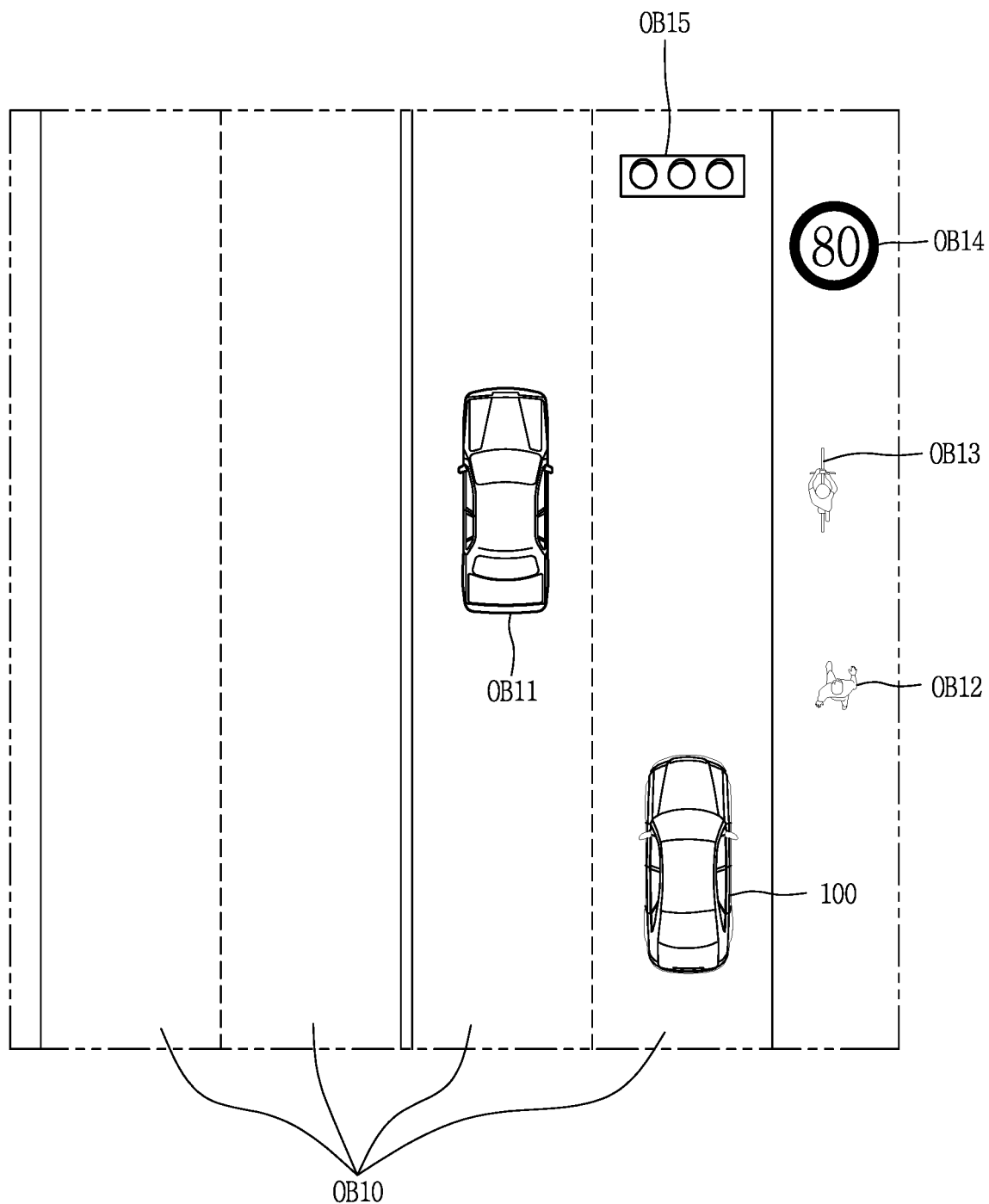
FIGS. 5 and 6 are diagrams illustrating examples of objects that may be detected by a vehicle according to an implementation of the present disclosure.
Figure 6:
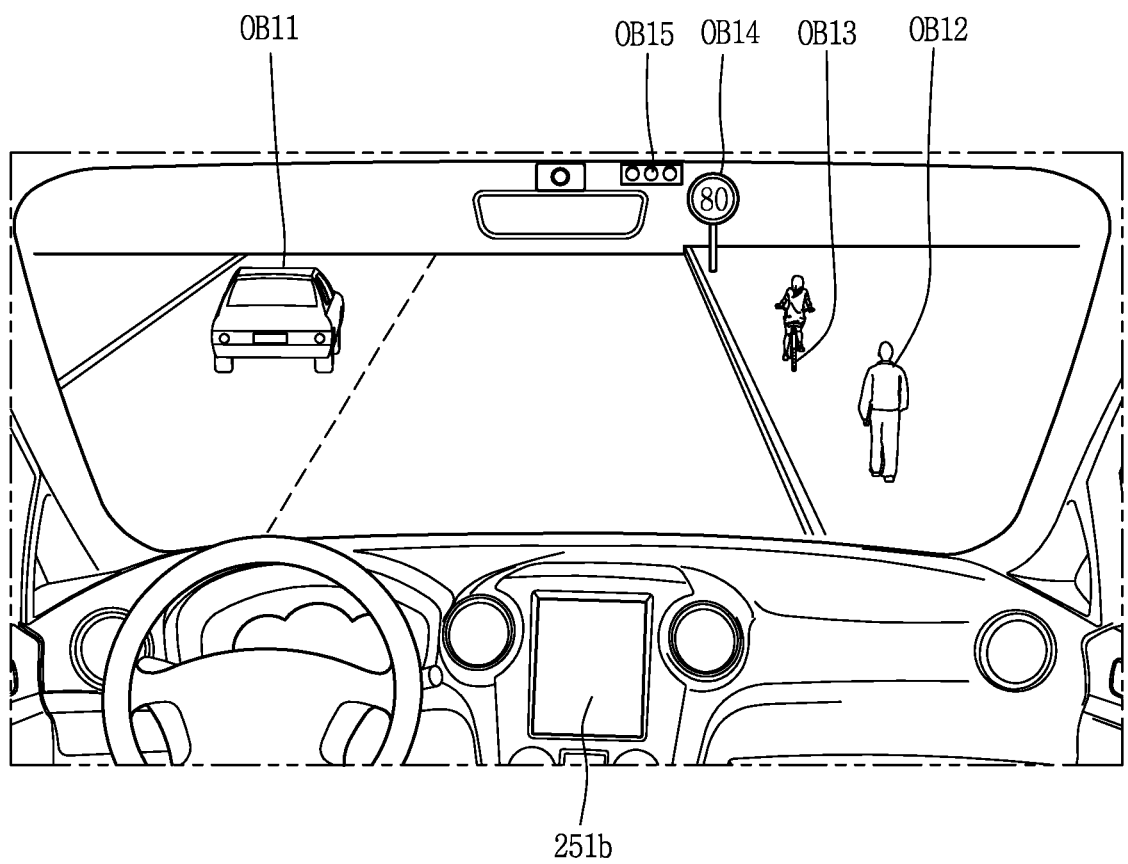

FIGS. 5 and 6 are views referenced to describe objects according to an implementation of the present disclosure.

Figure 7:
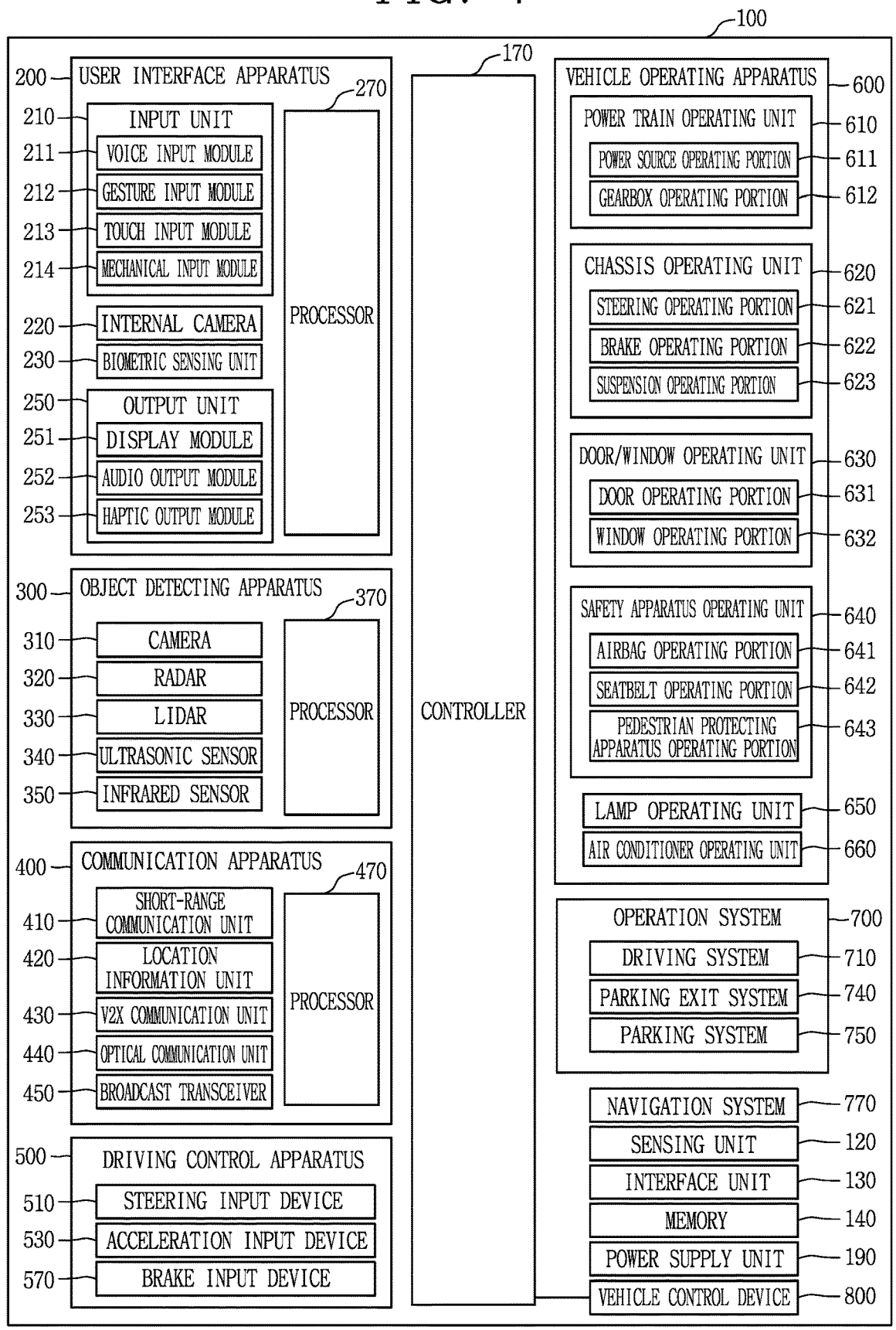
FIG. 7 is a block diagram illustrating an example of a vehicle according to an implementation of the present disclosure.

FIG. 7 is a block diagram referenced to describe a vehicle according to an implementation of the present disclosure.

Referring to FIGS. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a park-out system 740 and a park-in system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to implementations, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed within the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a transparent TFEL (Thin Film Electroluminescent), a transparent OLED (Organic Light-Emitting Diode), a transparent LCD (Liquid Crystal Display), a transmissive transparent display, and a transparent LED (Light Emitting Diode) display. The transparent display may have adjustable transparency.

In some implementations, the user interface apparatus 200 may include a plurality of display modules 251*a* to 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some implementations, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. For example, the lanes OB10 may include left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In some implementations, objects may be classified into a moving object and a fixed object. For example, the moving object may be include, for example, another vehicle, a pedestrian, etc. The fixed object may include, for example, a traffic signal, a road, a structure, etc.

The object detecting apparatus 300 may include a camera 310, a radar 320, a lidar 330, an ultrasonic sensor 340, an infrared sensor 350 and a processor 370.

According to an implementation, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an AVM (Around View Monitoring) camera 310b, or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented by a Frequency Modulated Continuous Wave (FMCW) scheme or a Frequency Shift Keying (FSK) scheme according to a signal waveform in a continuous wave radar scheme.

The radar 320 may detect an object in a time of flight (TOF) manner or a phase-shift manner through the medium of electromagnetic waves, and detect a position of the detected object, a distance from the detected object and a relative speed with the detected object.

The radar 320 may be disposed on an appropriate position outside the vehicle for detecting an object which is located at a front, rear or side of the vehicle. The lidar 330 may include laser transmitting and receiving portions. The lidar 330 may be implemented in a time of flight (TOF) manner or a phase-shift manner.

The lidar 330 may be implemented as a drive type or a non-drive type.

For the drive type, the lidar 330 may be rotated by a motor and detect object near the vehicle 100.

For the non-drive type, the lidar 330 may detect, through light steering, objects which are located within a predetermined range based on the vehicle 100. The vehicle 100 may include a plurality of non-drive type lidars 330.

The lidar 330 may detect an object in a time of flight (TOF) manner or a phase-shift manner through the medium of laser light, and detect a position of the detected object, a distance from the detected object and a relative speed with the detected object.

The lidar 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an implementation, the object detecting apparatus 300 may include a plurality of processors 370 or may not include any processor 370. For example, each of the camera 310, the radar 320, the lidar 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some implementations, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some implementations, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating portion 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may be operated in the autonomous driving mode.

The operation system 700 may include a driving system 710, a park-out system 740 and a park-in system 750.

According to implementations, the operation system 700 may further include other components in addition to components to be described, or may not include some of the components to be described.

In some implementations, the operation system 700 may include a processor. Each unit of the operation system 700 may individually include a processor.

According to implementations, the operation system may be implemented by one or more processors, such as controller 170, when it is implemented in a software configuration.

In some implementations, the operation system 700 may include at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

According to some implementations, the transmission of the control signal to the vehicle operating apparatus 600 may include transmission of the control signal to a power train operating unit 610, a chassis operating unit 620, a door/window operating unit 630, a safety apparatus operating unit 640, a lamp operating unit 650, and an air-conditioner operating unit 660. Meanwhile, according to another embodiment of the present invention, transmission of the control signal to the vehicle operating apparatus 600 may include transmission of the control signal to a processor included in the vehicle operating apparatus 600.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The park-out system 740 may perform the parking-out of the vehicle 100 from a parking lot.

The park-out system 740 may receive navigation information from the navigation system 770, transmit a control signal to the vehicle operating apparatus 600, and perform the parking-out of the vehicle 100 from the parking lot.

The park-out system 740 may receive object information from the object detecting apparatus 300, transmit a control signal to the vehicle operating apparatus 600 and perform the parking-out of the vehicle 100 from the parking lot.

The park-out system 740 may receive a signal from an external device through the communication apparatus 400, transmit a control signal to the vehicle operating apparatus 600, and perform the parking-out of the vehicle 100 from the parking lot.

The park-in system 750 may perform the parking-in of the vehicle 100.

The park-in system 750 may receive navigation information from the navigation system 770, transmit a control signal to the vehicle operating apparatus 600, and park the vehicle 100.

The park-in system 750 may receive object information from the object detecting apparatus 300, transmit a control signal to the vehicle operating apparatus 600 and park the vehicle 100.

The park-in system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to implementations, the navigation system 770 may update prestored information by receiving information from an external device through the communication apparatus 400.

According to implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be various storage apparatuses such as a ROM, a RAM, an EPROM, a flash drive, a hard drive, and the like in terms of hardware. The memory 140 may store various data for overall operations of the vehicle 100, such as programs for processing or controlling the controller 170.

According to implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some implementations, the vehicle 100 according to the present disclosure may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

In some implementations, the vehicle control device 800 described in the present specification may include various types of devices configured to control the vehicle, and may be, for an example, a mobile terminal. When the vehicle control device 800 is a mobile terminal, the mobile terminal and the vehicle 100 may be connected to each other to be communicable through wired/wireless communication. In addition, the mobile terminal may control the vehicle 100 in various ways in a communicatively connected state.

When the vehicle control device 800 is a mobile terminal, the processor 870 described herein may be a controller of the mobile terminal.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. In other words, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of components included in the vehicle control device 800 in accordance with one implementation of the present disclosure, with reference to the accompanying drawings.

Figure 8:
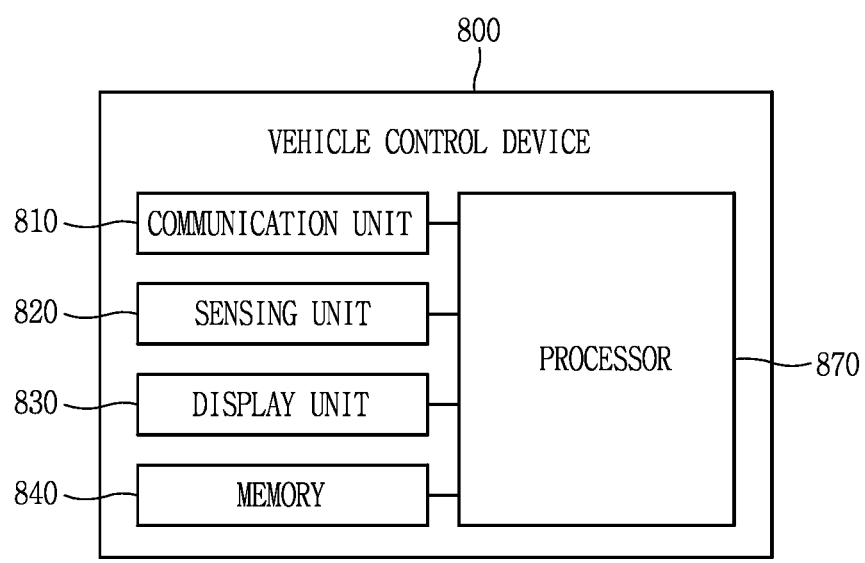
FIG. 8 is a diagram illustrating an example of a vehicle control device according to an implementation of the present disclosure.

FIG. 8 is a diagram illustrating an example of a vehicle control device according to an implementation of the present disclosure.

The vehicle control device 800 related to the present disclosure may include a communication unit 810, a sensing unit 820, a display unit 830, a memory 840, a processor 870, and the like.

First, the vehicle control device 800 related to the present disclosure may include the communication unit 810.

The communication unit 810 may be the foregoing communication apparatus 400. The communication unit 810 may be connected to communicate with a mobile terminal existing within the vehicle 100.

For an example, the vehicle control device 800 (or the vehicle 100) and the mobile terminal may be connected to enable wireless communication through the communication unit 810. When the vehicle control device 800 and the mobile terminal are connected in a wireless manner to enable mutual wireless communication at the user's request or have previously been connected to enable wireless communication, they may be connected in a wireless manner to enable mutual wireless communication based on the mobile terminal entering an inside of the vehicle.

The communication unit 810 may be provided in the vehicle (or in the vehicle control device), or may be formed in a separate module form to enable communication (or electrical coupling) with the components of the vehicle.

The vehicle control device 800 may control the mobile terminal 900 through the communication unit 810.

Specifically, the vehicle control device 800 may transmit a control signal for controlling the mobile terminal 900 to the mobile terminal 900 through the communication unit 810. When the control signal is received, the mobile terminal 900 may perform a function/operation/control corresponding to the control signal.

Conversely, the present disclosure may allow the mobile terminal 900 to control the vehicle control device 800 (or vehicle 100). Specifically, the mobile terminal 900 can transmit a control signal for controlling the vehicle to the vehicle control device 800. In response to this, the vehicle control device 800 may perform a function/operation/control corresponding to the control signal transmitted from the mobile terminal 900.

The communication unit 810 may perform communication with an external device (for example, a server, a cloud server (or cloud), the Internet, and the like) existing outside the vehicle. Furthermore, the communication unit 810 may perform communication with another vehicle.

The vehicle control device 800 related to the present disclosure may include the sensing unit 820. The sensing unit 820 may be the object detecting apparatus 300 described with reference to FIG. 7 or the sensing unit 120 provided in the vehicle 100.

The sensing unit 820 may be implemented by combining at least two of the camera 310, the radar 320, a lidar 330, the ultrasonic sensor 340, the infrared sensor 350, and the sensing unit 120 included in the object detecting apparatus 300.

The sensing unit 820 may sense information related to the vehicle 100 of the present disclosure.

The information related to the vehicle may be at least one of vehicle information (or driving state of the vehicle) and surrounding information of the vehicle.

For example, the vehicle information may include a driving speed of the vehicle, a weight of the vehicle, a number of passengers in the vehicle, a braking force of the vehicle, a maximum braking force of the vehicle, a driving mode of the vehicle (autonomous driving mode or manual driving mode), a parking mode of the vehicle (autonomous parking mode, automatic parking mode, manual parking mode), whether or not a user gets on the vehicle, and information associated with the user (for example, whether or not the user is an authenticated user), and the like.

The surrounding information of the vehicle may be a state of road surface (frictional force) on which the vehicle is traveling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

Furthermore, the surrounding information (or surrounding environment information) of the vehicle may include external information of the vehicle (for example, ambient brightness, a temperature, a position of the sun, nearby subject (a person, another vehicle, a sign, etc.) information, a type of driving road surface, a landmark, line information, driving lane information), and information required for an autonomous driving/autonomous parking/automatic parking/manual parking mode.

Furthermore, the surrounding information of the vehicle may further include a distance from an object existing around the vehicle to the vehicle 100, a type of the object, a parking space for the vehicle, an object for identifying the parking space (for example, a parking line, a string, another vehicle, a wall, etc.), and the like.

Further, the information related to the vehicle may include whether or not the mobile terminal is placed on a cradle provided in the vehicle, whether or not the mobile terminal has entered (exists) in the vehicle or whether the mobile terminal has entered (exists) within a predetermined distance from the vehicle, whether or not the mobile terminal and the vehicle control device are communicatively connected, and the like.

Information related to the vehicle sensed through the sensing unit 820 may be used in an autonomous driving mode for autonomous driving of the vehicle. Specifically, the processor 870 may allow the vehicle to perform autonomous driving using information related to the vehicle sensed through the sensing unit 820.

Furthermore, the vehicle control device 800 associated with the present disclosure may include the display unit 830.

The display unit 830 included in the vehicle control device 800 associated with the present disclosure may be the display module 251 described above as a display apparatus provided in the vehicle 100.

The display unit 830 may be the output unit 250 or the display module 251 illustrated in FIG. 7. Furthermore, the display unit 830 may include an output unit (e.g., a touch screen) of a mobile terminal that is communicable with the communication apparatus 400.

The display unit 830 may include a transparent display. The transparent display may be attached to the windshield or the window.

The display module 830 may be disposed on one area of a steering wheel, one area 251a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

For example, the display unit 830 may include a cluster, a center information display (CID), a navigation device, and a head-up display (HUD), and the like.

The display module 830 may be inter-layered or integrated with a touch sensor to implement a touch screen. The touch screen functions as an input unit 210 that provides an input interface between the vehicle 100 (or vehicle control device 800) and the user, and also provides an output interface between the vehicle 100 (or vehicle control device 800) and the user.

The processor 870 may display various information related to the vehicle on the display unit 830. In addition, the processor 870 may display information related to the vehicle on a different position of the display unit 830 according to a type of the information related to the vehicle.

Various information displayed on the display unit 830 will be described later in detail with reference to the accompanying drawings.

The display unit 830 may be a navigation system 770 (or a navigation device). Furthermore, the display unit 830 may include the navigation system 770.

In other words, the display unit 830 may denote a navigation device provided in the vehicle 100, and the navigation device may be integrated into the vehicle 100 from the shipment of the vehicle 100 or may be a navigation device mounted by the user. The display unit 830 may denote a navigation system for a vehicle, and may denote a navigation system independent of the navigation system provided in the mobile terminal 900.

The description of the display unit 830 in this specification may be applied to the navigation system 770, the navigation apparatus or the vehicle navigation system in the same or similar analogy.

Furthermore, the vehicle control device 800 associated with the present disclosure may include the memory 840.

The memory 840 may be the memory 140 illustrated in FIG. 7.

Various information may be stored (recorded) in the memory 840. For an example, information related to the vehicle sensed through the sensing unit 820 may be stored in the memory 840.

The memory may be formed to store, change or delete information under the control of the processor 870.

On the other hand, when the vehicle has driven in a manual driving mode under the control of the processor 870, information related to driving that was learned during manual driving may be stored in the memory 840.

The information related to driving may include driving information in which the vehicle has driven in a manual driving mode.

Training described herein may include the meaning of storage, recording or generation. For an example, training information related to driving through manual driving may include the meaning of storing driving information in which the vehicle has driven in a manual driving mode in the memory or storing (generating, recording) information related to driving that the vehicle has driven in a manual driving mode in the memory.

The contents related to driving (or driving information) will be described in more detail with reference to the accompanying drawings.

The information related to driving trained through manual driving (or driving information that has been driven in a manual driving mode) may be used in the autonomous driving mode of the vehicle.

Furthermore, the vehicle control device 800 of the present disclosure may include a processor 870 configured to control the communication unit 810, the sensing unit 820, the display unit 830, the memory 840, and the like.

The processor 870 may be the controller 170 described with reference to FIG. 7. The processor 870 may control the constituent elements described in FIG. 7 and the constituent elements described in FIG. 8.

In addition, the processor 870 may store, in at least one memory device, driving information (e.g., information related to driving that the vehicle 100 has learned through manual driving) based on the vehicle 100 driving in a manual driving mode. Then, the processor 870 may drive the vehicle 100 in an autonomous driving mode based on the stored driving information (or information related to driving).

More specifically, according to the present disclosure, the process of storing driving information in which the vehicle has been driven in a passive driving mode is carried out.

The processor 870 of the present disclosure may store information related to driving trained through manual driving in the memory 840. As described above, training the information related to driving may include the meaning of storing driving information that has been driven in a manual driving mode.

In other words, the information related to driving may include driving information (or driving route information).

The processor 870 may store driving information in which the vehicle has driven in a manual driving mode in the memory 840.

Specifically, the processor 870 may store driving information in which the vehicle 100 drives in a manual driving mode from a first point to a second point different from the first point in the memory 840.

Furthermore, the processor 870 may drive the vehicle in an autonomous driving mode based on the stored driving information, based on the vehicle 100 that arrives at the first point.

In other words, when driving information that has been driven in a manual driving mode from the first point to the second point is stored in the memory 840, and subsequently the vehicle 100 is located again at the first point, the processor 870 may allow the vehicle to perform autonomous driving based on the stored driving information.

Then, in the present disclosure, the process of driving the vehicle in an autonomous driving mode is carried out based on driving information (i.e., driving information that has been driven in a manual driving mode or driving information trained through manual driving) stored in the memory.

The vehicle control device 800 associated with the present disclosure may allow the vehicle to perform autonomous driving using driving information that has been driven in a manual driving mode.

Here, the driving information that has been driven in a manual driving mode may denote information that has been manually driven from the first point to the second point by the vehicle or another vehicle through the manual driving mode.

Here, the first point denotes a starting point (S/P) at which the vehicle starts manual driving in a manual driving mode and the second point denotes an ending point (E/P) at which the vehicle ends manual driving in the manual driving mode.

In other words, driving information that has been driven in the manual driving mode may include a starting point at which the vehicle starts driving in a manual driving mode, an ending point at which the manual driving mode ends, and a driving route from the starting point to the ending point.

When the vehicle 100 is moved to the starting point in a manual driving mode, the processor 870 may allow the vehicle 100 to perform autonomous driving along the driving route from along the traveling path from the starting point to the ending point.

In other words, in the present specification, allowing the vehicle to perform autonomous driving using driving information that has been driven in a manual driving mode may denote allowing the vehicle to drive along a driving route included in the driving information from the starting point to the ending point included in the driving information.

The vehicle control device 800 associated with the present disclosure may train driving information that has been driven in a manual driving mode. Here, training may denote generating information (i.e., information related to driving) driving through manual driving and storing the information in the memory.

The driving information that has been driven in the manual driving mode may be generated by another vehicle, and received from another vehicle or an external device (for example, a server, the Internet, a cloud server, a mobile terminal, etc.) via the communication unit 810.

The process of training (storing) driving information that has been driven in a manual driving mode will be described in more detail.

The processor 870 of the present disclosure may store information related to driving trained through manual driving in the memory 840. As described above, training the information related to driving may include the meaning of storing driving information that has been driven in a manual driving mode.

In other words, the information related to driving may include driving information (or driving route information).

The processor 870 may store driving information in which the vehicle has driven in a manual driving mode in the memory 840.

Specifically, the processor 870 may store driving information in which the vehicle 100 drives in a manual driving mode from a first point (starting point) to a second point (ending point) different from the first point in the memory.

Furthermore, the processor 870 may drive the vehicle in an autonomous driving mode based on the stored driving information, based on the vehicle 100 that arrives at the first point.

In other words, when driving information that has been driven in a manual driving mode from the first point to the second point is stored in the memory, and subsequently the vehicle 100 is located again at the first point, the processor 870 may allow the vehicle to perform autonomous driving based on the stored driving information.

At this time, the processor 870 may allow the vehicle to perform autonomous driving in a driving mode in which the vehicle has driven in a manual driving mode, based on the stored driving information.

In other words, allowing the vehicle to perform autonomous driving based on driving information stored in the memory (or driving information received through the communication unit) in the present specification may denote allowing the vehicle to perform autonomous driving in a driving mode that has been driven in a manual driving mode (or in a driving route, in a driving pattern, or in a driving mode as it is) other than allowing the vehicle to perform autonomous driving while generating a route to enable autonomous driving in real time using the sensor.

In other words, allowing the vehicle to perform autonomous driving based on driving information stored in the memory according to the present specification may denote allowing the vehicle to perform autonomous driving in a driving mode (or in a driving mode) in which driving information that has been driven in a manual driving mode has been driven in the manual driving mode as it is.

In other words, the processor 870 may allow the vehicle to perform autonomous driving in a driving mode that has been driven in a manual driving mode using driving information that has been driven in the manual driving mode as it is.

On the other hand, the processor 870 may allow the vehicle to perform autonomous driving along a driving route driven in a manual driving mode using driving information that has been driven in the manual driving mode.

If the vehicle is driven in an autonomous driving mode based on driving information in which the vehicle has driven in a manual driving mode, when driving a specific section (for example, a section between the first point and the second point), the vehicle of the present disclosure may perform autonomous driving on the specific section with the same trajectory (or course, route), or repeatedly perform autonomous driving on the specific section in the same (same) driving manner (or driving pattern) every time.

The driving information (driving route information) that has been driven in a manual driving mode may include at least one of driving trajectory information in which the vehicle has driven and driving pattern information of the vehicle.

The driving trajectory information may include location information of a plurality of points at which the vehicle has been located. Specifically, the driving trajectory information may denote a manual driving route of the vehicle 100 connecting a plurality of points that the vehicle 100 has driven in a manual driving mode.

The processor 870 may generate the driving trajectory information of the vehicle that has driven in a manual driving mode using the location information of the vehicle received through the location information unit.

In addition, the processor 870 may generate the driving trajectory information of the vehicle using a number of rotations of the wheels of the vehicle being driven in a manual driving mode, an angle of the wheels, and the like without using the location information unit. At this time, the first point (starting point) and the second point (ending point) may be determined by the location information unit.

In addition, the driving pattern information may include at least one of steering angle information (rotation angle of the steering wheel) for each of the plurality of points and a speed (vehicle speed) for each of the plurality of points.

In addition, the driving pattern information may include whether or not the gas pedal is pressed, a degree of pressure of the gas pedal, whether or not the brake is pressed, a degree of pressure of the brake, and the like, for each of the plurality of points.

In other words, the driving pattern information may be associated with whether or not the brake is pressed, whether or not the gas pedal is pressed, a degree of pressure of the brake, a degree of pressure of the gas pedal, and the like, for each point of the driving trajectory.

Since information related to driving described above includes driving information (or driving route information), at least one of the driving trajectory information (location information of a plurality of points) and the driving pattern information (steering angle information or speed information for each of the plurality of points) is included in the information related to driving.

In addition, sensor data sensed through the sensing unit 820 when driving in a manual driving mode may be included in the information related to driving (or driving information that has been driven in a manual driving mode).

The sensor data may include information related to a vehicle sensed for each point where the vehicle drives in a manual driving mode.

The sensor data may include the foregoing information related to the vehicle. In addition, the processor 870 may be associated with sensor data for each point (or for each time) of the vehicle driving in a manual driving mode.

The processor 870 may store (generate) driving information in which the vehicle 100 has driven in a manual driving mode in the memory, based on the state of the vehicle 100 satisfying a preset condition. The preset condition may denote a condition associated with a function of starting to store driving information that has driven in a manual driving mode in the memory.

The preset condition may include various conditions, for an example, may include the following conditions.

For example, when there is a user request, the processor 870 may start storing (generating) driving information that has driven in a manual driving mode. In other words, the processor 870 may store (or start storing) driving information (information related to driving) that has driven in a manual driving mode in the memory, based on the user request.

For another example, when the vehicle arrives at a point where the vehicle is unable to perform autonomous driving using the sensing unit 820 (or when the vehicle enters a road where the vehicle is unable to perform autonomous driving using the sensing unit 820), the processor 870 may store (or start storing) driving information that has been driven in a manual driving mode in the memory.

For still another example, when the location information of the vehicle through the communication device 400 is not received (i.e., GPS information is not received), the processor 870 may store (or start storing) driving information that has been driven in a manual driving mode in the memory.

For yet still another example, when the surrounding environment of the vehicle 100 is in a state where the autonomous driving of the vehicle using the sensing unit 820 is disabled, the processor 870 may store (start storing) driving information that is been driven in a manual driving mode in the memory.

For still yet another example, when sensor data included in information related to driving (or driving information that has been driven in a manual driving mode) and sensor data sensed through the sensing unit 820 while driving the vehicle in an autonomous driving mode along driving information that has been driven in a manual driving mode stored in the memory are different from each other, the processor 870 may store (or start storing) new driving information in which the vehicle drives in a manual driving mode in the memory.

There are various cases where the sensor data are different from each other, such as cases where a new object is sensed, an existing object disappears, a road disappears, a road is deformed, or a road on which the vehicle has driven in a manual driving mode is blocked by an obstacle, and the like.

The sensor data may include the surrounding environment information of the vehicle when the vehicle drives in a manual driving mode. The processor 870 may store the surrounding environment information that has been driven in a manual driving mode in the memory to be included in driving information using the sensor data.

Furthermore the processor 870 may generate map data of the vehicle that has driven in a manual driving mode using the sensor data. For example, the map data may be generated based on information on surrounding objects (e.g., trees, signs, buildings or road conditions (e.g., whether or not it is an unpaved road, whether or not snow is piled up, whether or not fallen leaves are piled up, and the like)).

The processor 870 may generate map data using the sensor data, and generate driving information by linking driving trajectory information or driving pattern information in which the vehicle has driven in a manual driving mode to the relevant map data.

In addition, the processor 870 may store driving trajectory information in which the vehicle has driven in a manual driving mode or driving information generated to link driving pattern information to map data in the memory.

In addition, the processor 870 may store driving information that has been driven in a manual driving mode in the memory according to various situations.

In other words, when the state of the vehicle 100 satisfies the preset condition, the processor 870 may start training about driving information that has been driven in a manual driving mode (i.e., start training about information related to driving through manual driving).

The processor 870 may determine a point (location) of the vehicle 100 located at a time point when the state of the vehicle 100 satisfies the preset condition as the first point. In other words, the first point may denote a starting point (starting place) of the driving information that has been driven in a manual driving mode.

There may be a plurality of driving information (information related to driving) stored in the memory, and the first point may vary according to a point of the vehicle 100 located at a time point that satisfies the preset condition.

On the other hand, the processor 870 may determine a point where the vehicle 100 is located at a time point when the state of the vehicle satisfies a specific condition as the second point. In other words, the second point may denote an end point of driving information that has been driven in a manual driving mode.

The specific condition is, for example, a condition in which the vehicle is turned off, the vehicle is stopped for a predetermined time, a vehicle door is open after the vehicle is turned off, a new user input (for example, a user input for terminating training of driving information, etc.) is received, or the like.

The second point may vary depending on the point of the vehicle 100 located at a time point when the specific condition is satisfied.

Hereinafter, for the sake of convenience of explanation, a case where information used for the vehicle to perform an autonomous driving mode is driving information (driving route information) that has been driven in a manual driving mode will be described. In other words, in the following description, allowing the vehicle to drive in an autonomous driving mode based on driving information that has been driven in a manual driving mode may be understood as allowing the vehicle to drive in a manual driving mode based on information related to driving trained through manual driving.

The processor 870 may allow the vehicle to perform autonomous driving based on driving information that has been driven in a manual driving mode. At this time, allowing the vehicle to drive in an autonomous driving mode based on driving information that has been driven in a manual driving mode may be named as training autonomous driving, a training autonomous driving mode, training-based autonomous driving, a training-based autonomous driving mode, or the like.

At this time, the processor 870 may allow the vehicle to perform autonomous driving using sensor data included in driving information (or information related to driving) stored in the memory.

For example, the processor 870 may allow the vehicle to perform autonomous driving in a driving mode that has been driven in a manual driving mode according to driving information stored in the memory. At this time, when the sensor data included in the driving information stored in the memory is different from the sensor data sensed through the sensing unit 820 while performing autonomous driving, the processor 870 may stop autonomous driving (training autonomous driving). In this case, the vehicle may be stopped.

In addition, when it is sensed that the sensor data included in the driving information stored in the memory is different from the sensor data sensed through the sensing unit 820 while allowing the vehicle to perform autonomous driving according to driving information stored in the memory, the processor 870 may output notification information to notify the driver to switch to a manual driving mode.

On the contrary, allowing the vehicle to perform autonomous driving based on information related to sensed vehicle sensed through the sensing unit 820 may be named as sensor autonomous driving, a sensor autonomous driving mode, sensor-based autonomous driving, a sensor-based autonomous driving mode, or the like.

Then, the processor 870 may drive the vehicle in an autonomous driving mode based on the stored driving route. Specifically, when driving information that has been driven in a manual driving mode is stored in the memory (or when driving information that has been driven in a manual driving mode is received through the communication unit 810), the processor 870 may allow the vehicle to allow autonomous driving based on the driving information. Here, allowing the vehicle to drive in an autonomous driving mode based on the stored driving information may be understood as training-based autonomous driving.

The vehicle control device 800 related to the present disclosure may allow the vehicle to perform autonomous driving in various ways when allowing the vehicle to perform autonomous driving in a training-based autonomous mode.

Specifically, the processor 870 may allow the vehicle 100 to perform autonomous driving in accordance with either one of a first mode of allowing the vehicle to perform autonomous driving using only driving trajectory information included in driving information stored in the memory, and a second mode of allowing the vehicle 100 to perform autonomous driving according to driving trajectory information and driving pattern information included in the driving information.

For example, the processor 870 may allow the vehicle to perform autonomous driving using only driving trajectory information in driving information that has been driven in a manual driving mode (first mode).

In this case, when storing (training) driving information, the vehicle 100 may perform autonomous driving according to the driving trajectory information to have steering angle information and speed information different from steering angle information for each of the plurality of points and speed information for each of the plurality of points.

In other words, the processor 870 may allow the vehicle to perform autonomous driving so that the vehicle follows a trajectory through which the vehicle has passed when storing (training) the driving information, but the steering angle and speed are different from those when storing (training) the driving information.

At this time, the processor 870 may determine the steering angle and speed using information related to the vehicle sensed through the driving trajectory information and the sensing unit, and allow the vehicle to perform autonomous driving according to the determined steering angle and speed.

For another example, the processor 870 may allow the vehicle to perform autonomous driving according to driving trajectory information and driving pattern information included in driving information (second mode).

In this case, the processor 870 may allow the vehicle to perform autonomous driving to have the same trajectory, steering angle, and speed as route information that has been driven in a manual driving mode. In other words, the processor 870 may allow the vehicle 100 to perform autonomous driving so that the trajectory and driving pattern of the vehicle is the same as those when training driving information.

On the other hand, the processor 870 may use information related to the vehicle sensed through the sensing unit 820 even when the vehicle performs autonomous driving in a second mode. It is because, when it is changed to an environment different from that when storing (training) driving information, it may occur a case where there exists an obstacle or a road has been changed. In this case, when the vehicle performs autonomous driving according to the second mode, there is a high possibility of leading to an accident.

Accordingly, even when the vehicle performs autonomous driving according to the driving trajectory information and the driving pattern information included in the driving information, in case where an obstacle is detected or a road is changed (or in case where it is changed to a road where the vehicle is unable to pass) through the sensing unit 820, the processor 870 may stop autonomous driving.

At this time, the processor 870 may output to the driver notification information indicating that the vehicle cannot be driven in an autonomous driving mode or notification information for guiding the driver to switch to a manual driving mode.

Whether or not to perform autonomous driving in the first mode or perform autonomous driving in the second mode when performing the training-based autonomous driving may be determined according to various conditions.

For example, based on the current location of the vehicle 100, the processor 870 may allow the vehicle to perform autonomous driving in the first mode when the autonomous mode is possible in the first mode, and allow the vehicle to perform autonomous driving in the second mode when the autonomous mode is possible in the second mode For another example, when the vehicle 100 is located at a position where autonomous driving is possible in both the first mode and the second mode, the processor 870 may output information for asking to perform autonomous driving in which mode between the first and second modes, and allow the vehicle to perform autonomous driving in either one of the first and second modes based on a user input.

For still another example, the processor 870 may allow the vehicle to perform autonomous driving in either one of the first and second modes, based on whether or not the driver has boarded the vehicle 100.

For example, when the driver has boarded on the vehicle 100, the processor 870 may allow the vehicle to perform autonomous driving in the first mode, and when the driver has not boarded on the vehicle 100, the processor 870 may allow the vehicle to perform autonomous driving in the second mode.

For another example, the processor 870 may allow the vehicle to perform autonomous driving in either one of the first and second modes, based on whether or not the vehicle has been driven in a sensor-based autonomous mode before autonomously driving the vehicle in a training-based autonomous mode.

For example, the processor 870 may allow the vehicle to perform autonomous driving in the first mode when the vehicle has been driven in a sensor-based autonomous mode before autonomously driving the vehicle in a training-based autonomous mode. It is because the reliability of the sensor can be seen as a reliable condition.

On the other hand, the processor 870 may allow the vehicle to perform autonomous driving in the second mode when the vehicle has not been driven in a sensor-based autonomous mode before autonomously driving the vehicle in a training-based autonomous mode.

In addition, the processor 870 may allow the vehicle to perform autonomous driving in the first mode when a preset situation occurs (for example, when an obstacle occurs or a road is changed) while allowing the vehicle to perform autonomous driving in the second mode.

The processor 870 may store driving information in which the vehicle has driven in a manual driving mode in the memory 840.

For example, the processor 870 may store a driving route that has been driven from a starting point (first point) to an ending point (second point) in a manual driving mode in the memory as driving information.

In addition, the processor 870 may receive driving information in which another vehicle has driven in a manual driving mode from the mobile terminal or the external device through the communication unit 810.

Driving information that has been driven in the manual driving mode may include a starting point (S/P) at which the vehicle starts driving in a manual driving mode, an ending point (E/P) at which the manual driving mode ends, and a driving route from the starting point to the ending point.

Then, when the vehicle 100 is moved to the starting point in a manual driving mode, the processor 870 may allow the vehicle 100 to perform autonomous driving along the driving route from along the traveling path from the starting point to the ending point.

For example, when the driving information that has been driven in a manual driving mode exists around the current vehicle 100, and the vehicle 100 is located at the starting point of the driving information, the processor 870 may allow the vehicle 100 to perform autonomous driving along the driving route included in the driving information.

In some implementations, the vehicle control device 800 of FIG. 8 may perform a rollback function of traveling the vehicle in an opposite direction of the traveling direction learned up to now by using parking traveling information which is learned. Traveling in an opposite direction of the traveling direction learned up to now may mean that the vehicle is traveled in an opposite direction of a traveling path learned up to now.

The rollback starting position may be the position of the vehicle at which the rollback request signal is received, or may be a position where the vehicle has stopped after the rollback request signal is received.

Hereinafter, 'a parking control device' which will be mentioned in the description related to a rollback function of a vehicle may be understood as the same element as the vehicle control device 800 of FIG. 8. Also, 'a device for supporting parking of a vehicle which will be mentioned in the description of a rollback function of a vehicle may be understood as the same element as the processor 870 of FIG. 8.

Referring to FIGS. 7 and 8, the parking control device 800 may include a power supply unit 190 for receiving a power from a battery of the vehicle, an interface apparatus 200 for exchanging a signal with an electronic device provided in the vehicle, a memory 140 configured to store and read data, and a processor 870 operated by the power supply unit 190, for receiving traveling control data through the interface apparatus 200, generating map information, which includes a traveling path, using the received traveling control data, and transmitting a control signal for allowing the vehicle to automatically travel at least a part of the traveling path in a reverse direction, to a vehicle driving gear as a rollback request signal is received from a vehicle manipulation device. In some implementations, as described above, the device for supporting parking of the vehicle, which corresponds to the processor 870 of FIG. 8, includes an autonomous parking engine for identifying a traveling path by processing at least one traveling data received in the middle of traveling and generating a control signal for autonomous traveling in a reverse direction of the traveling path as a user input is received before traveling ends.

The autonomous parking engine acquires at least one traveling data by using a sensor that includes a camera, and a vehicle manipulation device that includes a steering and a brake.

Also, the traveling path is a traveling path from a third point where traveling data reception starts to a first point where the user input is received, and the control signal is a control signal for traveling the vehicle to reach a second point on the traveling path. the third point may include a current position of the vehicle in a manual driving mode.

Figure 12:
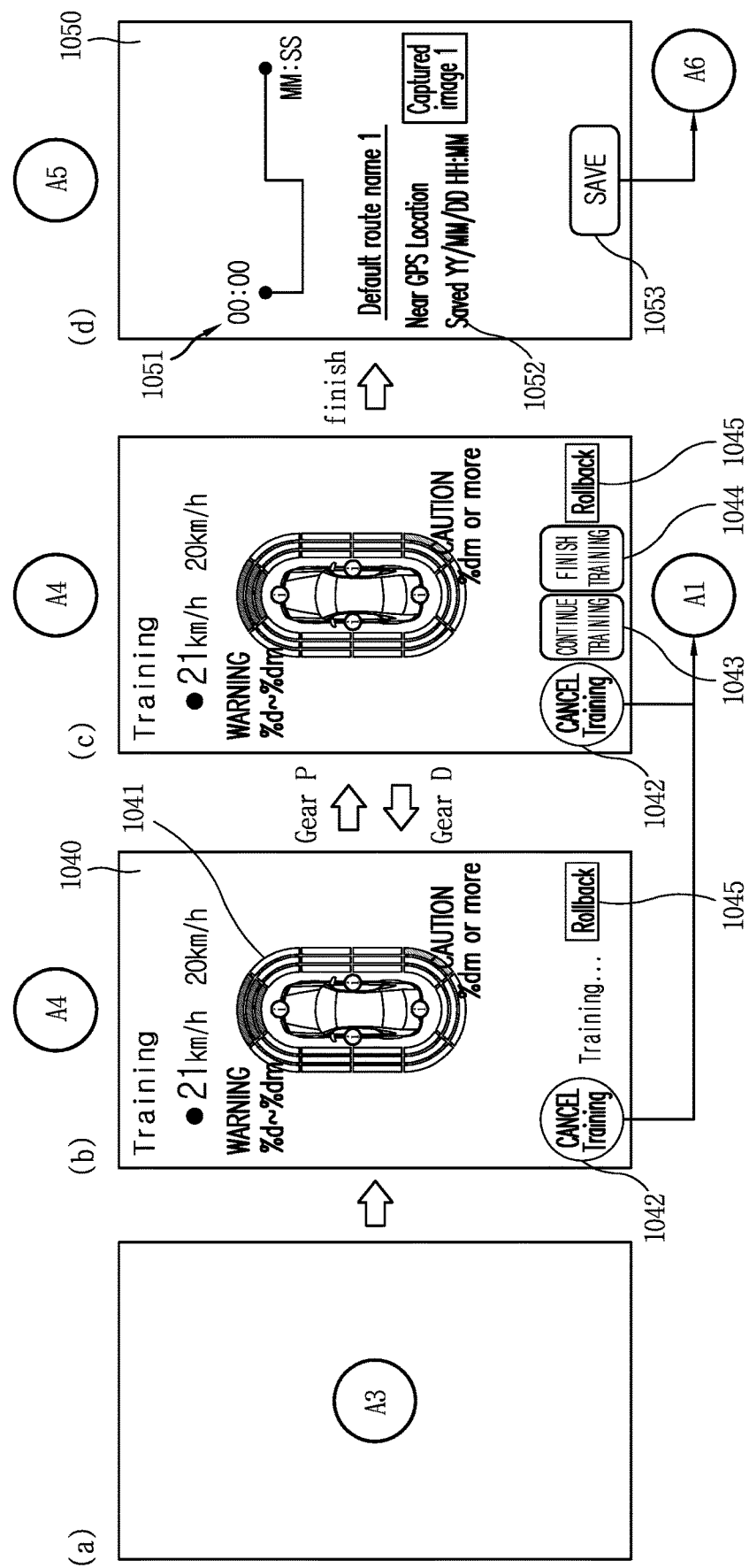

The autonomous parking engine device for supporting parking of the vehicle will be described in detail with reference to description related to rollback function of FIGS. 12 and 34.

Hereinafter, with reference to the accompanying drawings, a method of providing a user interface for training the driving of a vehicle of the present disclosure and allowing the vehicle to perform autonomous driving based on the trained driving information will be described in more detail.

Figure 9:
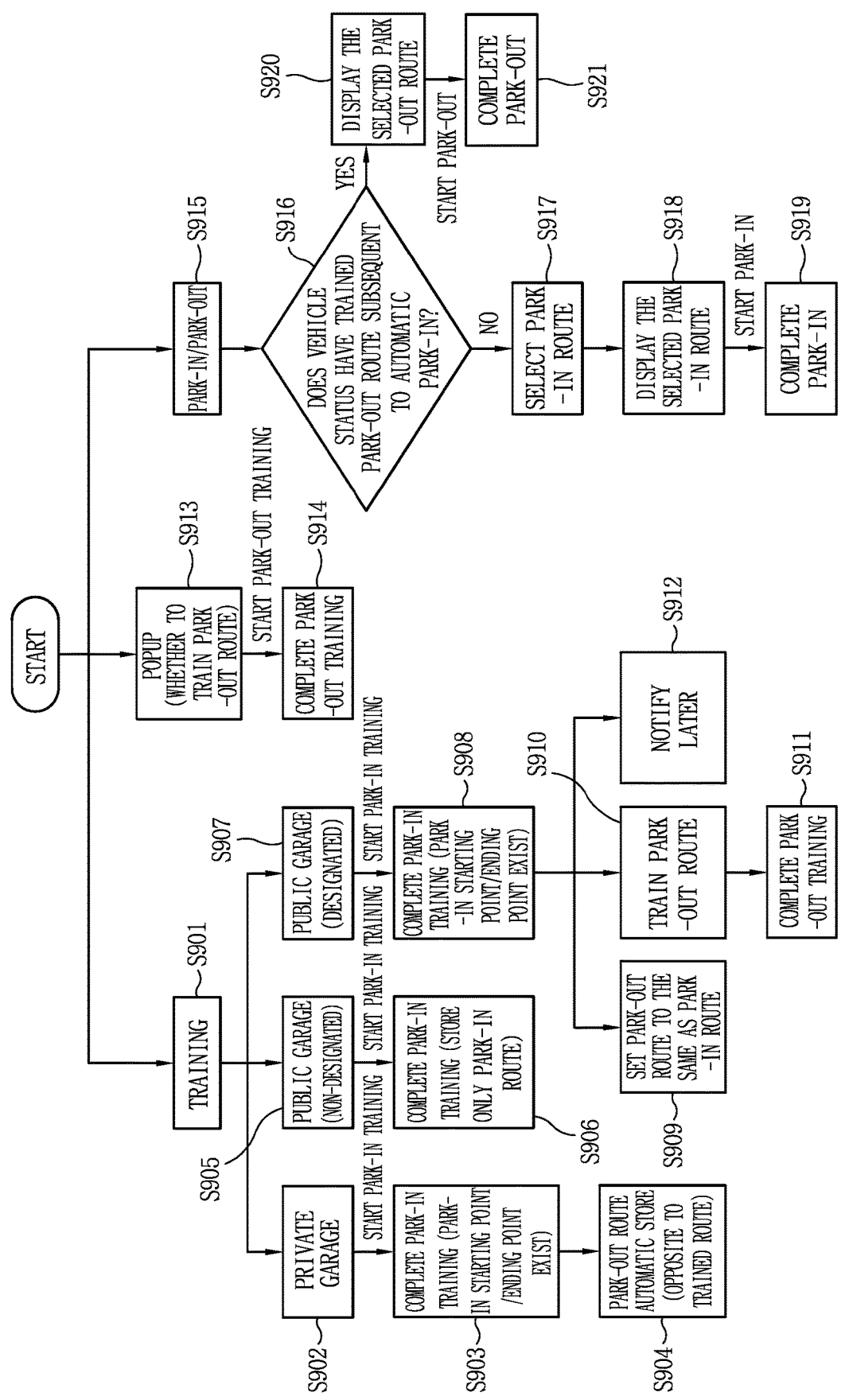
FIG. 9 is a flowchart illustrating an example of a representative control method of the present disclosure.

FIG. 9 is a flowchart for explaining a representative control method of the present disclosure, and FIGS. 10, 11, 12, 13, 14, 15, 16, 17, 18, 19, 20, 21, 22, 23, 24, 25, 26, 27, 28, 29, 30, 31, 32, 33, 34, 35, and 36 are diagrams illustrating examples of the control method illustrated in FIG. 9.

First, referring to FIG. 9, according to the present disclosure, the process of displaying screen information related to parking on the display unit 830 based on the execution of a parking application is carried out.

Specifically, the processor 870 may execute the parking application when an icon is selected while the icon of the parking application is being displayed on the display unit 830.

In this case, screen information related to parking may be displayed on the display unit 830.

The screen information related to parking may include all types of screen information described in this specification.

For an example, the screen information related to parking may include screen information used for training the driving of the vehicle and screen information for allowing the vehicle to perform autonomous driving based on the trained driving information.

The driving information may include park-in drive information for parking the vehicle in and park-out drive information for parking the parked vehicle out. The park-in drive information and park-out drive information may be trained (generated) by manual driving in the manual driving mode as described above.

Further, the park-out drive information may be generated based on the park-in drive information. In this case, the park-out drive information may be generated using the park-in drive information without training through manual driving. For an example, the park-out drive information may be driving information formed so as to drive in a reverse manner to driving for parking the vehicle in. In this case, allowing a vehicle to perform autonomous driving in accordance with park-out drive information may denote driving the vehicle in a reverse manner to parking the vehicle by rewinding park-in drive information.

The screen information related to parking will be described in more detail with reference to the accompanying drawings.

The processor 870 may control the display unit 830 such that screen information related to parking is displayed on the display unit 830 based on the execution of a parking application.

In addition, the processor 870 may control the vehicle in a preset manner based on a function associated with a graphic object touched on the screen information.

Here, the preset manner may be a vehicle that includes all control methods described in this specification. For an example, the preset manner may include driving or stopping a vehicle, allowing a vehicle to perform autonomous driving based on driving information, or displaying preset screen information on the display unit of the vehicle control device.

Figure 10:
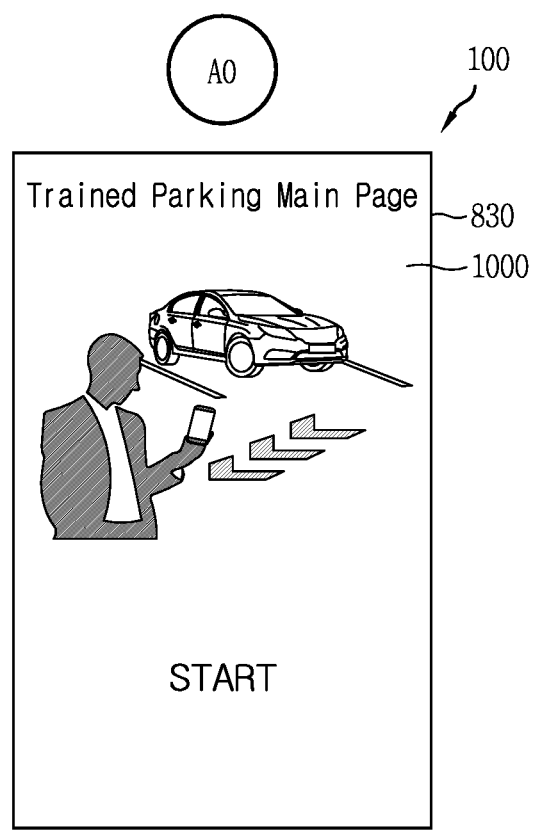
Figure 11:
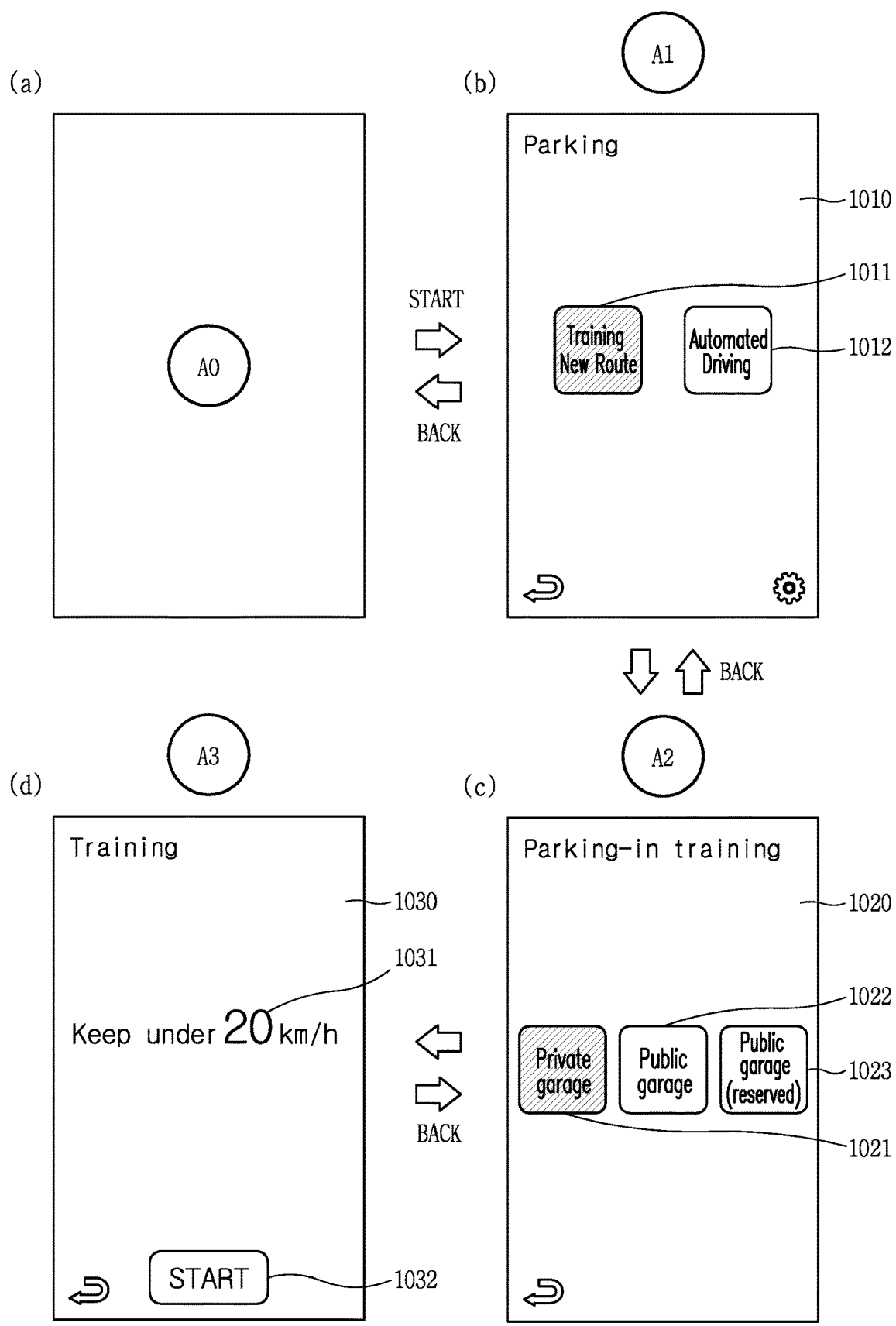

First, the processor 870 may display an execution screen of a parking application on the display unit 830, as illustrated in FIG. 10, based on the execution of the parking application (A0). The execution screen 1000 may be a start screen 1000 of the parking application.

As illustrated in FIG. 11A, when a user input (for example, a touch applied to a start graphic object) is received on the start screen 1000, the processor 870 may display first screen information 1010 including a first graphic object 1011 associated with a function of training park-in drive information and a second graphic object 1012 associated with a function of autonomously parking a vehicle in based on the trained park-in drive information on the display unit 830 as illustrated in FIG. 11B.

In other words, the first screen information 1010 may be included in the screen information related to parking as described above. In addition, various screen information described below may be included in the screen information related to parking.

When a touch is applied to the first graphic object 1011, the processor 870 may execute (or activate) a function of training driving information for manually driving in a manual driving mode.

When a touch is applied to the second graphic object, the processor 870 may execute (or activate) a function of driving the vehicle in an autonomous mode based on the trained driving information.

Furthermore, the first screen information 1010 may further include a graphic object (e.g., back graphic object) associated with a function of displaying screen information (for example, start screen 1000) displayed immediately before, as illustrated in the lower left drawing of FIG. 11B and a graphic object (e.g., setting graphic object) formed to display a setting screen for setting items related to parking, as illustrated in the lower right drawing of FIG. 11B.

Here, when the first graphic object 1011 is touched in the first screen information 1010 displayed on the display unit 830, as illustrated in FIG. 11C, the processor 870 may display second screen information 1020 formed to receive place information for training park-in drive information on the display unit 830 (A2). This may correspond to the training process (S901) in FIG. 9.

Here, the place information may include a plurality of place information. For an example, the plurality of place information may include a private garage 1021, a public place 1022 for which no parking space is designated, and a public place 1023 for which a parking space is designated.

The present disclosure may proceed to step 902 when the private garage 1021 is selected in the second screen information 1020, step 905 when the public place 1022 for which no parking space is designated is selected, and step S907 when the public place 1023 for which a parking space is designated is selected.

When any one of the plurality of place information included in the second screen information 1020 is selected, the processor 870 may display third screen information 1030 including limited driving speed information 1031 of the vehicle required to train park-in drive information and a third graphic object 1032 associated with a function of starting the training of the park-in drive information on the display unit 830 (A3).

In other words, the processor 870 may display the third screen information 1030 configured to start park-in training on the display unit 830 when any one place information is selected from the second screen information 1020.

As illustrated in FIG. 12A, the processor 870 start the training of park-in drive information whether the third graphic object 1032 (start graphic object) is selected in a state where the third screen information 1030 is displayed.

At this time, the processor 870 may set (determine) a place where the vehicle is located at the time point when the third graphic object 1032 is selected as a starting point of the park-in drive information.

In some implementations, the processor 870 may start the training of park-in drive information based on whether the operation of the vehicle is carried out such as the vehicle in a stopped state being started while the third screen information 1030 is displayed on the display unit 830, the brake pedal being changed from a pressed state to an unpressed state, the gear of the vehicle being changed from a parking gear (P-gear) to a driving gear (D-gear, Ds-gear)/reverse gear (R-gear) or the like.

Further, the processor 870 may set (determine) a place where the vehicle is located at the time when the training of park-in drive information starts, as a starting point of the park-in drive information.

Moreover, the processor 870 may display fourth screen information 1040 for displaying information related to a vehicle generated during the training on the display unit 830 based on the selection of the third graphic object 1032 (start graphic object) (or the starting of the training of park-in drive information) in a state where the third screen information 1030 is displayed (A4).

The information 1041 related to a vehicle generated during the training may include a graphic object for displaying warning information based on a speed of the vehicle and a distance between an object and the vehicle when the object exists within a predetermined distance from the vehicle.

In addition, the fourth screen information 1040 may include a fourth graphic object 1042 associated with a function of stopping the training of park-in drive information, as illustrated in FIG. 12B.

The processor 870 may control the display unit 830 to stop the training of the park-in drive information and display the first screen information 1010 (or start screen) when the fourth graphic object 1042 is selected (touched).

In other words, when the fourth graphic object 1042 associated with a function of stopping the training of the park-in drive information is selected, the processor 870 may stop the training of the park-in drive information and display the screen information of step A1 or A0 on the display unit 830.

On the other hand, when the gear of the vehicle is moved to the stop gear (P), as illustrated in FIGS. 12B and 12C, the processor 870 may display a graphic object (continue button) 1043 for continuing the training of the park-in drive information and a graphic object (finish button) 1044 associated with a function of completing the training of the park-in drive information (i.e., a function of storing the trained park-in drive information) in the fourth screen information 1040, as illustrated in FIG. 12C.

Here, when the graphic object 1043 for continuing the training of the park-in drive information is selected, the processor 870 may continue the training of the park-in drive information.

Furthermore, when the graphic object 1044 associated with the function of completing the training of the park-in drive information is selected, the processor 870 may display a fifth screen information 1050 formed to store the trained park-in drive information on the display unit 830 (A5).

The fifth screen information 1050 may include park-in drive route 1051 that has been trained while driving in a manual driving mode, a graphic object 1052 configured to set time information that has been trained from the starting point to the ending point (current position of the vehicle) and the name of the trained park-in drive information, and a store button 1053 for storing park-in drive information.

When the store button 1053 is selected, the processor 870 may display sixth screen information 1060 formed to generate park-out drive information on the display unit 830, as illustrated in FIG. 13B.

The sixth screen information will be described later in more detail with reference to FIG. 13.

Referring back to FIGS. 12B and 12C, the fourth screen information may include a fifth graphic object for driving the vehicle in a reverse manner to driving that has been trained up to now using park-in drive information that has been trained up to the present.

The processor 870 may stop the training of the vehicle based on the selection of the fifth graphic object and display the park-in drive information that has been driven up to the present on the display unit 830.

Figure 34:
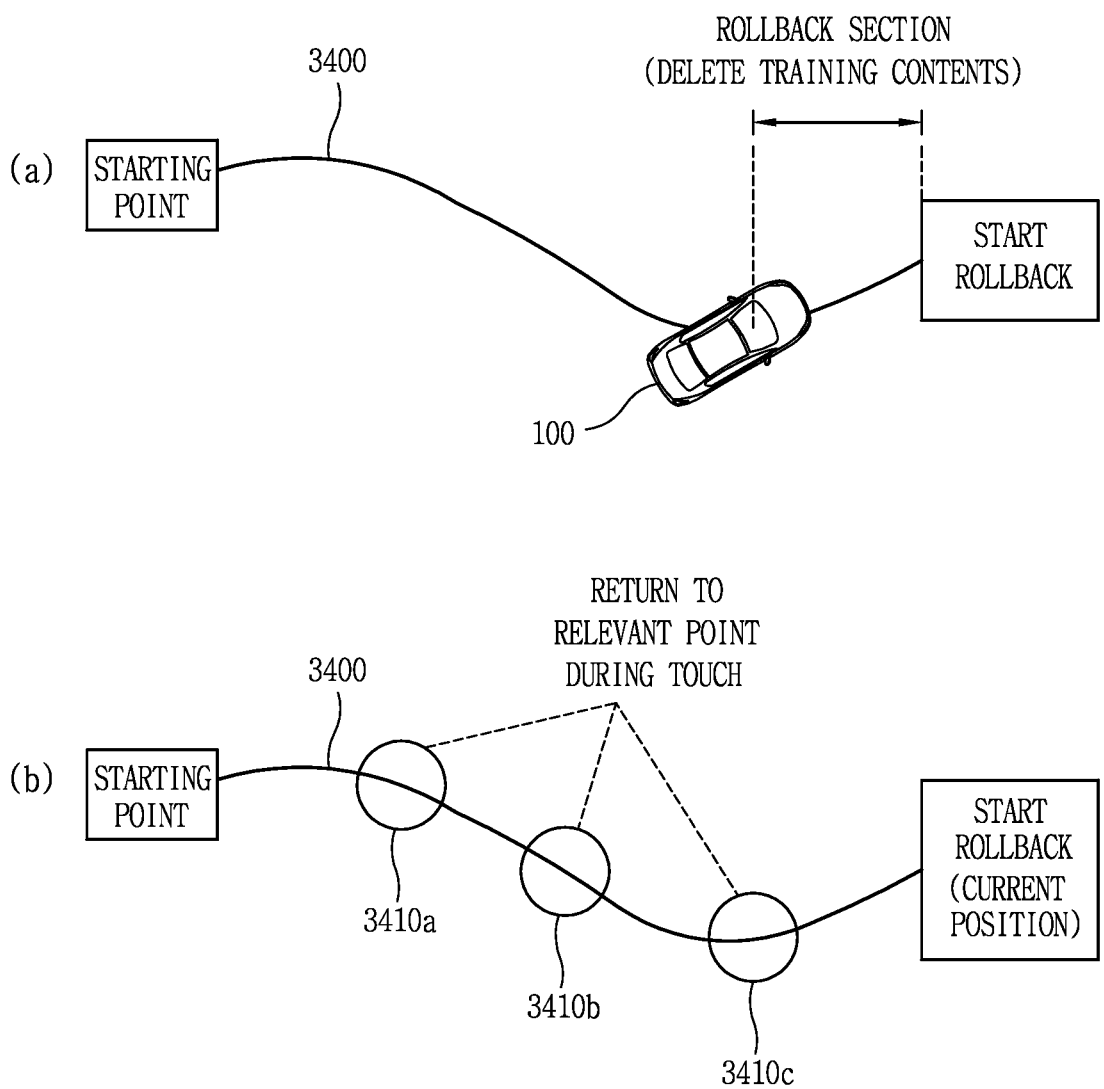

For example, as illustrated in FIG. 34, the processor 870 may display the park-in drive information 3400 that has been trained up to the present on the display unit 830 based on the selection of the fifth graphic object 1045.

The place where the vehicle is located at the time point when the fifth graphic object 1045 is selected may be a place corresponding to a first point (current position, rollback start) of the park-in drive information.

In addition, when a second point other than the first point is selected in the park-in drive information 3400 displayed on the display unit 830, the processor 870 may drive the vehicle in a reverse manner to driving that has been trained up to now to a place corresponding to the second point using the trained park-in drive information.

The second point may denote a point on a route that the vehicle has driven since the starting of the training of the park-in drive information.

Here, driving the vehicle in a reverse manner to driving that has been trained up to now using the trained park-in drive information may include the meaning of rolling back the vehicle using the park-in drive information or rewinding the vehicle using the park-in drive information.

In other words, driving the vehicle in a reverse manner to driving that has been trained up to now may denote driving the vehicle in a reverse manner to a driving route that has been trained up to now.

For example, when the vehicle has trained park-in drive information while driving forward on a specific driving route through a manual driving mode, the processor 870 may drive the vehicle backward along the specific driving route based on the selection of the fifth graphic object 1045.

For another example, when the vehicle has trained park-in drive information while driving backward on a specific driving route in a manual driving mode, the processor 870 may drive the vehicle forward along the specific driving route based on the selection of the fifth graphic object 1045.

In other words, the fifth graphic object (rollback) 1045 of the present disclosure may denote linking a function of driving the vehicle in a reverse manner using a driving manner (driving pattern, driving route) that has been trained up to the present.

As illustrated in FIG. 34A, when the vehicle is driven from the first point to the second point, in a reverse manner to driving that has been trained up to now, the processor 870 may delete park-in drive information from the first point (a point where the rollback has been started) to the second point (a point selected by the user) from the trained park-in drive information.

Moreover, as illustrated in FIG. 34B, when the fifth graphic object 1045 is selected, the processor 870 may display at least one graphic object 3410a, 3410b, 3410c (e.g., a bookmark) formed to select one point (second point) of the park-in drive information that has been trained up to now.

When any one of the at least one graphic object 3410a, 3410b, 3410c is selected, the processor 870 may determine a point corresponding to the selected graphic object as a second point, and rewind the vehicle to a place corresponding to the second point (i.e., the vehicle may be driven in a reverse manner to driving that has been trained up to now).

In addition, the processor 870 may delete park-in drive information from a first point to a second point corresponding to the selected graphic object (e.g., 3410a). The relevant deletion may be carried out based on the vehicle being driven in a rewind manner to the second point.

Moreover, when the vehicle is driven in a rewind manner to the second point after the fifth graphic object 1045 is selected, the processor 870 may display a graphic object for stopping the driving of the vehicle and a graphic object for restarting the training of the park-in drive information, and the like, on the fourth screen information.

The processor 870 may stop the vehicle when a graphic object for stopping the driving of the vehicle is selected, and stop the rewinding of the vehicle when a graphic object for restarting the training of the park-in drive information is selected.

Furthermore, the processor 870 may display at least one of a continue button 1043 associated with a function of restarting the training of park-in drive information from the second point based on the vehicle being moved to a place corresponding to the second point after the vehicle starts a rewind driving and a finish button 1044 associated with a function of completing the training of the park-in drive information on the fourth screen information 1040.

When the fifth graphic object is selected, the processor 870 may control the gears of the vehicle to be driven in a reverse manner to driving that has been trained up to now. For example, when the fifth graphic object is selected while the vehicle is in forward gear (D) (or reverse gear (R)), the processor 870 may change the gear of the vehicle to reverse gear (R) (or forward gear (D)), and drive (i.e., rewind) the vehicle in a reverse manner to driving that has been trained up to now.

Furthermore, when the fifth graphic object is selected while the vehicle is in stop gear (P), the processor 870 may set the gear of the vehicle to forward gear or reverse gear based on a vehicle traveling direction of the vehicle prior to being changed to stop gear.

For example, when the vehicle traveling direction prior to being changed to stop gear is a forward direction, the processor 870 may change the gear of the vehicle from stop gear (P) to reverse gear (R) based on whether the fifth graphic object is selected while the vehicle is in stop gear (P).

For another example, when the vehicle traveling direction prior to being changed to stop gear is a reverse direction, the processor 870 may change the gear of the vehicle from stop gear (P) to forward gear (D) based on the fifth graphic object being selected while the vehicle is in stop gear (P).

On the other hand, the processor 870 may display a popup window including a fifth graphic object for driving the vehicle in a reverse manner to driving that has been trained up to now using park-in drive information that has been trained up to the present on a preset condition being satisfied.

For example, the processor 870 may display a popup window including a fifth graphic object for driving the vehicle in a reverse manner to driving that has been trained up to now using park-in drive information that has been trained up to the present, based on the gear of the vehicle being changed to a gear opposite to a currently set gear while the fourth screen information is being displayed, on the display unit.

Here, the gear of the vehicle being changed to a gear opposite to a currently set gear may include a case where the currently set gear (D, forward gear) is changed to the opposite gear (R, reverse gear) or currently set gear (R, reverse gear) is changed to the opposite gear (D, forward gear).

In addition, the gear of the vehicle being changed to a gear opposite to a currently set gear may include at least one of being changed from stop gear (P) to forward gear (D), being changed from stop gear (P) to reverse gear (R), being changed from forward gear (D) to stop gear (P), and being changed from reverse gear (R) to stop gear (P).

When it is sensed that the gear is changed to a gear opposite to a currently set gear, the processor 870 may display a popup window for asking whether to drive the vehicle in an opposite direction using park-in drive information that has been trained up to now on the display unit.

The popup window may include a fifth graphic object for driving the vehicle in a reverse manner to driving that has been trained up to now using park-in drive information that has been trained up to the present, as described above.

For another example, the processor 870 may display a popup window including the fifth graphic object on the display unit when unable to travel in a traveling direction in which park-in drive information is trained (for example, forward when the vehicle is moving forward or backward when the vehicle is moving backward), when an obstacle is sensed (detected) in a space corresponding to the traveling direction or when a preset button (e.g., a button set to display a popup window) provided on the vehicle is pressed.

On the other hand, the processor 870 may drive the vehicle in a variety of ways using the fifth graphic object, in a reverse manner to driving that has been trained up to now.

For example, when a touch is applied to the fifth graphic object, the processor 870 may drive the vehicle in a reverse manner to driving that has been trained up to now using park-in drive information that has been trained up to the present until an additional user input (e.g., touching the fifth graphic object again or pressing the stop button) or additional vehicle control (e.g., the braking device is operated or the vehicle gear is changed to stop gear (P)) is carried out.

For another example, the processor 870 may drive the vehicle in a reverse manner to driving that has been trained up to now while a touch to the fifth graphic object is maintained. In other words, the processor 870 may drive the vehicle in a reverse manner to driving that has been trained up to now only while a touch to the fifth graphic object is maintained, and stop the vehicle when the touch maintained on the fifth graphic object is released.

On the other hand, the processor 870 may display a popup window including the fifth graphic object based on the vehicle reaching one point on a driving route of park-in drive information trained through manual driving in the state where the training of the vehicle (training of the park-in drive information) is stopped.

When the fifth graphic object is selected at the one point, the processor 870 deletes the park-in drive information trained between a point at which the training is stopped and the one point, and drive the vehicle in a reverse manner to the trained driving using park-in drive information that has been trained from the one point.

In addition, when the fifth graphic object is selected, and then the vehicle reaches one point on a driving route through the trained park-in drive information through the manual driving, the processor 870 may drive the vehicle in a reverse manner to the trained driving.

On the other hand, the processor 870 may display a popup window including the fifth graphic object on the display unit based on the vehicle departing from a driving route of the trained park-in drive information through manual driving in a state where the training of the vehicle is stopped.

In this case, information indicating the trained park-in drive information (for example, trained driving route) and the current position of the vehicle may be displayed on the display unit.

Furthermore, when the fifth graphic object is selected while the vehicle is out of the driving route of the trained park-in drive information, the processor 870 may display notification information for notifying that the vehicle can be driven in a reverse manner to driving that has been trained up to now only when the vehicle is moved on the driving route of the park-in drive information.

Then, when it is sensed that the vehicle is located at one point on the driving route of the park-in drive information through the manual driving, the processor 870 may drive the vehicle in a reverse manner to the trained driving using the park-in drive information that has been trained from the one point.

On the other hand, as illustrated in FIG. 34, the processor 870 may display the park-in drive information 3400 that has been trained up to the present on the display unit 830 based on the selection of the fifth graphic object.

The processor 870 may display at least one graphic object 3410*a*, 3410*b*, 3410*c* (e.g., a bookmark) formed to select one point (second point) of park-in drive information that has been trained up to now on the park-in drive information 3400.

The at least one graphic object 3410*a*, 3410*b*, 3410*c* may be displayed at a point that satisfies a preset condition.

For example, the point that satisfies a preset condition is a point including various features, such as a point at which a curve is performed (or a point at which a curvature of the driving route of the park-in drive information is the largest) when training park-in drive information, a point at which a curve direction is changed when training park-in drive information, a point at which straight driving starts or a point at which straight driving ends or a middle point of a straight driving section when training park-in drive information, a point at which the gear is changed when training the park-in drive information (e.g., a point at which the gear is changed from forward gear to reverse gear or from reverse gear to forward gear), a point at which an object (e.g., an obstacle) is sensed within a predetermined distance from the vehicle when training park-in drive information, or a point where a landmark is sensed when training park-in drive information.

The processor 870 may drive the vehicle to a point corresponding to the selected graphic object when any one of the at least one graphic object 3410*a*, 3410*b*, and 3410*c* is selected.

Hereinafter, the parking control device 800 for performing a rollback function according to the implementation of the present disclosure will be described with reference to FIGS. 8, 12 and 34.

The parking control device 800 according to the present disclosure includes a processor for determining a current position of a vehicle by using at least one of GPS information and surrounding environment information of the vehicle, generating traveling map information, which includes a traveling path of the vehicle from the current position of the vehicle, by using user input and sensor values through the vehicle manipulation device, and transmitting a control signal for automatically traveling the vehicle in a reverse direction along at least a part of the traveling path from a first point which is the position of the vehicle at the time when a rollback request signal is received to the vehicle driving gear as the rollback request signal is received.

Particularly, the processor 870 of the parking control device 800, that is, the device for supporting parking of the vehicle includes an autonomous parking engine for identifying a traveling path by processing at least one traveling data received in the middle of traveling and generating a control signal for automatically traveling the vehicle in a reverse direction of the traveling path as a user input is received before traveling ends.

The autonomous parking engine acquires at least one traveling data by using a sensor that includes a camera, and a vehicle manipulation device that includes a steering and a brake.

Also, the traveling path extends from a third point where traveling data reception starts, to a first point where the user input is received, and the control signal is a control signal for traveling the vehicle to reach a second point on the traveling path.

Particularly, the autonomous parking engine transmits the traveling path to the memory, but stops transmitting the traveling path to the memory as the user input is received. Also, as the autonomous parking engine stops transmitting the traveling path to the memory, the autonomous parking engine loads data stored in the memory until the user input is received from the vehicle manipulation device, and transmits the control signal to the vehicle driving gear.

Also, the autonomous parking engine resumes transmission of a user input value or a sensor value through the vehicle manipulation device to the memory if autonomous traveling in a reverse direction along the traveling path ends.

The processor 870 of the parking control device 800 determines the current position of the vehicle by using at least one of GPS information and surrounding environment information of the vehicle. The parking control device 800 may use a position information unit 420 that includes a GPS module or a DGPS module. In some implementations, the parking control device 800 may determine the current position of the vehicle in response to reception of learning initiation input from the user.

The processor 870 of the parking control device 800 generates traveling map information of a traveling direction of the vehicle by using at least one of the user input value or the sensor value through the vehicle manipulation device in a manual mode (or passive mode). In some implementations, the parking control device 800 may generate traveling map information of the traveling direction of the vehicle and stored the generated traveling map information in the memory 140.

In some implementations, the traveling map information may mean learning for a traveling path of the vehicle in a narrow sense. In this case, the user input value through the vehicle manipulation device 500 may be used as an important parameter. Examples of the user input value may include values input from the user through the steering input device 510, the acceleration input device 530 and the brake input device 570.

In more detail, the processor 870 of the parking control device 800 may store a point where the vehicle performs a curve in the middle of learning, a point where a curve direction is changed, a point where the vehicle starts to drive straight, a point where straight driving ends, a middle point of a straight interval, or a point where a gear is changed (for example, a point where a forward gear is changed to a reverse gear or vice versa).

In some implementations, in a broad sense, the traveling map information may mean learning for a space where the vehicle may travel, as well as a traveling path, that is, learning for a 'traveling available space' based on a full width of the vehicle, a full length, a width of road, a parking line painted on the bottom of a traveling space, etc. In this case, a sensor value through a sensor 820 (or sensing unit) may additionally be used to generate map information.

In some implementations, the parking control device 800 according to the implementation of the present disclosure may continue to store the user input value and the sensor value in the memory in generating traveling map information in a manual mode, wherein the traveling map information (for example, traveling path) may be generated using the user input value and the sensor value if necessary (for example, if a rollback request signal is received). According to the implementation of the present disclosure, a technical effect that may reduce the computation amount of the processor of the parking control device 800 may be expected.

The memory for storing the traveling map information may be a memory provided inside the parking control device 800 or a memory provided outside the parking control device 800 (for example, an external server).

In some implementations, as the rollback request signal is received, the processor 870 of the parking control device 800 may transmit a control signal for automatically traveling the vehicle in a reverse direction along at least a part of the traveling path from a first point corresponding to the position of the vehicle at the time when the rollback request signal is received to the vehicle driving gear. The rollback request may mean a case that a fifth graphic object of (b) and (c) of FIG. 12 is selected, a case that the vehicle is stopped in the middle of learning, or a case that a gear of the vehicle is changed, for example.

In some implementations the parking control device 800 may generate the control signal by using speed information of the vehicle, which is detected through the sensor, or information on an obstacle existing on the traveling path. That is, in generating the control signal, speed information of the vehicle, which is detected through the sensor and information on an obstacle as well as the traveling path such as steering information and forward/reverse information may be used together.

The parking control device 800 may further a user input for designating a second point corresponding to a rollback ending position and transmit a control signal for traveling the vehicle to the second point to the vehicle driving gear. Alternatively, the parking control device 800 may designate a rollback ending position to a user position and transmit a control signal for traveling the vehicle to the user position to the vehicle driving gear.

In some implementations, as described above, as the traveling map information is generated, the parking control device 800 may transmit the generated traveling map information to the memory 140. Also, the parking control device 800 may stop generating the traveling map information or transmitting the traveling map information to the memory as the rollback request signal is received. This is because that it is suitable for a user's intention that traveling map information of the vehicle after the rollback request signal is received is not learned or stored.

In some implementations, as the parking control device 800 stops generating the traveling map information or transmitting the traveling map information to the memory, the parking control device 800 may load the data stored in the memory until the rollback request signal is received, and may generate a control signal for automatically traveling the vehicle in the reverse direction by using the loaded data.

In some implementations, the parking control device 800 may generate a control signal for not following the traveling path from the first point to the second point if at least one vehicle direction switching point or at least one obstacle exists on a traveling path between the first point and the second point. This is to allow the vehicle to control a change of a traveling environment in the middle of performing rollback traveling. In other words, the parking control device 800 may generate a control signal for deviating from the traveling path from the rollback starting position to the rollback ending position. For example, the control signal may be generated based on the vehicle having reversed direction a plurality of times along the traveling path. "reversed direction a plurality of times along the traveling path" may occur in a certain case where the vehicle changes the gear frequently (e.g., for parking) in the rollback driving.

In some implementations, if rollback traveling corresponding to automatic traveling of the vehicle in a reverse direction along the traveling path ends, the parking control device 800 may resume generating the traveling map information or transmission of the traveling map information to the memory. That is, rollback traveling ends, learning for the traveling path of the vehicle is automatically resumed.

In some implementations, as rollback traveling ends, the parking control device 800 may generate information for displaying at least one of the current position, a vehicle position when generation of the map information ends, a surrounding image, a graphic object generated using the surrounding image, and the traveling path on the display unit on the basis of the generated traveling map information. This is to provide the result for rollback traveling to the user if rollback traveling ends.

In some implementations, the parking control device 800 may delete map information from the first point to the second point from the memory if the vehicle reaches the second point which is the rollback ending position or a new user input is received from the second point. This is because that it is suitable for the user's intention that a rollback traveling path which is map information from the first point to the second point is not learned or stored.

In some implementations, if the user input value through the vehicle manipulation device exceeds a predetermined value, the parking control device 800 may generate the traveling path on the basis of the predetermined value in generating traveling map information. Also, the predetermined value may be varied depending on whether the vehicle is traveling or parking.

In some implementations, the parking control device 800 may generate map information, which includes a traveling path extended from the current position to the second point, on the basis of the generated map information and the sensor value as the vehicle resumes traveling at the second point corresponding to the rollback ending position.

The parking control device 800 according to another implementation of the present disclosure may calculate a control value for traveling the vehicle in an opposite direction of the above direction without designating the second position corresponding to the rollback ending position. In this case, the parking control device may further receive additional user input for ending rollback. At this time, the user input may be a rollback end function button, or may be a traveling intervention of the user such as brake and gear switching.

In some implementations, the parking control device 800 according to another implementation of the present disclosure may not transmit information (for example, user input value input through a driving manipulation device) related with traveling of the vehicle and information (for example, surrounding environment information) which is not related with traveling of the vehicle to the memory.

Alternatively, the parking control device 800 according to another implementation of the present disclosure may continue to transmit information (for example, surrounding environment information) which is not related with traveling of the vehicle to the memory, and may only stop transmitting information (for example, user input value input through a driving manipulation device) related with traveling of the vehicle to the memory.

In some implementations, the parking control device 800 according to another implementation of the present disclosure may stop receiving the user input value or the sensor value as a user input finally indicating ending of learning is received through the user interface apparatus 200. Moreover, the parking control device may store an entire learning path.

Furthermore, as described above, referring to FIGS. 12B and 12C, notification information for notifying that park-in drive information is being trained may be displayed on the fourth screen information 1040 when that the gear of the vehicle is forward gear (D) or reverse gear (R) after the training of the park-in drive information has been started.

The processor 870 may display a sixth graphic object 1044 associated with a function of completing the training of park-in drive information instead of notification information when the vehicle is in stop gear (P).

The processor 870 may display fifth screen information 1050 formed to store the trained park-in drive information on the display unit 830 when the sixth graphic object 1044 is selected (A5).

Then, as illustrated in FIGS. 13A and 13B, when the park-in drive information is stored through the fifth screen information, the processor 870 may display the sixth screen information 1060 formed to select a mode of park-out drive information for parking a parked vehicle out on the display unit 830.

Here, referring to FIG. 9, in cases of a private garage, a public place where no parking place is designated, and a public place where a parking place is designated, the steps A3, A4, and A5 may be commonly carried out (S903, S906, S908).

On the other hand, in case of a private garage, the processor 870 may generate park-out drive information not to display the sixth screen information 1060 but to drive the vehicle in a reverse manner to the trained driving using the park-in drive information (S904).

In this case, when parking the vehicle out based on the park-out drive information, the vehicle may be driven (rewound or rolled back) in a reverse manner to driving that has trained the park-in drive information.

On the other hand, in case of a public place where no parking place is not designated, the display of the sixth screen information 1060 may be omitted because the place where the vehicle is parked is not designated.

Furthermore, in case of a public place where a parking place is designated, the sixth screen information 1060 to be described later may be displayed on the display unit 830 (A6).

In case of a public place where a parking place is designated (S907), when park-in training is completed (S908), the processor 870 may set the park-out route to be the same as the park-in route (S909), or train a new park-out route (S910), or set the training method to be notified later (S912).

Setting the park-out route to be the same as the park-in route may denote generating park-out drive information to park the vehicle out in a reverse manner to driving that has trained park-in drive information using the park-in drive information.

When park-out drive information is generated to park the vehicle out in a reverse manner to driving that has trained park-in drive information, the park-in route and the park-out route may be the same or similar.

In order to perform the steps S909, S910 and S912 as described above, sixth screen information 1060 formed to select a mode of park-out drive information for parking a parked vehicle out may be displayed on the display unit 830 as illustrated in FIG. 13B (A6).

The sixth screen information may include at least one of a seventh graphic object 1061 for generating park-out drive information to park the vehicle out in a reverse manner to driving that has trained park-in drive information using the park-in drive information and an eighth graphical object 1062 for generating (training) new park-out drive information.

Figure 13:
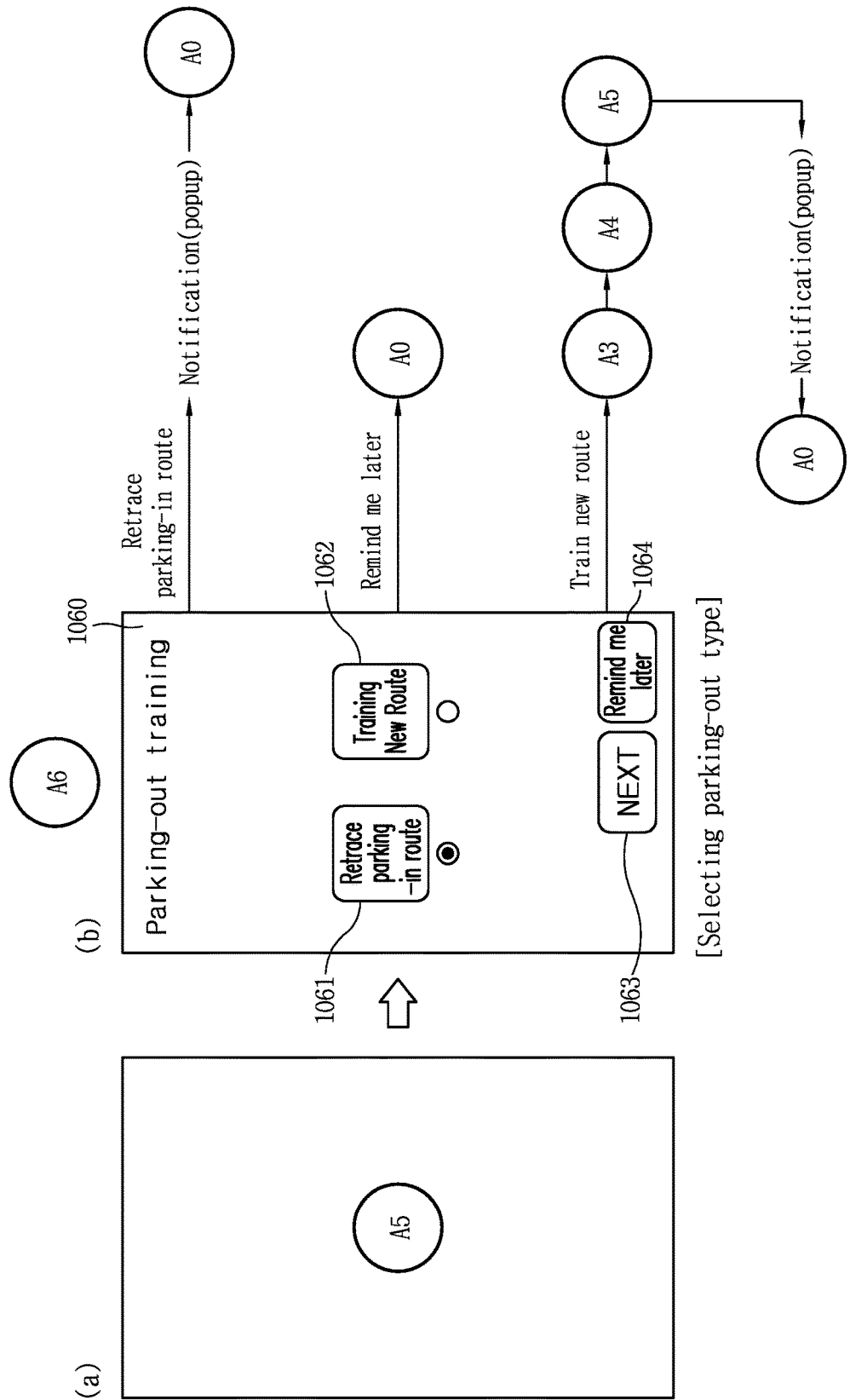
Figure 14:
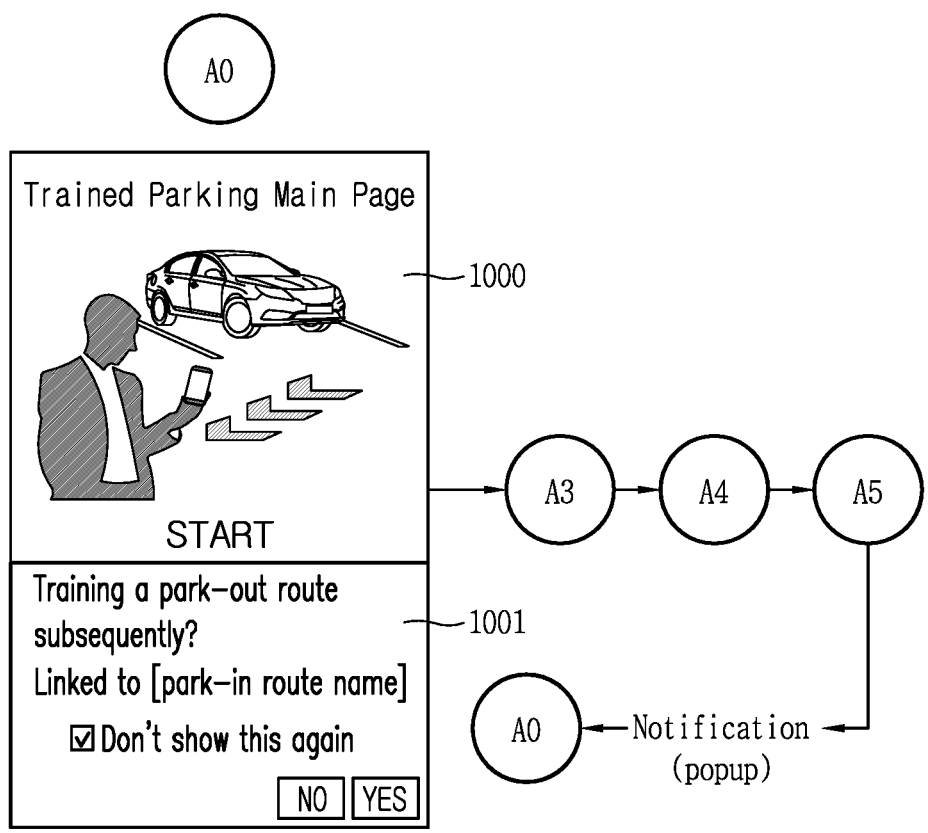

Referring to FIG. 13, when the seventh graphic object 1061 is selected (e.g., when the seventh graphic object 1061 is selected and then a next button 1063 is selected), the processor 870 may generate park-out drive information such that the park-in route and the park-out route are the same (or the vehicle is parked out in a reverse manner to driving that has trained park-in drive information).

In this case, the processor 870 may selectively display a notification popup window, and display a start screen on the display unit 830 when the park-out drive information is generated (stored) (A0). The notification popup window may be a screen for reconfirming the generation of park-out drive information.

When the eighth graphic object 1062 is selected (e.g., the eighth graphic object 1062 is selected and then the next button 1063 is selected), the processor 870 may train new park-out drive information. In this case, new park-out drive information may be stored in the memory 840 after the above-described steps A3, A4, and A5 has been carried out. When the park-out drive information is stored, the processor 870 may display a start screen on the display unit 830.

Here, subsequent to the step A5, the processor 870 may selectively display a notification popup window, and display a start screen on the display unit 830 when the park-out drive information is generated (stored) (A0). Here, the notification popup window may be a screen for reconfirming once again that newly trained park-out drive information is stored.

When training (S910) of new park-out drive information is completed (S912), the processor 870 may store the new park-out drive information in the memory. At this time, newly trained park-out drive information may be stored in the memory 840 in association with the previously trained park-in drive information.

On the other hand, as illustrated in FIG. 13B, the sixth screen information 1060 may include a ninth graphic object 1064 formed to train park-out drive information later.

The processor 870 may return to a start screen or terminate a parking application when the ninth graphic object is touched. Further, the processor 870 may turn off the engine of the vehicle based on the ninth graphic object being selected (touched).

When the ninth graphic object 1064 is touched, and then the parking application is executed again, the processor 870 may display popup information 1001, which is formed to select whether or not to train the park-out drive information, on the display unit 830 (S913).

At this time, when the parking application is executed, the popup information 1001 may be displayed on the start screen 1000 or displayed to overlap with a part of the start screen 1000.

Then, when a user request for training the park-out drive information is received through the popup information 1001 (for example, by touching "Yes"), the processor 870 may train the park-out drive information through the steps A3, A4, and A5 described above (S914).

Specifically, the processor 870 may store the trained park-out drive information in the memory 840. When the park-out drive information is stored, the processor 870 may display a start screen on the display unit 830.

Here, subsequent to the step A5, the processor 870 may selectively display a notification popup window, and display a start screen on the display unit 830 when the park-out drive information is generated (stored) (A0). Here, the notification popup window may be a screen for reconfirming once again that newly trained park-out drive information is stored.

The steps S913 and S914 may be carried out when the ninth graphic object 1064 is selected on the sixth screen information 1060 and then the parking application is executed again, when park-in drive information is trained and then the engine is off, when the vehicle is autonomously parked based on park-in drive information but park-out drive information is not linked to the relevant park-in drive information, when the engine is turned off without pressing the "OK" button subsequent to the completion of park-in training and then the engine is turned on again, or the like.

Figure 15:
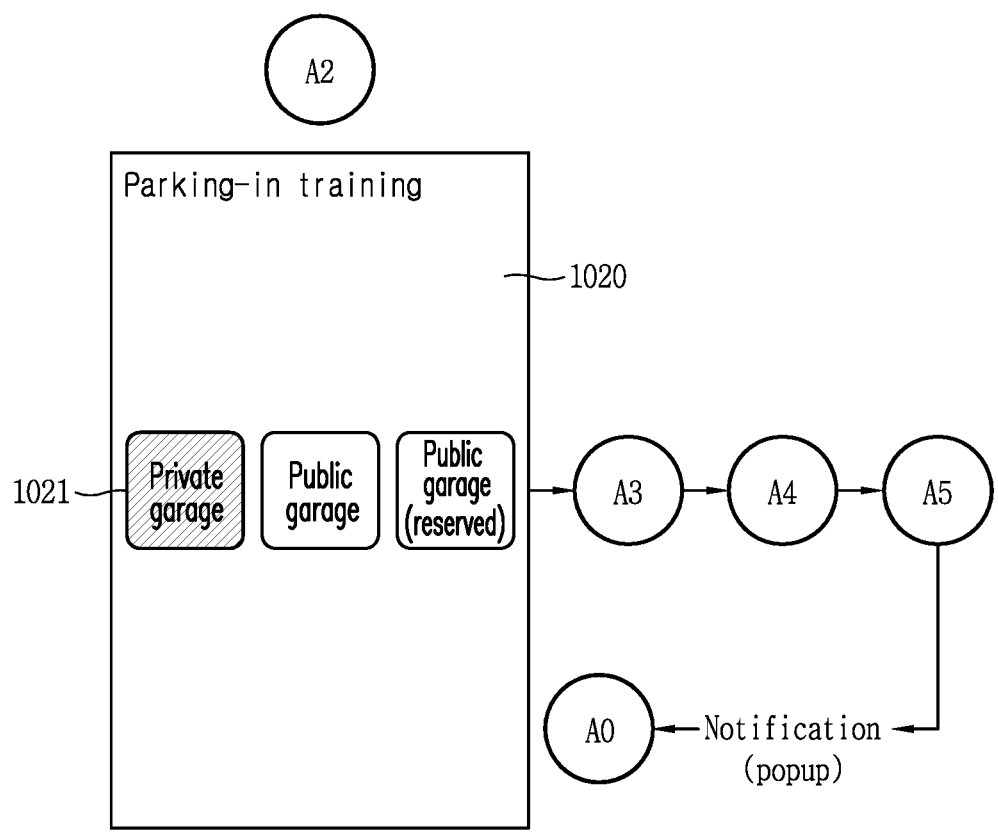

Referring to FIG. 15, when a private garage is selected on the second screen information 1020 (e.g., private garage 1021), the processor 870 may train park-out drive information through the steps A3, A4, and A5 (S902, S903, S904).

Here, subsequent to the step A5, the processor 870 may selectively display a notification popup window, and display a start screen on the display unit 830 when the park-in drive information is generated (stored) (A0). Here, the notification popup window may be a screen for reconfirming once again that the trained park-in drive information is stored.

Figure 16:
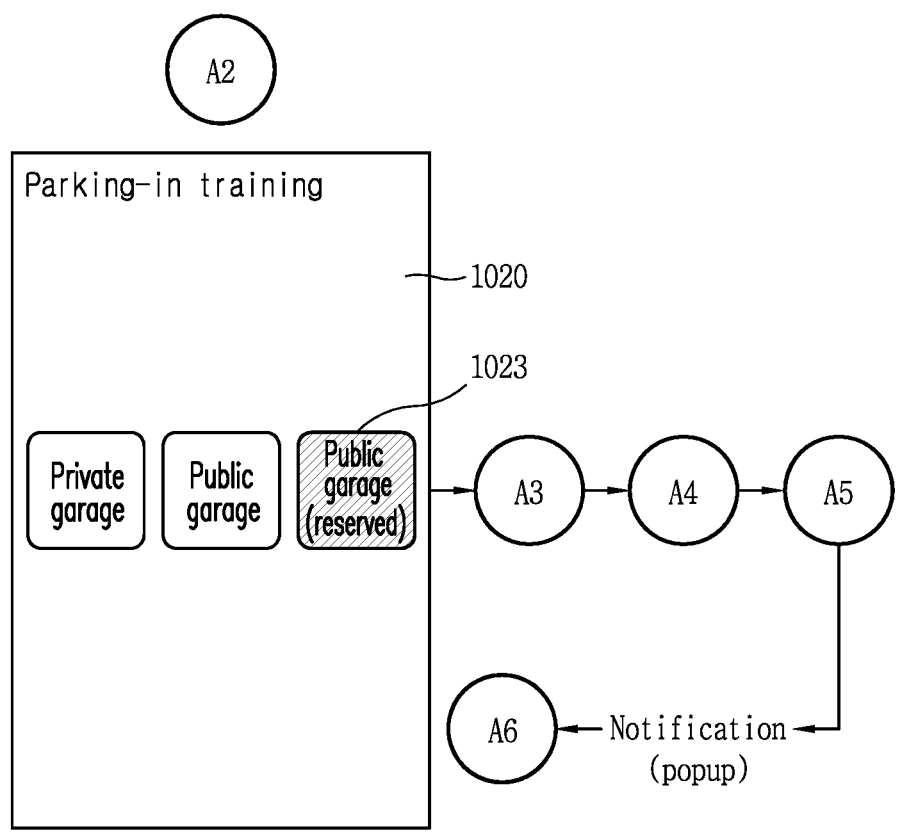

Referring to FIG. 16, when a public place 1023 where a parking space is designated is selected on the second screen information 1020, the park-out drive information may be trained through the steps A3, A4, and A5.

Here, subsequent to the step A5, the processor 870 may selectively display a notification popup window. Here, the notification popup window may be a screen for reconfirming once again that newly trained park-out drive information is stored.

The processor 870 may display the sixth screen information 1060 formed to generate the park-out drive information on the display unit 830 when the park-in drive information is generated (stored) (A6).

The processor 870 may generate park-out drive information to park the vehicle out in a reverse manner to driving that has trained park-in drive information or train new park-out drive information or display popup information configured to retrain park-out drive information, through the sixth screen information 1060.

Figure 17:
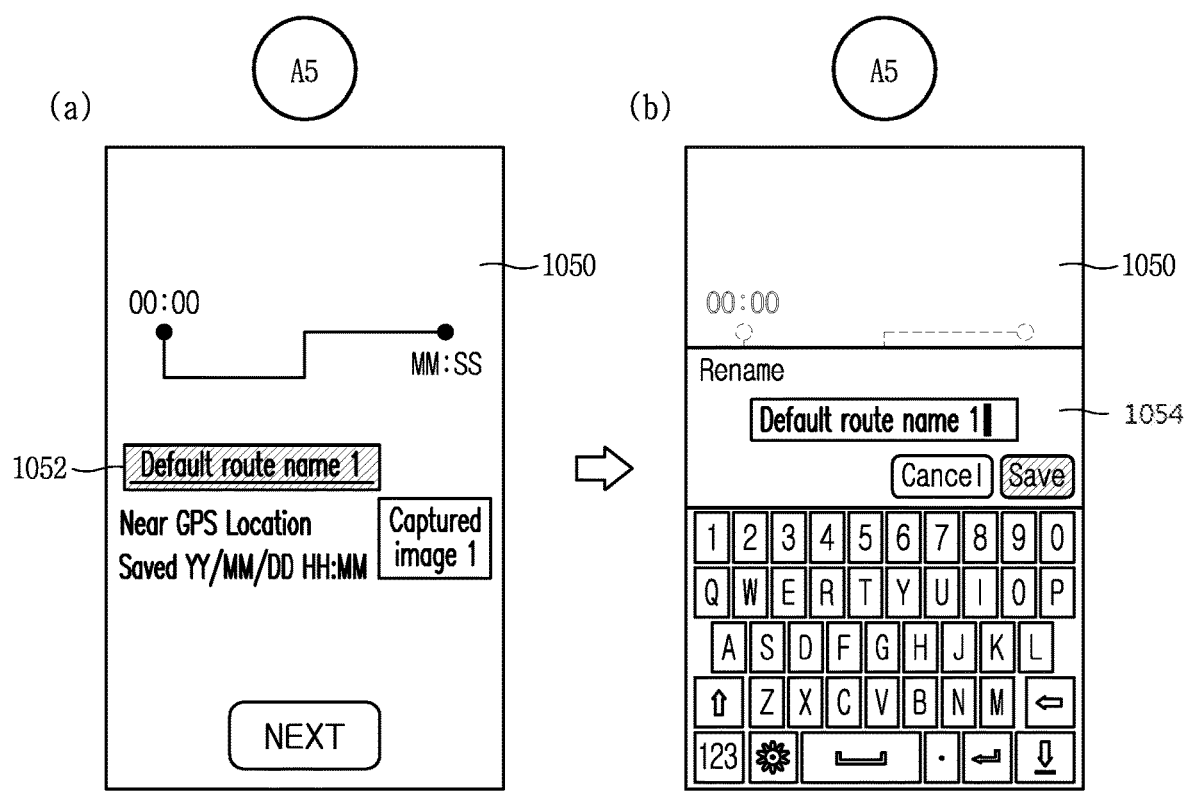

On the other hand, when a touch is applied to a file name of the park-in drive information in a state where the fifth screen information 1050 for displaying information related to the trained park-in drive information is displayed as illustrated in FIG. 17, the processor 870 may display a popup window 1054 and a keypad configured to set (modifying) the file name on the display unit 830.

The popup window 1054 and the keypad may be displayed to overlap with each other on the fifth screen information 1050 in a state where the fifth screen information 1050 is displayed.

Through this configuration, the present disclosure may provide an optimized user interface configured to train park-in drive information, and provide a new vehicle control method configured to control a vehicle to be parked in an optimized manner through a user interface.

Hereinafter, a method for allowing a vehicle to perform autonomous parking-in using park-in drive information trained with reference to the accompanying drawings and a user interface operated thereon will be described in detail with reference to the accompanying drawings.

As described above, screen information related to parking executed based on the execution of a parking application may include a first graphic object 1011 associated with a function of training park-in drive information and a second graphic object 1012 associated with a function of autonomously parking the vehicle based on the previously trained park-in drive information (A1).

When the second graphic object 1012 is touched (selected) on the first screen information 1010 displayed on the display unit 830, the processor 870 may start autonomous parking-in based on previously stored park-in drive information (S915).

First, as illustrated in FIG. 9, the processor 870 may determine whether or not there is a trained park-out route subsequent to automatic parking on the vehicle status (S916).

Specifically, the processor 870 may determine whether or not there exists a park-out route based on the current position of the vehicle sensed through the communication unit 810 and the start position of the park-in drive information/park-out drive information.

Here, when there exists no park-out route that has trained for the vehicle, the processor 870 may determine that it is parking the vehicle in other than parking the vehicle out, and enter the process of selecting the park-in route (park-in drive information) (S917).

Then, when the park-in route is selected, the processor 870 may display the selected park-in route (park-in drive information) on the display unit 830, and start autonomous parking-in (or automatic parking-in).

At this time, the processor 870 may perform autonomous parking-in of the vehicle along the selected park-in route or autonomously park the vehicle based on the selected park-in drive information.

Then, when the vehicle is located at a place corresponding to an end point of the park-in route, or when the vehicle reaches a position corresponding to an end portion of the park-in drive information, the processor 870 may complete autonomous parking-in (S919).

On the other hand, in case where there exists a trained park-out route (i.e., when there exists park-out drive information in which the current position of the vehicle matches the start position of the park-out drive information) in step S916, the processor 870 determines that the vehicle performs parking-out.

In this case, the processor 870 may select the park-out drive information (park-out route), and display the selected park-out drive information (park-out route) on the display unit 830 (S920).

Further, the processor 870 may start to park the vehicle outbased on the park-out drive information (or along the park-out route), and when the vehicle reaches a position corresponding to an end portion of the park-out drive information or the vehicle is located at the end portion of the park-out drive information, parking the vehicle out may be completed (S921).

Hereinafter, a case of parking the vehicle in will be described as an example. The contents of allowing the vehicle to perform autonomous parking-in based on park-in drive information can be analogically applied to those of allowing the vehicle to perform autonomous parking-out in the same or similar manner.

Figure 18:
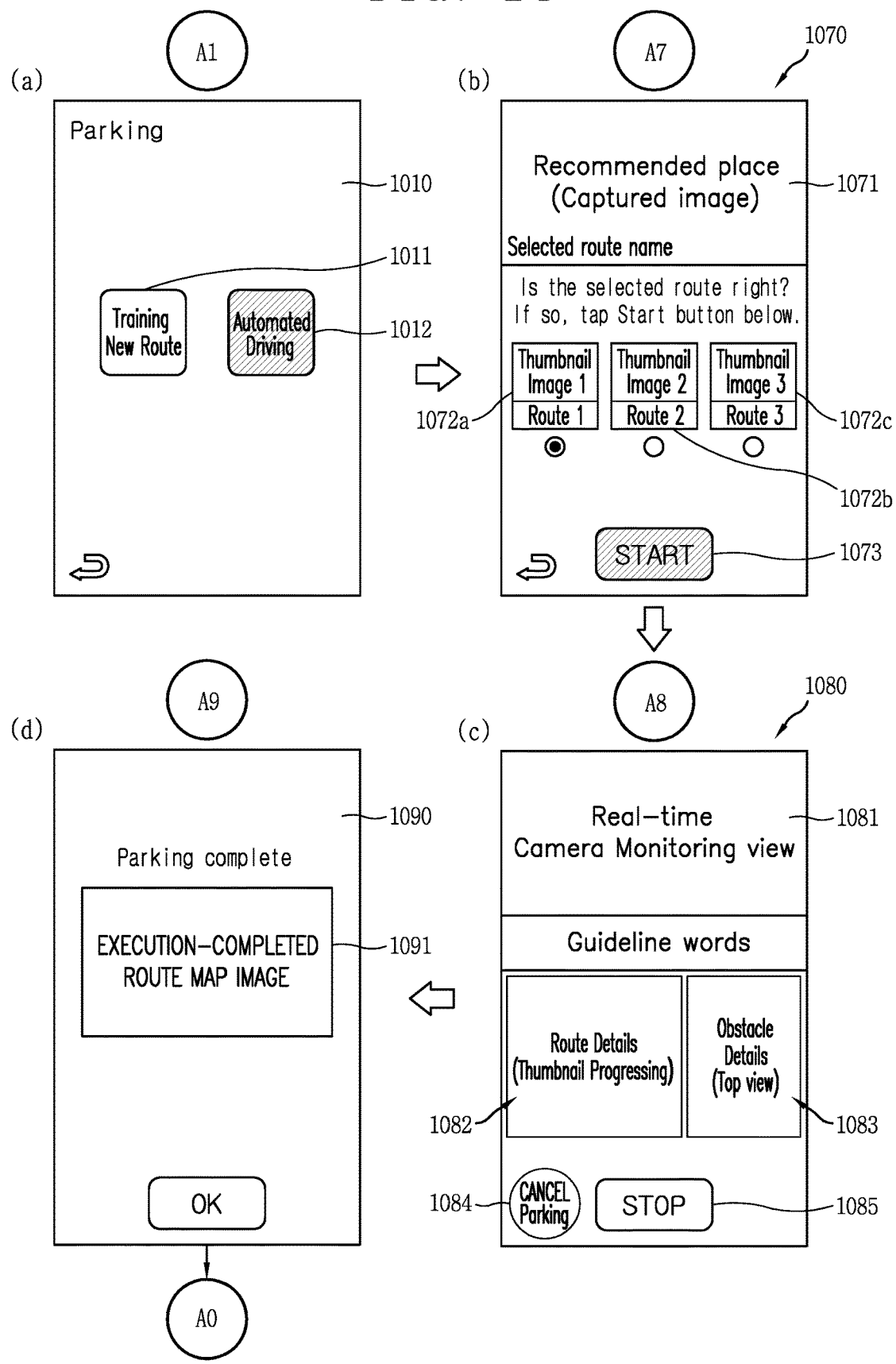

Referring back to FIG. 18, when the second graphic object 1012 is touched on the first screen information 1010 displayed on the display unit 830, the processor 870 may display seventh screen information 1071 configured to select at least one previously stored park-in drive information on the display unit 830 as illustrated in FIG. 18B (A7).

The seventh screen information 1070 may include at least one graphic object 1072a, 1072b, 1072c formed to select at least one piece of park-in drive information and a tenth graphic object 1073 associated with a function of starting autonomous parking-in (autonomous park-in function).

In addition, any one of images captured through the camera of the sensing unit 820 when training park-in drive information based on the current position of the vehicle acquired through the communication unit 810 may be displayed on the seventh screen information 1070.

The processor 870 may capture at least one image through the camera of the sensing unit 820, and store the captured image in the memory 840 when training park-in drive information. The at least one image may be respectively associated with location information.

Thus, the processor 870 may select and display any one of images captured at the current position of the vehicle on the screen information 1070 based on the current position of the vehicle acquired through the communication unit 810 and the location information of images captured through the camera of the sensing unit 820 when training the park-in drive information.

As described above, the sensing unit 820 may further include a camera formed to capture an outside of the vehicle. The camera may be provided at an outside or provides at an inside of the vehicle.

When a touch is applied to the tenth graphic object 1073 (or the tenth graphic object 1073 is selected), as illustrated in FIG. 18C, the processor 870 may display eighth screen information 1080 including at least one of a preview image 1081 received through the camera and a driving route 1082 of any one selected park-in drive information on the display unit 830 (A8).

In addition, the processor 870 may allow the vehicle to perform autonomous parking-in (or autonomous parking-out) based on the park-in drive information 1072a selected based on the selection of the tenth graphic object 1073 (Start).

Moreover, when the vehicle is provided with an AVM (Around View Monitor) camera, the eighth screen information 1080 may further display an AVM image 1083 in which the present vehicle is viewed from above.

Then, when the autonomous parking-in is completed based on the autonomous driving information or the autonomous parking-out is completed based on the park-out drive information, as illustrated in FIG. 18D, screen information 1090 for notifying that the autonomous parking-in (or autonomous parking-out) has been completed may be displayed (A9).

On the ninth screen information 1090, a driving route 1091 in which the vehicle is autonomously parked in (or autonomously parked out) in actuality may be displayed. The driving route 1091 may be displayed in the form of a graphic object, displayed to overlap with an image captured through the camera, or displayed in an overlapping manner on map information.

Then, when the OK button is selected, the processor 870 may display the start screen on the display unit 830.

On the other hand, as illustrated in FIG. 18, the eighth screen information 1080 may further include an eleventh graphic object 1085 (stop) associated with a function of stopping autonomous parking-in (or autonomous parking-out) and a cancel button 1084 (cancel) associated with a function of canceling the autonomous parking-in (autonomous parking-out).

When a touch is applied to the cancel button 1084 (when selected), the processor 870 may stop the vehicle. At this time, the processor 870 may switch the gear of the vehicle to (P) or operate the brake to stop the vehicle.

Further, the processor 870 may display the start screen or the first screen information on the display unit 830 based on the selection of the cancel button 1084.

Figure 19:
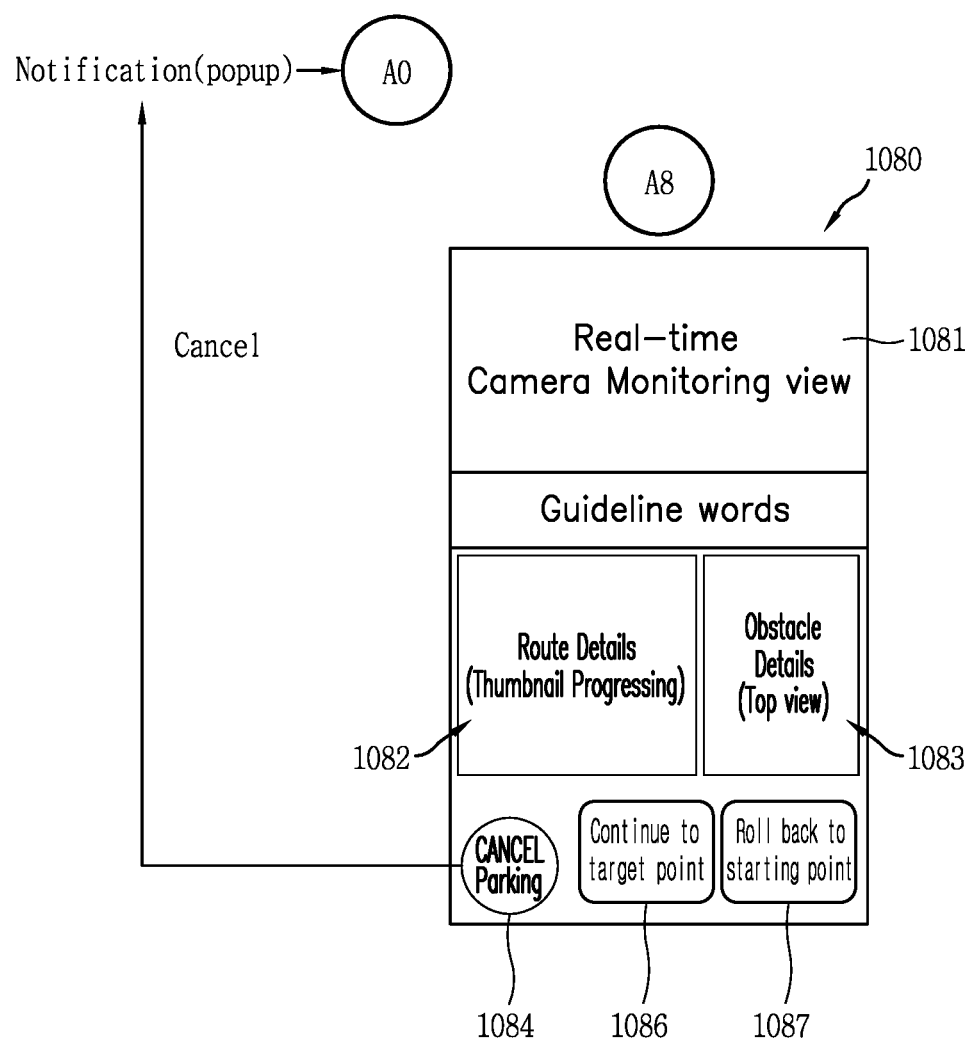

At this time, as illustrated in FIG. 19, when the cancel button 1084 is selected, the processor 870 may display a notification popup window for confirming whether to cancel the autonomous parking-in (or autonomous parking-out) and then display the start screen on the display unit 830.

Besides, when the eleventh graphic object 1085 (stop) is selected on the eighth screen information 1080, the processor 870 may stop the vehicle.

In addition, when the eleventh graphical object 1085 is touched, as illustrated in FIG. 19, the processor 870 may further display at least one of a twelfth graphic object 1085 (continue) associated with a function of subsequently starting interrupted autonomous parking-in (or autonomous parking-out) and a thirteenth graphic object 1087 (roll back) associated with a function rewinding autonomous parking-in (or autonomous parking-out) carried out up to the present on the ninth screen information 1090.

When the twelfth graphic object 1086 is selected, the processor 870 may continue to perform autonomous parking-in or autonomous parking-out according to the park-in drive information (or park-out drive information).

When the thirteenth graphic object 1087 is selected, the processor 870 may drive the vehicle in a reverse manner to driving that has been autonomously parked up to the present.

In other words, the thirteenth graphic object 1087 may be associated with a function of driving the vehicle in a reverse manner to driving the vehicle according to the park-in drive information (or park-out drive information).

On the other hand, the processor 870 may sense an object existing in the vicinity through the sensing unit 820 while the vehicle is being autonomously parked in or autonomously parked out based on the park-in drive information (or park-out drive information).

Figure 20:
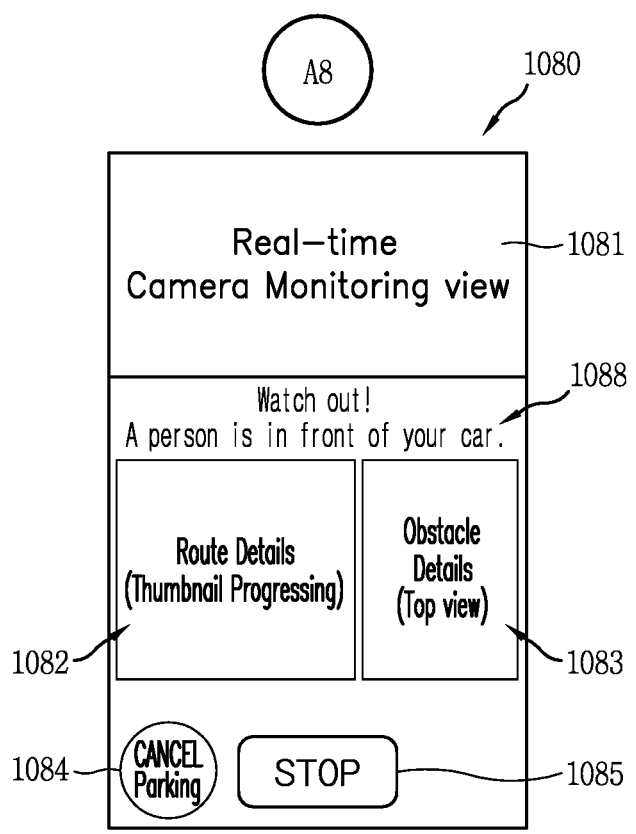

The processor 870 may display warning information 1088 as illustrated in FIG. 20 on the eighth screen information 1080 when a distance between the object and the present vehicle sensed through the sensing unit 820 is less than a predetermined distance during autonomous parking-in or autonomous parking-out.

In this case, the processor 870 may suspend autonomous parking-in or autonomous parking-out and stop the vehicle wen a distance between the object and the present vehicle is less than a predetermined distance.

Furthermore, when a distance between the object and the present vehicle is less than a predetermined distance, the processor 870 may display the twelfth graphic object 1086 and the thirteenth graphic object 1087 on the eighth screen Information 1080, as illustrated in FIG. 19.

Figure 21:
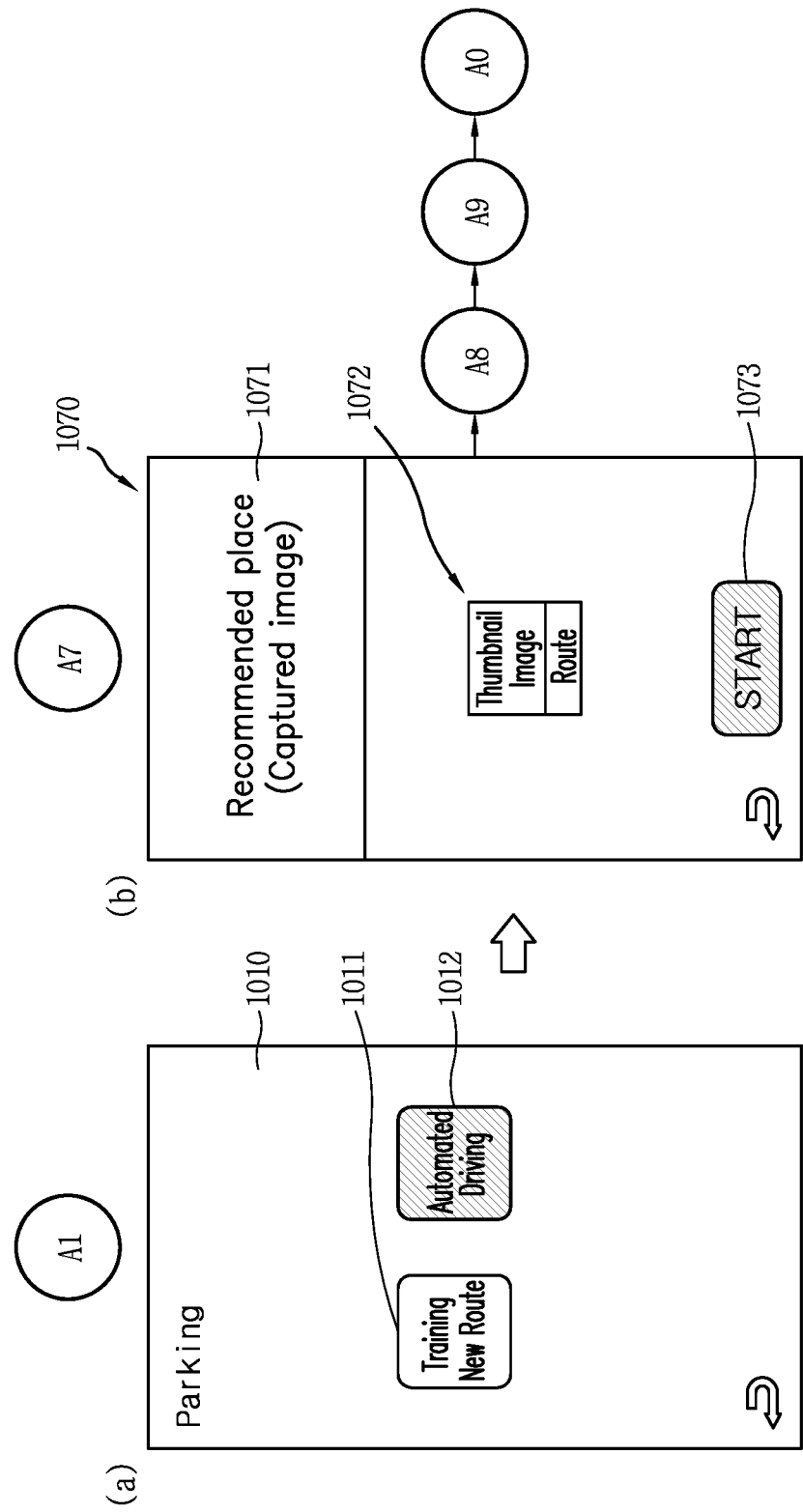

On the other hand, as illustrated in FIG. 21, when the second graphic object 1012 associated with a function of allowing the vehicle to perform autonomous parking-in (or autonomous parking-out) is selected from the first screen information 1010, and then there is one park-in drive information (or park-out drive information) having the current position of the vehicle as a starting point, the processor 870 may automatically select the one park-in drive information (or park-out drive information) from the seventh screen information 1070, as illustrated in FIG. 21.

Moreover, when there is one park-in drive information (or park-out drive information) having the current position of the vehicle as a starting point, the processor 870 may immediately start autonomous parking-in or autonomous parking-out without displaying the seventh screen information 1070.

In addition, when there is one park-in drive information (or park-out drive information) having the current position of the vehicle as a starting point, the image processor 870 may display the seventh screen information 1070, and start the autonomous parking-in or autonomous parking-out of the vehicle based on the park-in drive information (or park-out drive information) on the basis of the elapse of a predetermined time period even though the tenth graphic object 1073 is not selected (not touched).

Then, the processor 870 may complete autonomous parking-in or autonomous parking-out through the steps A8 and A9.

Through this configuration, the present disclosure may provide a new vehicle control method configured to allow the vehicle to perform autonomous parking-in or autonomous parking-out using previously trained park-in drive information or park-out drive information.

Hereinafter, a method of training park-in drive information or park-out drive information through not only a user interface but also vehicle control, or allowing the vehicle to perform autonomous parking-in or autonomous parking-out using previously trained park-in drive information or park-out drive information will be described in more detail.

Figure 22:
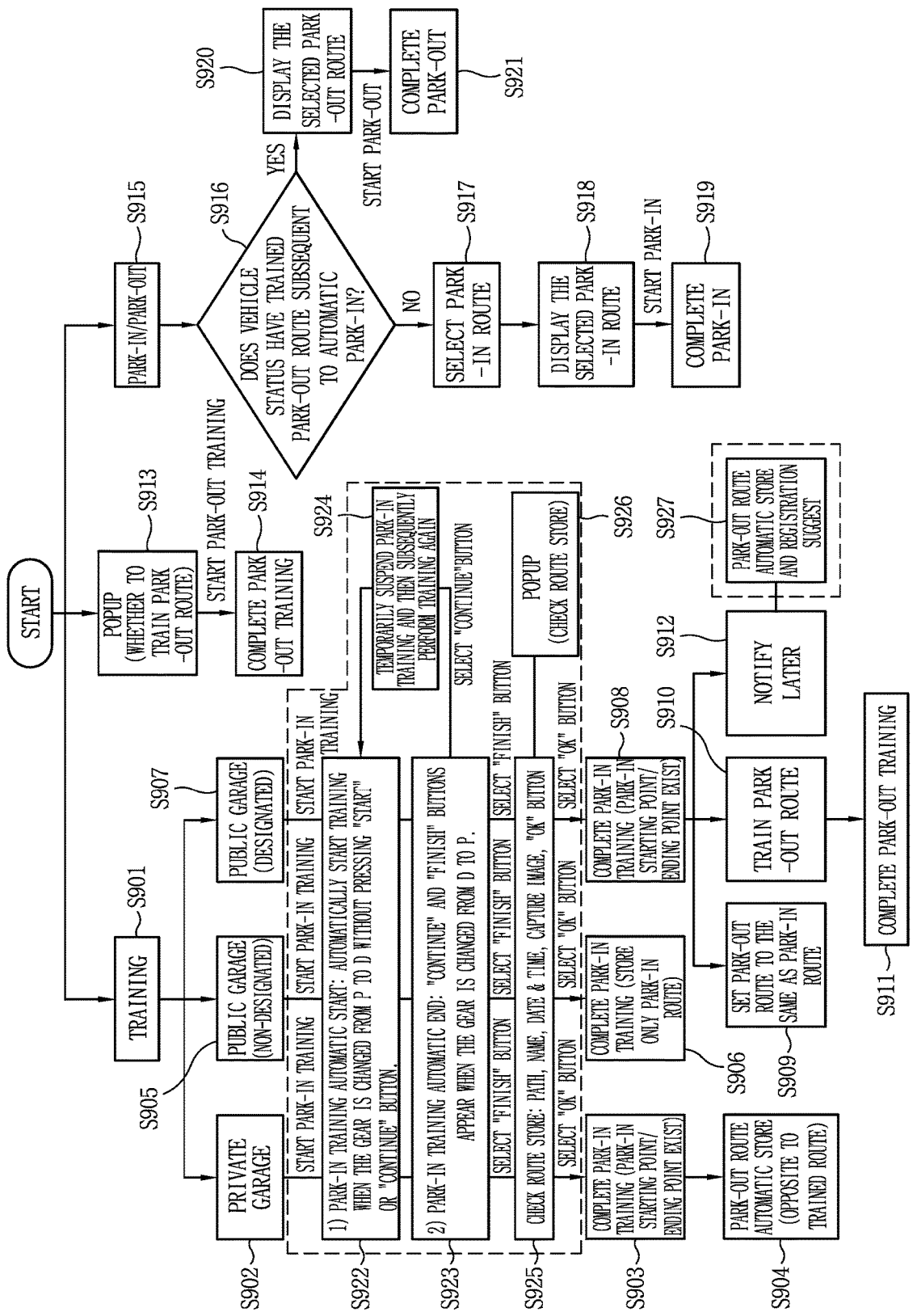
Figure 23:
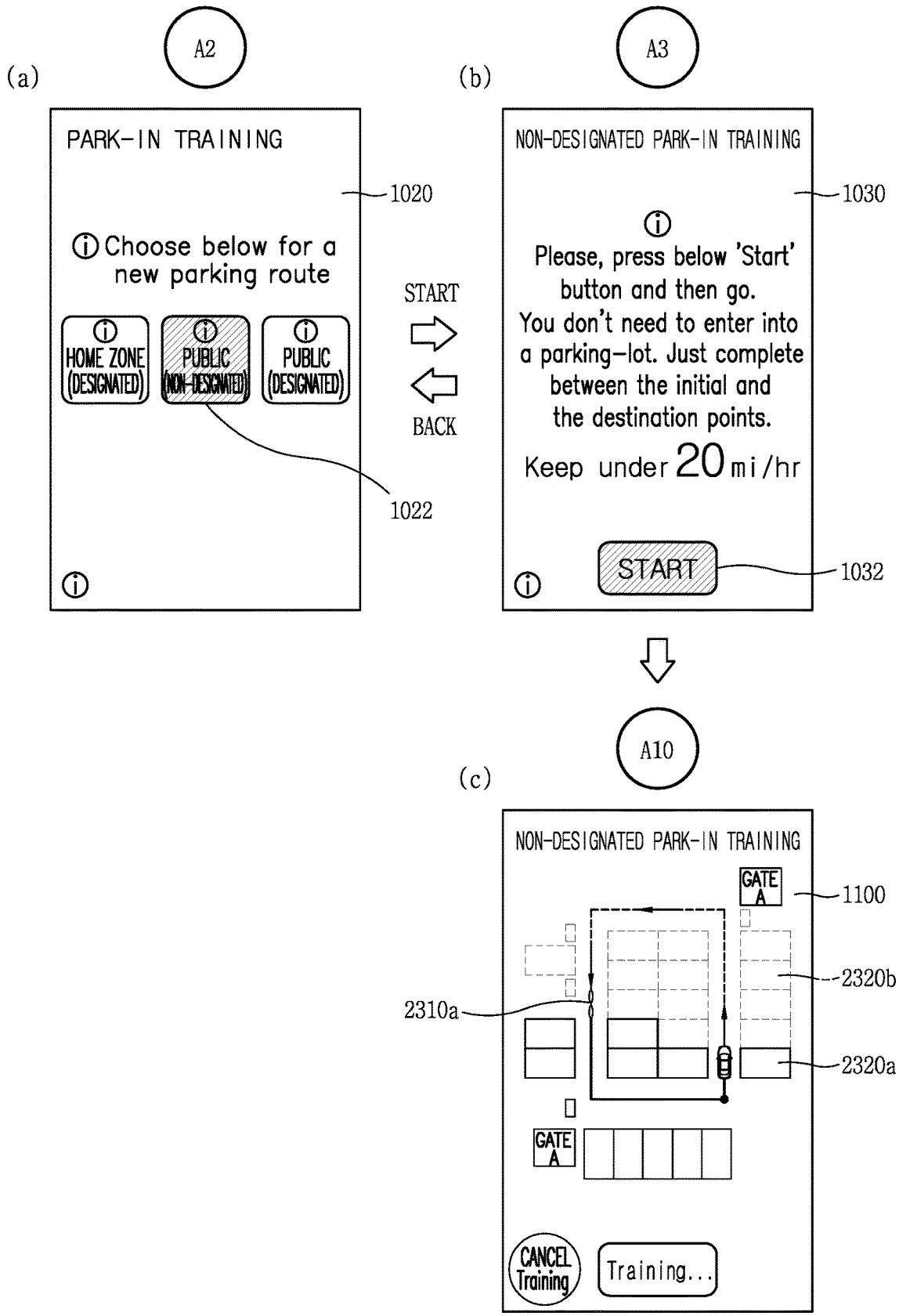
Figure 24:
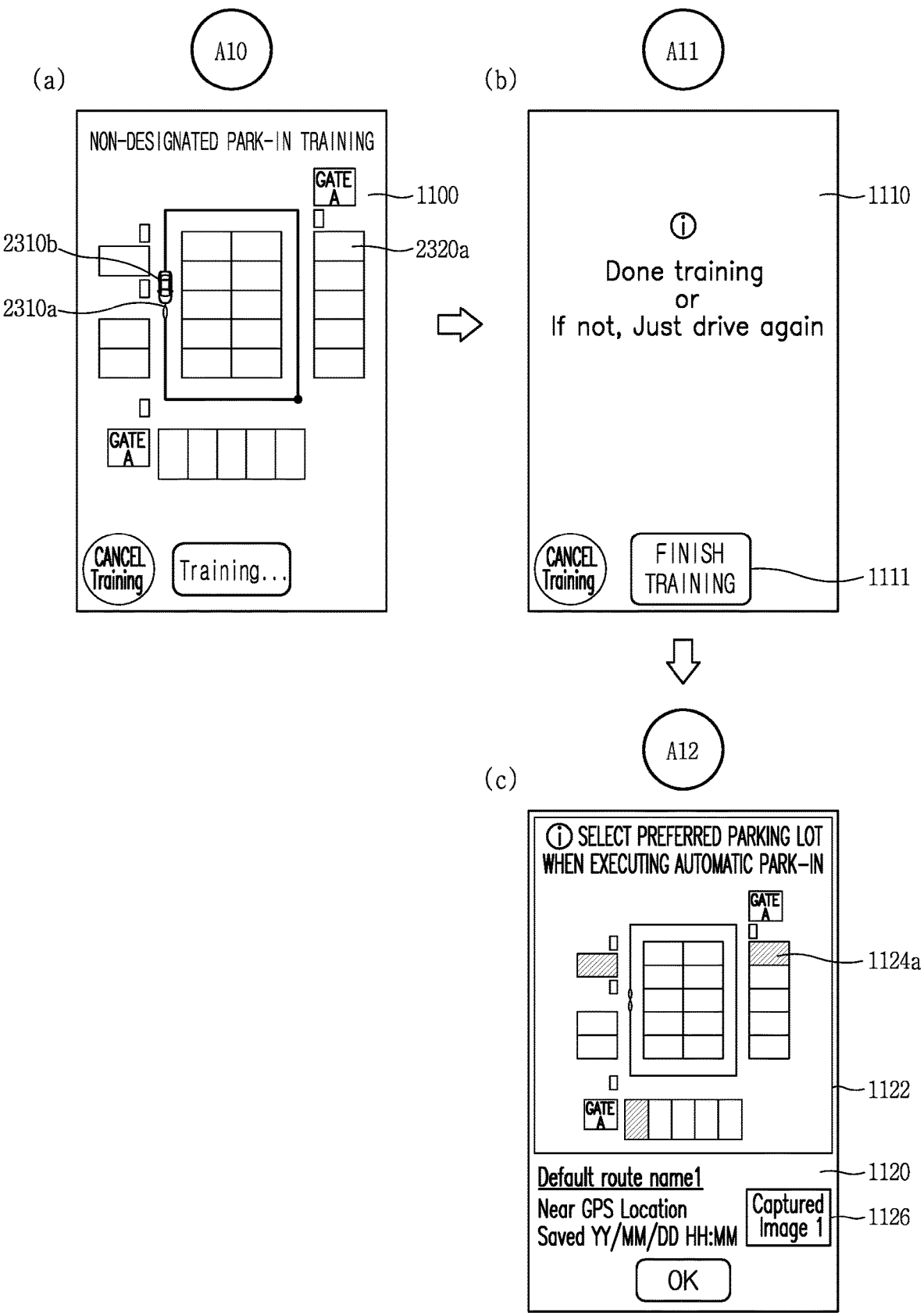
Figure 25:
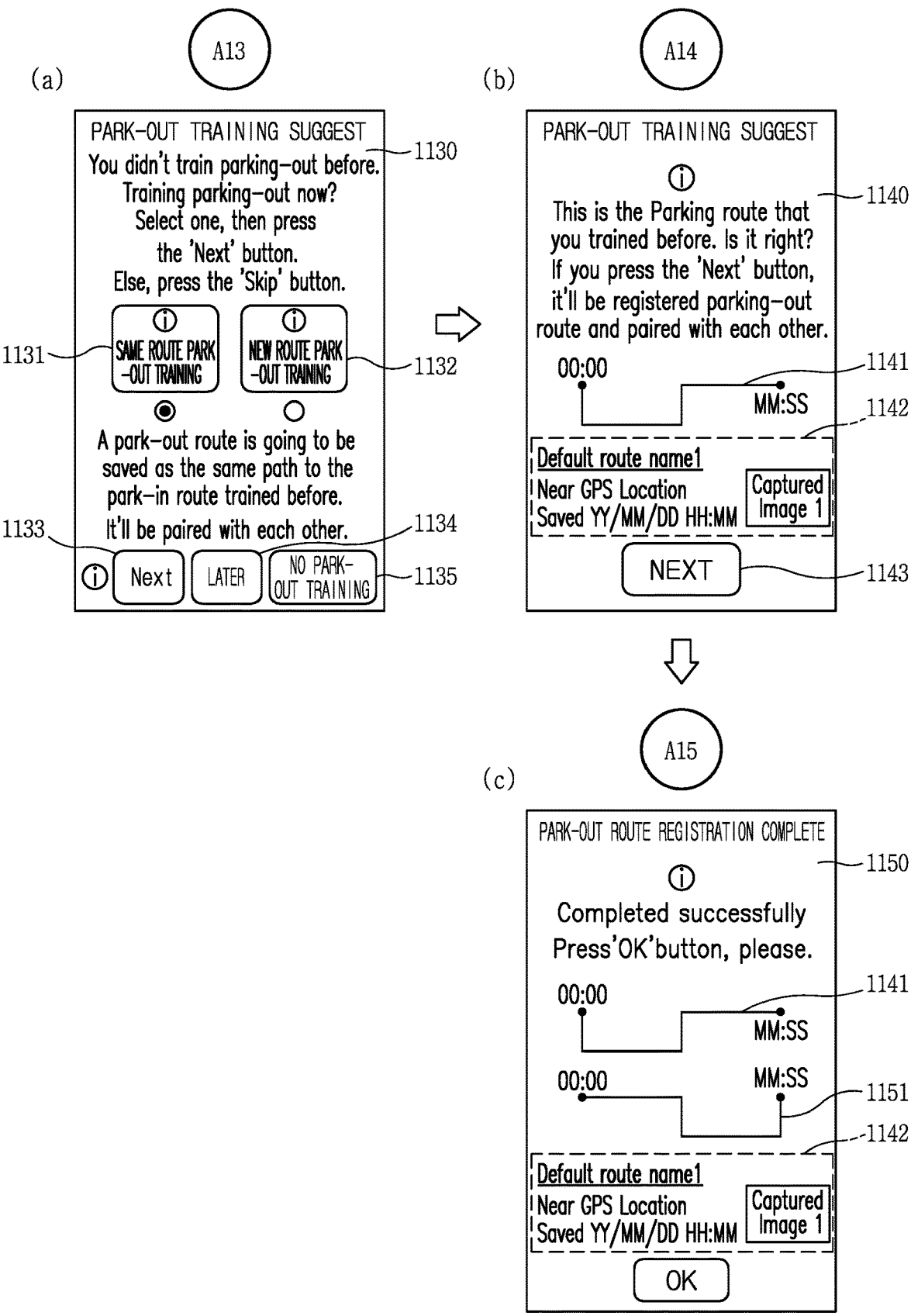
Figure 26:
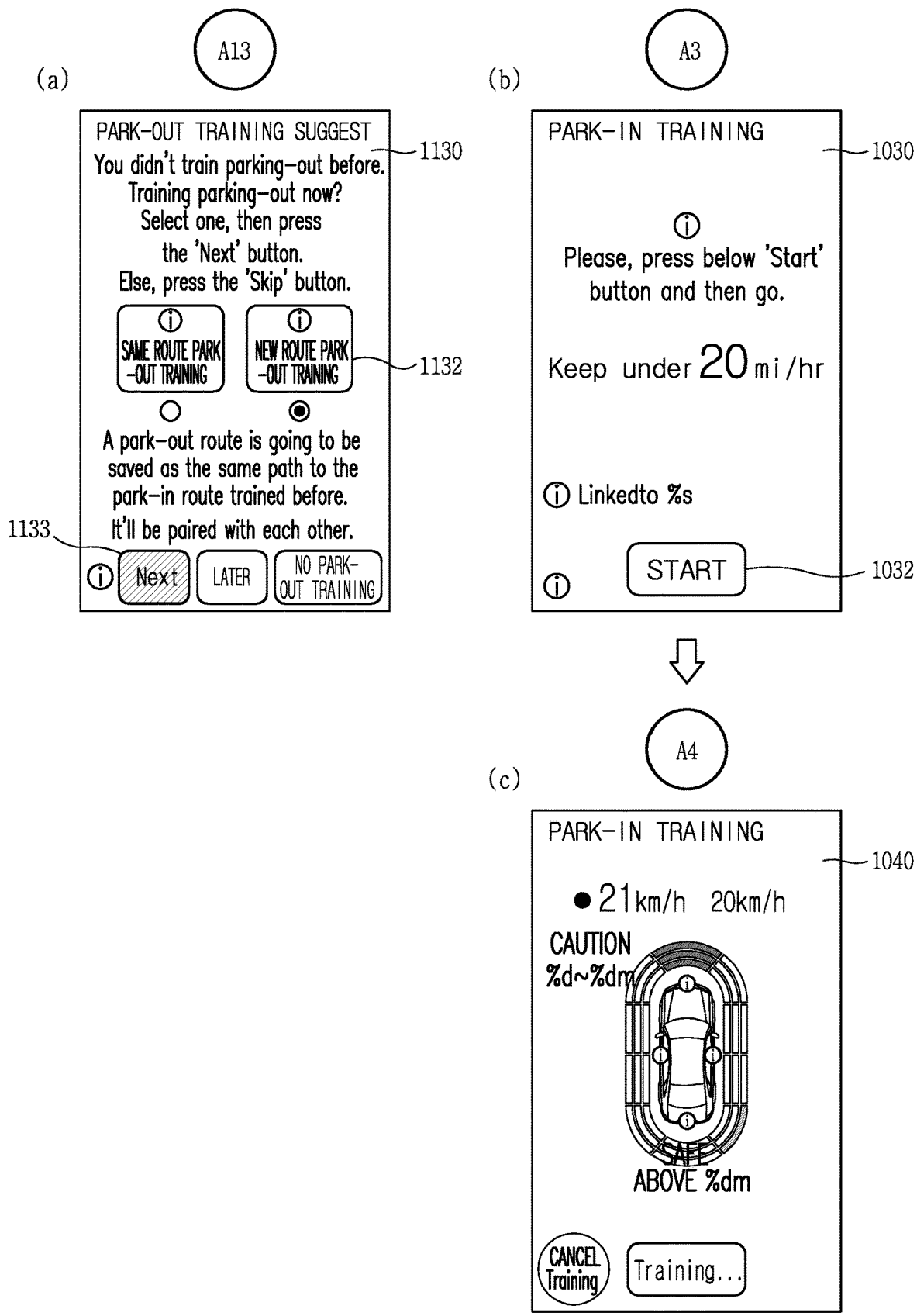

Referring to FIG. 22, the processor 870 may start the training of park-in drive information based on whether a private garage, a public place where no parking place is designated or a public place where a parking place is designated is selected (S902, S905, S907), and then the third graphic object (Start button) displayed on the display unit 830 is selected.

Here, in the present disclosure, it may be possible to not only start training through the display unit 830, but also start the training of park-in drive information based on a change of the gear of the vehicle.

Referring to FIG. 22, the processor 870 may start the training of park-in drive information base on whether a private garage, a public place where no parking place is designated or a public place where a parking place is designated is selected (S902, S905, S907), and then the gear is moved from stop gear (P) (or reverse gear (R)) (S922).

In addition, the processor 870 may stop the training of park-in drive information when the vehicle is in stop gear (P) while training the park-in drive information in a manual driving mode (while driving the vehicle), and display the continue button and the finish button on the display unit 830 (S923).

The continue button and the finish button may be displayed on the fourth screen information 1040 (A4).

Here, when the continue button is selected, the processor 870 may continue the training of the park-in drive information from a time point (point) where it is stopped (S924).

Moreover, the finish button is selected, the processor 870 may display information related to park-in drive information in which the vehicle has been driven in a manual driving mode (trained park-in drive information) and the fifth screen information 1050 configured to store the information (A5) (S925).

At this time, the processor 870 may further perform the process of displaying a popup window for confirming the trained park-in drive information or setting the name of the park-in drive information (S926).

Further, according to the present disclosure, when the notification button is selected later (S912) in a state where the training of the park-in drive information is completed in a public place where a parking space is designated, and then the sixth screen information formed to select a mode of the park-out drive information is displayed, the present disclosure may additionally perform the process (S927) of displaying screen information suggesting that the park-out drive information is automatically generated in a reverse manner of the park-in drive information.

Hereinafter, a user interface and a vehicle control method in a case where a public place 1022 where no parking space is designated is selected when the place information is selected on the second screen information 1020 will be described.

As illustrated in FIG. 23A, when a public place 1022 where no parking space is designated is selected among a plurality of place information included in the second screen information 1020 is selected, the processor 870 may display third screen information 1030 including the third graphic object 1032 associated with the limited driving speed information of the vehicle and a function of starting the training of park-in drive information on the display unit 830.

Then, when the third graphic object 1032 is selected on the third screen information 1030 (or the gear of the vehicle is changed from P to D or P to R), as illustrated in FIG. 23C, the processor 870 may display the tenth screen information 1100 indicating the state of training a driving route at a public place (parking lot) where the vehicle is currently located on the display unit 830 (A10).

The tenth screen information 1100 may be screen information displayed when the public place 1022 where no parking space is designated is selected on the second screen information.

The processor 870 may sense (scan) a parking space at the relevant public place through the sensing unit 820 when training of a driving route is started.

A starting point 2310a of the driving route, the current position information of the vehicle, a driving route of the vehicle, and a parking space 2320a sensed through the sensing unit 820 may be displayed on the tenth screen information 1100.

At this time, as the training of the driving route progresses and the parking space is sensed by the sensing unit 820, the processor 870 may additionally display the sensed parking space 2320a on the tenth screen information 1100. Specifically, the processor 870 may additionally display the sensed parking space 2320a on the tenth screen information 1100 whenever the parking space 2320a is sensed by the training of the driving route.

In other words, the processor 870 may expand the sensed parking space 2320a such that as the parking space 2320a is sensed, it generates a map in the relevant parking lot.

Here, the parking space 2320a may denote a region (space) designated for parking, a region allowed for parking, and a region that is not a region designated for parking but allowed for parking.

Here, the region designated for parking may be distinguished based on a parking line drawn in the parking lot, regardless of whether or not another vehicle exists. The region designated for parking may be allowed for parking when no other vehicle exists, and disallowed for parking when another vehicle exists.

Furthermore, the region allowed for parking may denote a region where no other vehicle exists in a region distinguished by a parking line or a region where another vehicle has parked in the past though it is not a region distinguished by a parking line.

In addition, the region allowed for parking though it is not a region designated for parking may denote a region where another vehicle has already parked or a region where another vehicle has parked in the past.

When the parking space is sensed according to the training of a driving route, the processor 870 may display the parking space 2320a in a different manner according to whether or not the parking space is allowed for parking while being a region designated for parking, whether or not the parking space is disallowed for parking while being a region designated for parking, whether or not the parking space is allowed for parking though it is not a region designated for parking, and whether or not the parking space is disallowed for parking though it is not a region designated for parking.

For example, the processor 870 may display the parking space 2320a on the tenth screen information in a first mode when the parking space is allowed for parking while being a region designated for parking, in a second mode other than the first mode when the parking space is disallowed for parking while being a region designated for parking, in a third mode other than the first and second modes when the parking space is allowed for parking though it is not a region designated for parking, and in a fourth mode other than the first through third modes when the parking space is disallowed for parking though it is not a region designated for parking.

Afterwards, the processor 870 may highlight the parking space satisfying a preset condition when the sensing of the parking space is completed at the relevant public place. It may be a place for recommending a parking place or recommending a place for training park-in drive information for a driver.

Here, the parking space satisfying a preset condition is a space that satisfies parking space elements set by the driver among regions allowed for parking, and may include a space close to an entrance, a space next to a pillar, a space having a large parking area or a space having a sufficient truck opening and closing area.

At this time, when highlighting the parking space, the processor 870 may highlight a parking space allowed for parking while being a region designated for parking with a higher priority than a parking space allowed for parking though it is not a region designated for parking.

On the other hand, when a scan at the relevant public place is performed more than once, or when information related to the parking space of the public place is received from a server installed in the relevant public place, the processor 870 may also display the space 2320b that is not sensed (scanned) on the tenth screen information prior to proceeding the training of the driving route.

It is because the processor 870 may have stored information related to the parking space of the relevant public place when it has been scanned once in the relevant public place or information related to the parking space has been received from the server in the past.

Here, the space 2320b that is not sensed (scanned) may be displayed on the display unit 830 in a different manner from a space 2320a that is sensed (scanned).

The space 2320b that is not sensed (scanned) may be changed to the space 2320a that is sensed (scanned) in real time as the training of the vehicle progresses.

In addition, when any one of the sensed parking spaces 2320a is selected in a state where the vehicle does not reach a starting point that has started the training (i.e., while training (sensing, scanning) is being proceeded), the processor 870 may set the sensed parking space 2320a as a preferred space.

The preferred space may be displayed in a specific manner (for example, displayed with a bold effect or a highlight effect or a specific color) on the tenth screen information.

The preferred space may be set to a place with the highest priority when highlighting the parking space subsequent to completing the training in the relevant public place.

On the other hand, as illustrated in FIG. 24A, when the vehicle reaches the starting point 2310a that has started the training of the vehicle, the processor 870 may set the current position of the vehicle to the ending point 2310b.

Besides, when the starting point 2310a and the ending point 2310b of the driving route trained by the vehicle are located within a predetermined distance, the processor 870 may display the eleventh screen information 1110 for checking whether or not the training is to be completed on the display unit 830 as illustrated in FIG. 24B (A11).

The eleventh screen information 1110 may include a cancel button for canceling the trained driving route and a finish button 1111 for completing the training.

When the cancel button is selected, the processor 870 may delete the trained driving route and display the start screen or the first screen information on the display unit 830.

Moreover, when the cancel button is selected, the processor 870 may display a retraining button configured to restart training on the eleventh screen information 1110.

In addition, the processor 870 may further display the continue button (Continue Training) associated with a function of continuing the training on the eleventh screen information 1110.

When the finish button is selected, the processor 870 may display a graphic object 1122 for selecting a preferred parking space among the sensed parking spaces and twelfth screen information 1120 including information related to the trained driving route may be displayed on the display unit 830 as illustrated in FIG. 24C (A12).

When at least one 1124a of the scanned parking spaces included in the graphic object 1122 is selected, the processor 870 may store the selected at least one parking space 1124a associated with the trained driving route in the memory 840.

At this time, the information related to the trained driving route may include at least one image 1126 captured through the camera during the training.

Then, the processor 870 may display the graphic object 1122 when the vehicle is located in a public place where no parking space is designated and then an autonomous park-in request is received, and drive the vehicle along the trained driving route to the selected parking space when any one parking space is selected from the graphic object 1122.

Then, parking to the selected parking space may be performed through a manual driving mode, performed according to a preset parking algorithm, or performed using part of park-in drive information trained in another place (driving information parked at the parking space).

On the other hand, as illustrated in FIG. 25A, when the training of the park-in drive information is completed, a thirteenth screen information 1130 for selecting a park-out driving mode may be displayed on the display unit 830 (A13).

The thirteenth screen information may be automatically displayed on the display unit 830 under the control of the processor 870, for an example, when the training of the park-in drive information is completed in in a public place where a parking space is designated and then the notification button is selected later.

The thirteenth screen information 1130 may correspond to the sixth screen information 1060 described above.

The thirteenth screen information 1130 may include a graphic object 1131 associated with a function of training park-out drive information on a driving route similar to the driving route of the park-in drive information and a graphic object 1132 associated with a function of training new park-out drive information.

The graphic object 1131 associated with a function of training park-out drive information on a driving route similar to the driving route of the park-in drive information may be associated with a function of generating (training) park-out drive information to park the vehicle out in a reverse manner to driving that has trained the foregoing park-in drive information (or roll back the park-in drive information or rewind the park-in drive information.

Furthermore, the thirteenth screen information 1130 may include a next button 1133 for proceeding to the next step, a button 1134 for training park-out drive information at a later time, and a button 1135 formed so as not to train park-out drive information.

For an example, as illustrated in FIG. 25A, when the graphic object 1131 associated with a function of training park-out drive information on a driving route similar to the driving route of the park-in drive information is selected and then the next button 1133 is selected, the processor 870 may display fourteenth screen information 1140 including the driving route 1141 of the park-in drive information and information 1142 related to the park-out drive information on the display unit 830 as illustrated in FIG. 25B (A14).

Then, when the next button is selected, the processor 870 may generate park-out drive information formed to drive the vehicle in a reverse manner only to the driving while having the same driving route as the driving route 1141 of the park-in drive information, and store the generated park-out drive information associated with the park-in drive information in the memory 840.

When the next button is selected, the processor 870 may display fifteenth screen information 1150 including the driving route 1141 of the park-in drive information stored in the memory 840, the driving route 1151 of the park-out drive information, and the information 1142 related to the park-out drive information on the display unit 830 (A15).

On the other hand, as illustrated in FIG. 26A, when the graphic object 1132 associated with a function of training new park-out drive information is selected and then the next button 1133 is selected on the thirteenth screen information 1130, the processor 870 may display the limited driving speed information of the vehicle required to train park-out drive information and the third screen information 1030 including the third graphic object 1032 associated with a function of starting the training of the park-out drive information on the display unit 830.

Then, when the third graphic object 1032 is selected from the third screen information 1030, the processor 870 may start the training of the park-out drive information, and display the fourth screen information 1040 that displays information related to the vehicle that is generated during the training on the display unit 830. On the other hand, when the notification button 1134 is later selected on the thirteenth screen information 1130 as illustrated in FIG. 27A, the processor 870, may generate park-out drive information formed to drive the vehicle only in a driving manner while having the same driving route as the driving route 1141 of the park-in drive information, and store the generated park-out drive information associated with the park-in drive information in the memory 840 as illustrated in FIG. 27B.

When the next button is selected later, the processor 870 may display fifteenth screen information 1150 including the driving route 1141 of the park-in drive information stored in the memory 840, the driving route 1151 of the park-out drive information, and the information 1142 related to the park-out drive information on the display unit 830 (A15).

Figure 27:
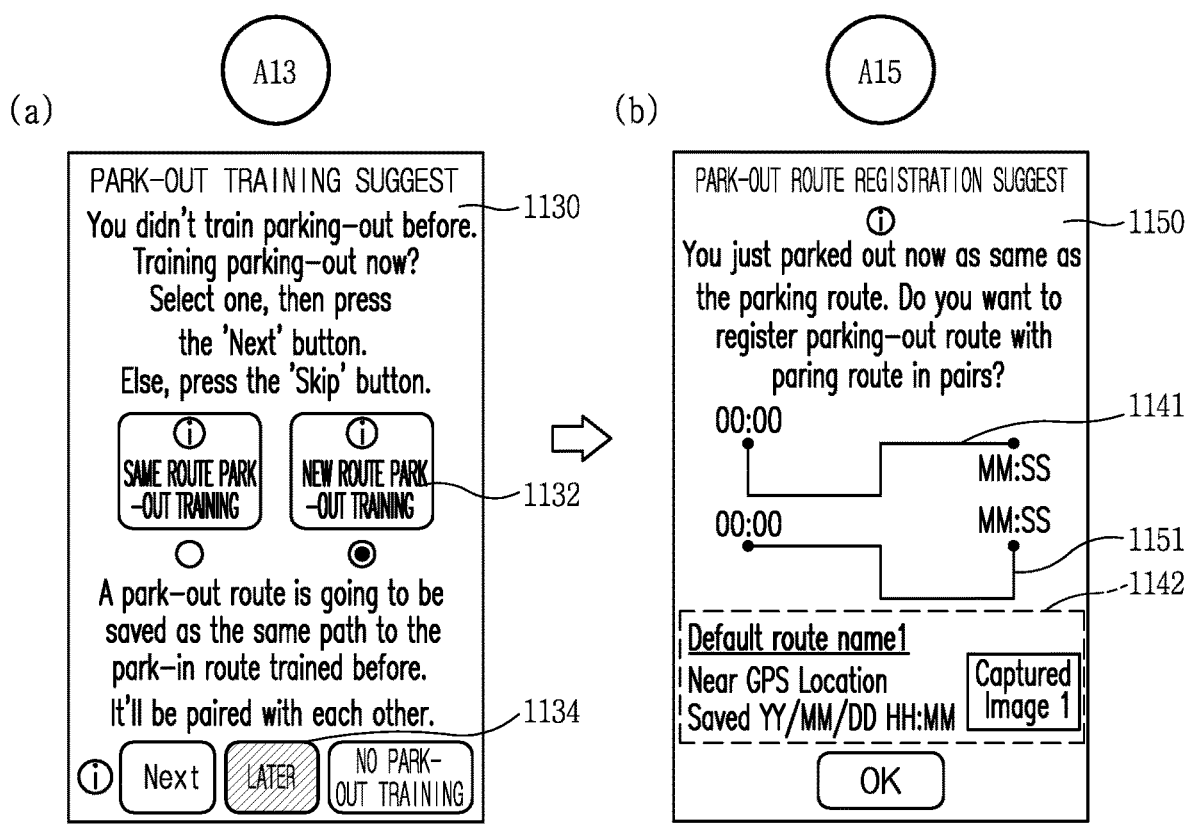

In other words, in case of FIG. 27, when the notification button 1134 is selected later, the processor 870 may generate the park-out drive information to perform driving only in a reverse manner while having the same route as the park-in drive information, and store the generated park-out drive information associated with the park-in drive information in the memory.

Figure 28:
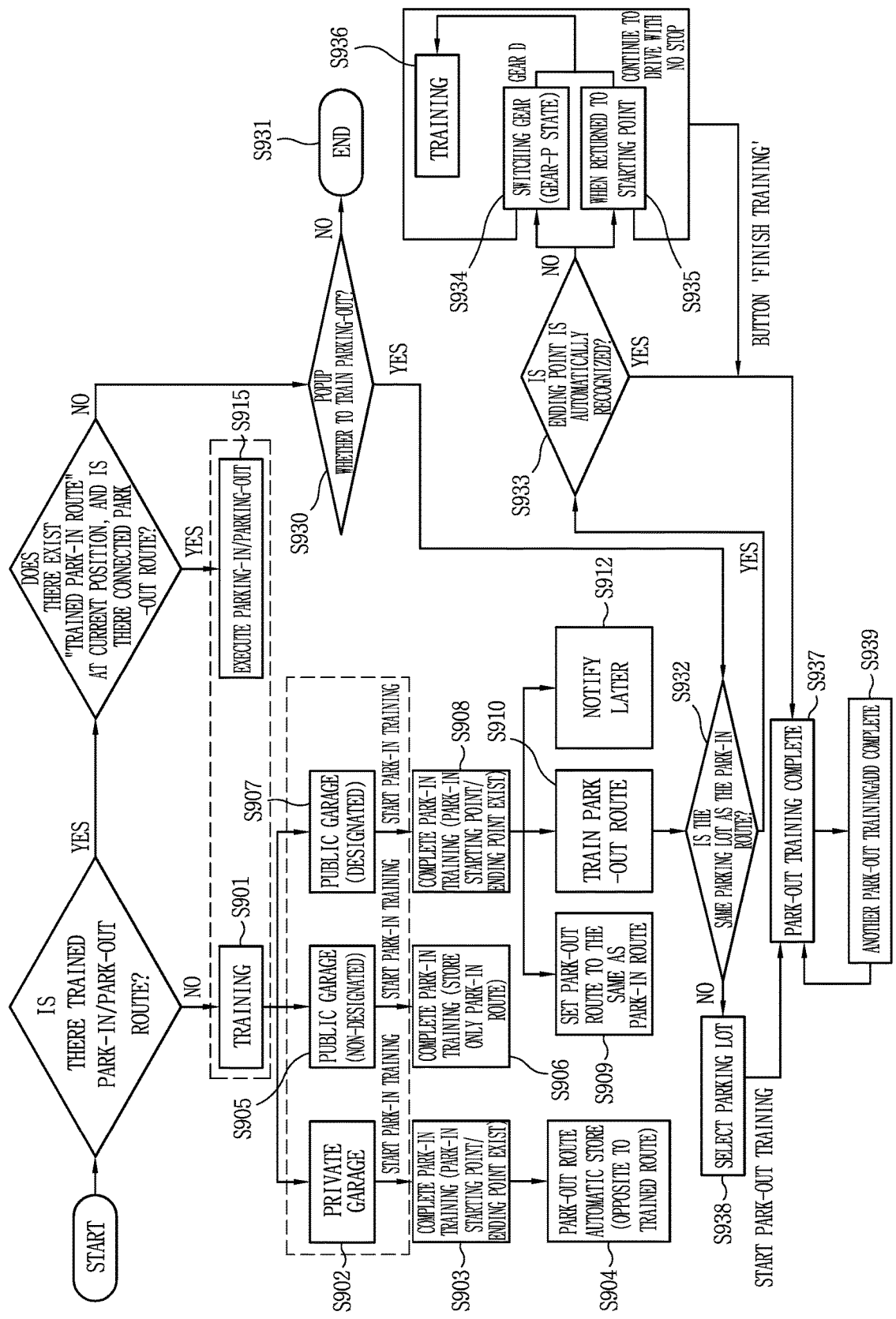

On the other hand, referring to FIG. 28, when a parking application is executed, the processor 870 of the present disclosure may preferentially determine whether or not there exists a trained park-in route or park-out route.

Here, the park-in route may denote park-in drive information, and the outgoing path may denote park-out drive information.

Here, when there is no trained park-in or park-out route, the processor 870 may immediately display the second screen information without first screen information on the display unit 830.

On the contrary, when there exists a trained park-in route, the processor 870 may determine whether or not there exists a park-out route associated with the trained park-in route.

When a park-out route is associated with the trained park-in route, the processor 870 may perform autonomous parking-in according to the park-in route or perform autonomous parking-out according to the park-out route based on the user's request (S915).

Here, when there exists a trained park-in route but a park-out route is not associated with the relevant park-in route, a popup window for inquiring whether or not to perform park-out training on the display unit 930.

When a user request not to perform park-out training is received, processor 870 may terminate the parking application (S931).

On the other hand, when a user request to perform park-out training is received, the processor 870 may determine whether or not an existing park-in route and the current vehicle are located in the same parking lot based on the communication unit 810 and the location information associated with the park-in route.

Here, the processor 870 may perform the process of automatically recognizing the ending point when the existing park-in route and the present vehicle are in the same parking lot (S933). Here, the ending point may correspond to the starting point of the park-in route.

Here, when the ending point is recognized, the processor 870 may set a park-out route in the same manner as the park-in route, and generate park-out drive information so as to drive in a reverse manner to the driving of the park-in drive information, and complete the training (S937).

On the other hand, when the ending point is not recognized, the processor 870 may train a new park-out route (park-out drive information) through the manual driving mode.

Here, when the gear is changed from P to D (or R) (S934), the park-out drive information may be trained (generated) (S936).

When the vehicle reaches the starting point (starting point of starting the training of the park-out drive information) subsequent to the training of the park-out drive information (park-out route) through the manual driving mode (S935), the processor 870 may complete the training of the park-out drive information based on the selection of the finish button (S937).

On the other hand, when the current position of the vehicle and the position information of the driving route (park-in driving route) do not match, the processor 870 may display screen information configured to select a parking lot on the display unit 830 (S938).

Then, when a parking lot is selected from the relevant screen information, the processor 870 may start the training of the park-out drive information and complete the park-out training (S937).

When the park-out training is completed, the processor 870 may display screen information for inquiring whether or not to train an additional park-out route (S939).

Then, when training an additional park-out route according to the user's selection, the processor 870 may store a plurality of park-out routes (a plurality of park-out drive information) associated with the existing park-in route (park-in drive information).

Referring to FIG. 29, a home screen including an icon 2900 of a parking application may be displayed on the display unit 830.

When the icon 2900 of the parking application is selected, the processor 870 may display popup information 1002 for inquiring whether or not to train park-out drive information on the display unit 830, as illustrated in FIG. 29B, when there exists park-in drive information trained at the current position, but there exists no park-out drive information associated therewith.

Then, when the training of park-out drive information is requested according to the user's request, as illustrated in FIGS. 29C and 29D, the processor 870 may sequentially display third screen information 1030 including the limited driving speed information of the vehicle required to train park-in drive information and a third graphic object associated with a function of starting the training of the park-in drive information and fourth screen information 1040 for displaying information related to the vehicle generated during the training on the display unit 830.

Figure 30:
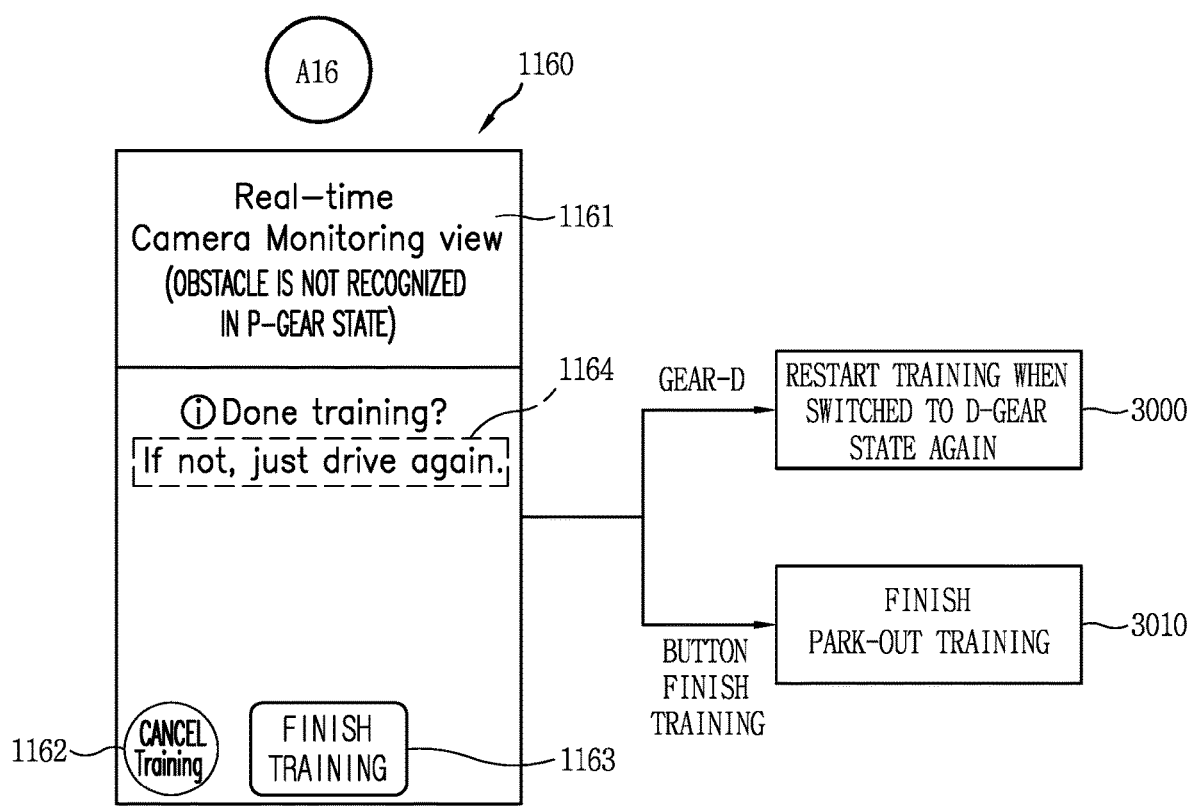

Referring to FIG. 30, when the vehicle stops since there exists an obstacle disallowing more driving during while training the park-in drive information or the park-out drive information, the processor 870 may display sixteenth screen information 1160 including a preview image 1161 received through the camera and information 1164 for inquiring whether or not to continue the training of the park-in drive information. The sixteenth screen information 1160 may include a cancel button 1162 for canceling the training of the park-in drive information or the park-out drive information and a finish button 1163 associated with a function of completing the training.

Here, when the gear is moved from P to D or the training is proceeded after the driving of the vehicle is stopped, the processor 870 may continue to proceed the training of the park-in drive information or the park-out drive information (3000).

On the contrary, when the finish button 1163 is selected from the sixteenth screen information 1160 while the vehicle is stopped, the park-in drive information or park-out drive information that has been trained up to now may be stored in the memory 840 (3010).

In other words, when an object obstructing the driving of the vehicle is sensed through the sensing unit 820 and due to this, the vehicle stops, the processor 870 may activate the camera to further display an image received through the camera on the display unit 830.

Figure 31:
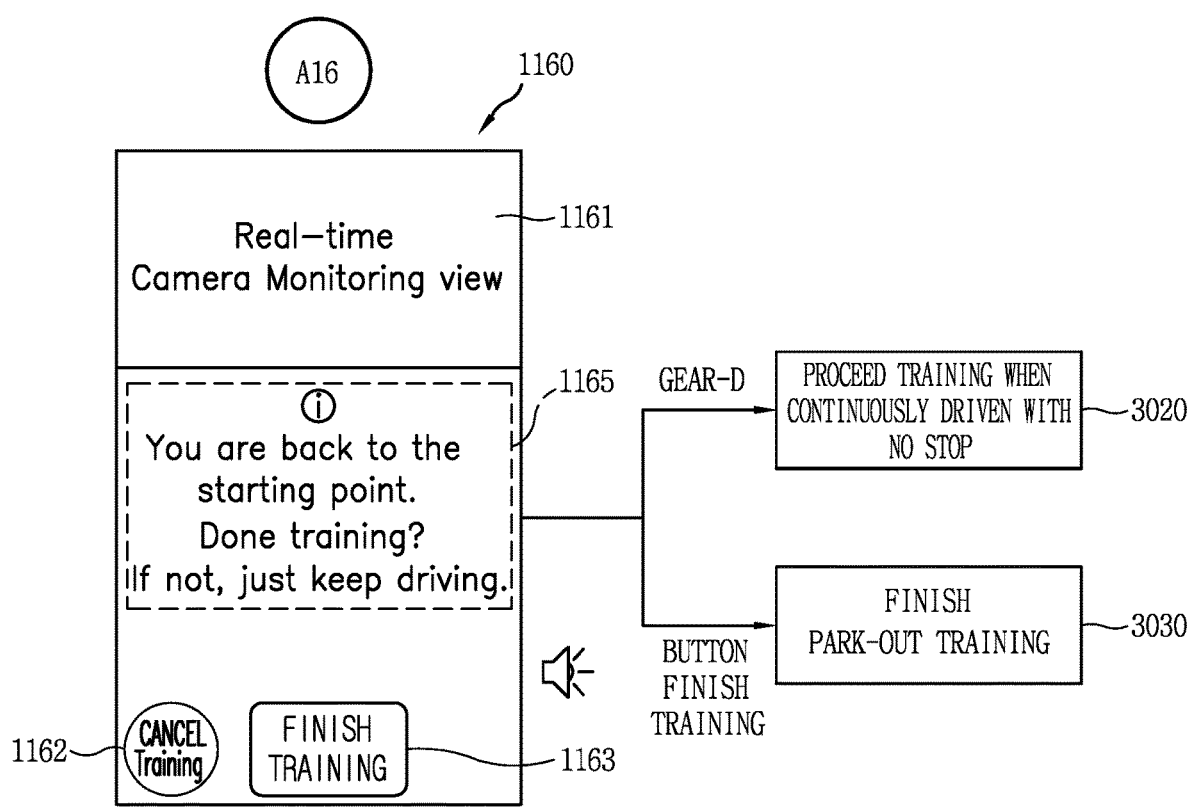
Figure 32:
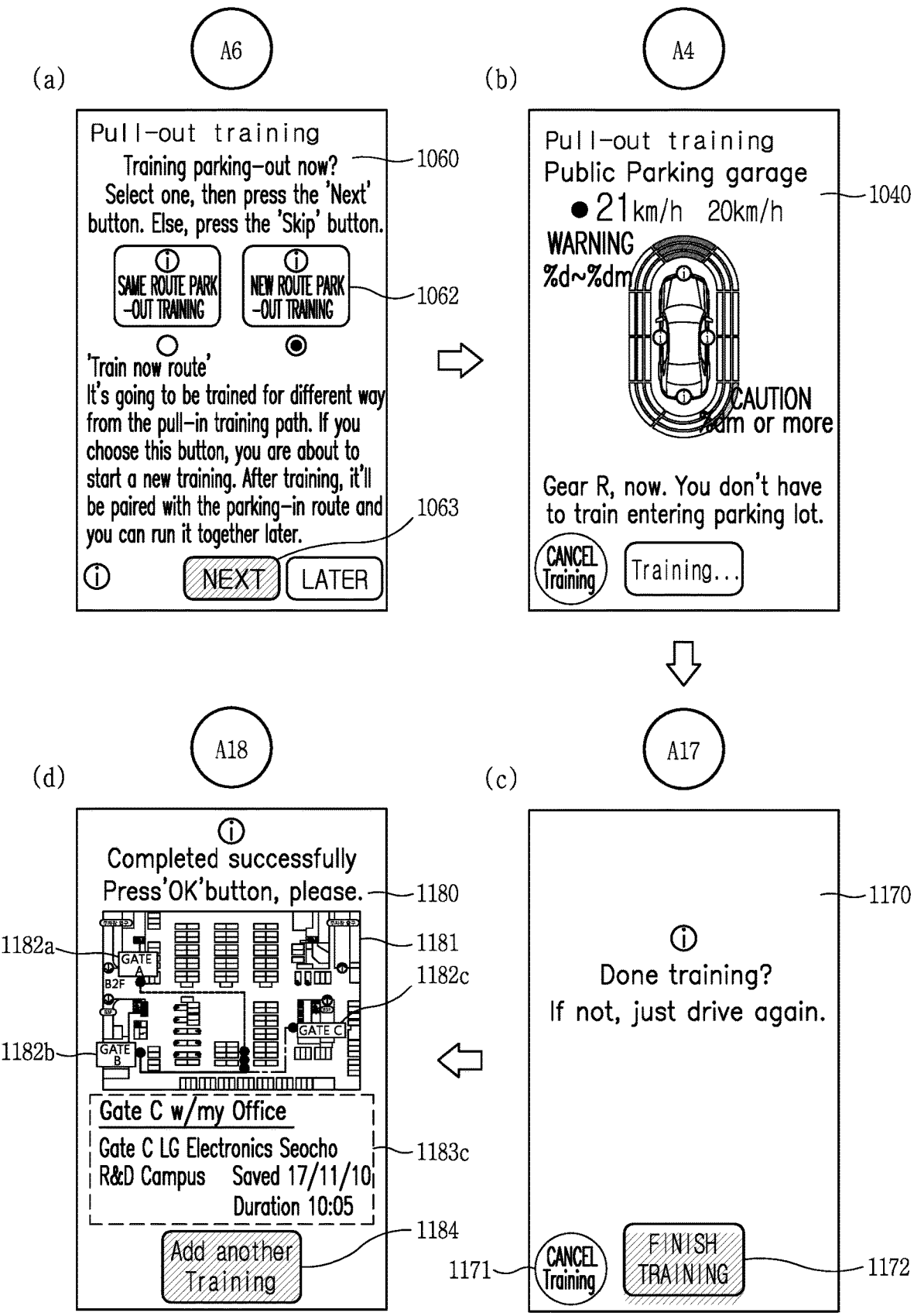

On the other hand, as illustrated in FIG. 31, when the vehicle has reached the start pointing of starting the training of the park-in drive information or park-out drive information in the state where the sixteenth screen information 1160 is displayed, the processor 870 may display information 1165 for inquiring whether or not to complete the training on the sixteenth screen information 1160.

In this state, the processor 870 may continue to proceed the training when manual driving is continuously carried out (3020).

In some implementations, when the finish button 1163 is selected while the information 1165 is displayed, the processor 870 may store the park-in drive information or park-out drive information that has been trained up to now in the memory 840 (3030).

On the other hand, as illustrated in FIG. 32A, when a graphic object 1062 formed to train new park-out drive information is selected and then the next button 1063 is selected on the sixth screen information 1060, the processor 870 may display fourth screen information indicating information related to the vehicle generated during the training, as illustrated in FIGS. 32B and 32C.

In this state, when the vehicle is stopped (for example, when the vehicle is stopped due to a brake operation or when the gear of the vehicle becomes P-gear), the processor 870 may display seventeenth screen information 1170 for inquiring whether or not the training has been completed on the display unit 830 (A17).

The seventeenth screen information 1170 may include a cancel training button 1171 and a finish training button 1172.

In this state, when the vehicle starts driving again (or the gear of the vehicle becomes D-gear or R-gear), the processor 870 may display the fourth screen information 1040 again on the display unit 830.

On the contrary, when the complete training button 1172 is selected on the seventeenth screen information 1170, the processor 870 may display eighteenth screen information 1180 including information related to the trained park-out drive information on the display unit 830 as illustrated in FIG. 32D.

The eighteenth screen information 1180 may include map information 1181 including at least one parking lot entrance 1182a, 1182b and 1182c, information related to the trained park-out drive information (e.g., name of park-out drive information, location, time, driving period of time, etc.).

In addition, the eighteenth screen information 1180 may include a graphic object 1184 associated with a function of additionally training park-out drive information.

When the graphic object 1184 is selected, the processor 870 may rewind the park-out drive information to move the vehicle to the starting point of the park-out drive information.

Then, the processor 870 may additionally train park-out drive information to be driven through the manual driving mode.

Then, the processor 870 may store a plurality of park-out drive information associated with one park-in drive information in the memory.

Furthermore, the eighteenth screen information 1180 may further display the map information 1181 of a parking lot that has trained park-out drive information, and park-out drive information displayed on the map information.

When there are a plurality of entrances allowing parking-out in the parking lot, and the park-out drive information is any one of the plurality of entrances (for example, Gate C 1182c), the processor 870 may further display a driving route for notifying that additional park-out drive information can be trained with the remaining entrances (Gate A 1182a, Gate B 1182b) on the map information 1181.

The present disclosure may further display a driving route indicating that the additional park-out drive information can be trained on the map information, thereby further suggesting or recommending the driver to train the additional park-out drive information.

In addition, when the training of the park-out drive information of any one of the plurality of inlets (for example, Gate C 1182c) is completed, and there exists a history in which the training of the park-out drive information to another entrance was carried out in the past, the processor 870 may display park-out drive information (corresponding to the history) that has been previously carried out in the relevant parking lot (for example, park-out drive information for parking out of Gate A 1182a and park-out drive information for parking out of Gate B 1182b) together with park-out drive information in which the training has been completed (for example, park-out drive information for parking out of Gate C 1182c) on the map information.

Figure 33:
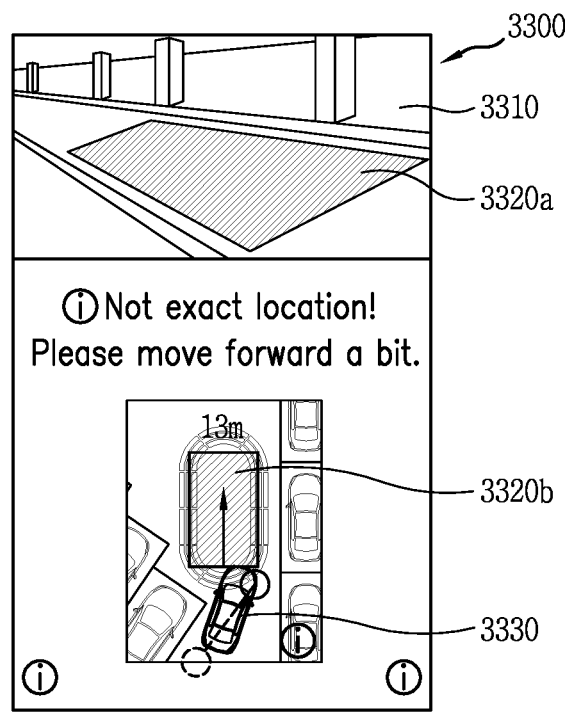

On the other hand, as illustrated in FIG. 33, when the vehicle is to be autonomously parked in or autonomously parked out using previously trained park-in drive information or park-out drive information, there may be a case where the starting point of the park-in drive information or the starting point of the park-out drive information does not correspond to the current position of the vehicle.

In this case, the processor 870 may activate the camera of the sensing unit 820, and display a graphic object 3320a indicating the starting point of the park-in drive information (or park-out drive information) to overlap with a preview image 3310 received through the camera.

Furthermore, the processor 870 may display a graphic object 3330 indicating the current position of the vehicle and a graphic object 3320b indicating the position of the starting point, together with the preview image 3310, on the display unit 830. In addition, the display unit 830 may also further display distance information indicating a distance between the current vehicle and the starting point.

At this time, the graphic object 3330 indicating the current position of the vehicle may be changed in its display position based on the vehicle being driven in a manual driving mode.

On the other hand, when a preset type of touch (e.g., a drag touch) is applied to the graphic object 3330 indicating the current position of the vehicle, the processor 870 may allow the vehicle to perform autonomous driving based on a trajectory to which the touch is applied.

At this time, the processor 870 may allow the vehicle to perform autonomous parking-in (or autonomous parking-out) along the park-in drive information (or park-out drive information) when the position of the vehicle and the position of the starting point are the same.

As illustrated in FIG. 34, the processor 870 may display the park-in drive information 3400 that has been trained up to the present on the display unit 830 based on the selection of the fifth graphic object 1045 (rollback button).

The place where the vehicle is located at the time point when the fifth graphic object 1045 is selected may be a place corresponding to a first point (current position, rollback start) of the park-in drive information.

In addition, when a second point other than the first point is selected in the park-in drive information 3400 displayed on the display unit 830, the processor 870 may drive the vehicle in a reverse manner to driving that has been trained up to now to a place corresponding to the second point using the trained park-in drive information.

The second point may denote a point on a route that the vehicle has driven since the starting of the training of the park-in drive information.

Here, driving the vehicle in a reverse manner to driving that has been trained up to now using the trained park-in drive information may include the meaning of rolling back the vehicle using the park-in drive information or rewinding the vehicle using the park-in drive information.

In other words, driving the vehicle in a reverse manner to driving that has been trained up to now may denote driving the vehicle in a reverse manner to a driving route that has been trained up to now.

For example, when the vehicle has trained park-in drive information while driving forward on a specific driving route through a manual driving mode, the processor 870 may drive the vehicle backward along the specific driving route based on the selection of the fifth graphic object 1045.

For another example, when the vehicle has trained park-in drive information while driving backward on a specific driving route in a manual driving mode, the processor 870 may drive the vehicle forward along the specific driving route based on the selection of the fifth graphic object 1045.

In other words, the fifth graphic object (rollback) 1045 of the present disclosure may denote linking a function of driving the vehicle in a reverse manner using a driving manner (driving pattern, driving route) that has been trained up to the present.

As illustrated in FIG. 34A, when the vehicle is driven from the first point to the second point, in a reverse manner to driving that has been trained up to now, the processor 870 may delete park-in drive information from the first point (a point where the rollback has been started) to the second point (a point selected by the user) from the trained park-in drive information.

Moreover, as illustrated in FIG. 34B, when the fifth graphic object 1045 is selected, the processor 870 may display at least one graphic object 3410a, 3410b, 3410c (e.g., a bookmark) formed to select one point (second point) of the park-in drive information that has been trained up to now.

When any one of the at least one graphic object 3410a, 3410b, 3410c is selected, the processor 870 may determine a point corresponding to the selected graphic object as a second point, and rewind the vehicle to a place corresponding to the second point (i.e., the vehicle may be driven in a reverse manner to driving that has been trained up to now).

In addition, the processor 870 may delete park-in drive information from a first point to a second point corresponding to the selected graphic object (e.g., 3410a). The relevant deletion may be carried out based on the vehicle being driven in a rewind manner to the second point.

Moreover, when the vehicle is driven in a rewind manner to the second point after the fifth graphic object 1045 is selected, the processor 870 may display a graphic object for stopping the driving of the vehicle and a graphic object for restarting the training of the park-in drive information, and the like, on the fourth screen information.

Figure 35:
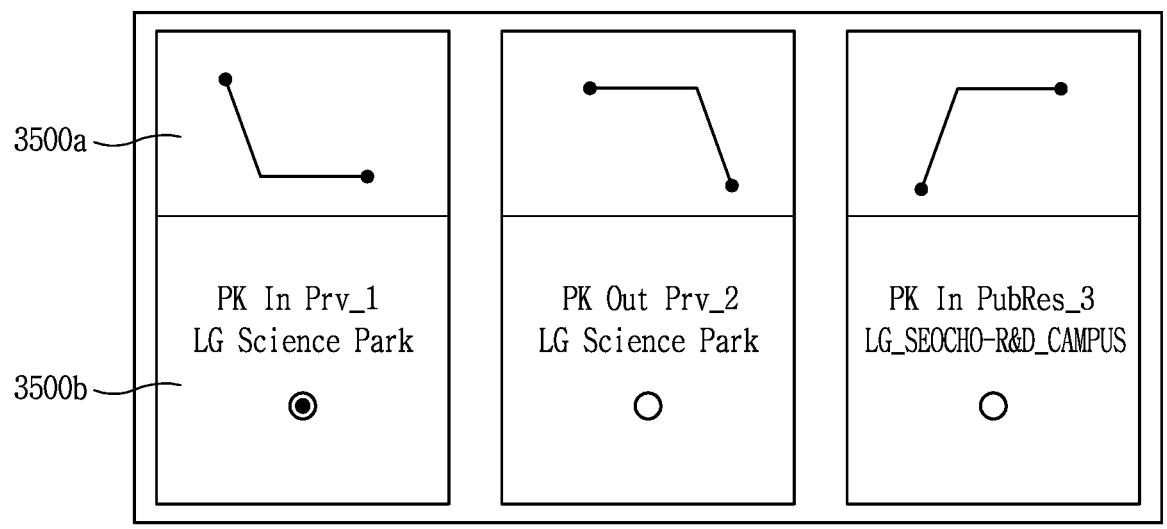

On the other hand, when at least one previously stored park-in drive information is displayed on seventh screen information 1070 displayed as the second graphic object associated with a function of autonomously parking the vehicle in based on the previously trained park-in drive information (or park-out drive information), the processor 870 may display a driving route 3500a and the name 3500b of the park-in drive information together as illustrated in FIG. 35.

Furthermore, although not shown in the drawing, the seventh screen information 1070 may include at least one of an image captured through the camera when training each park-in drive information, the driving route 3500a, and the name 3500b of the park-in drive information.

Figure 36:
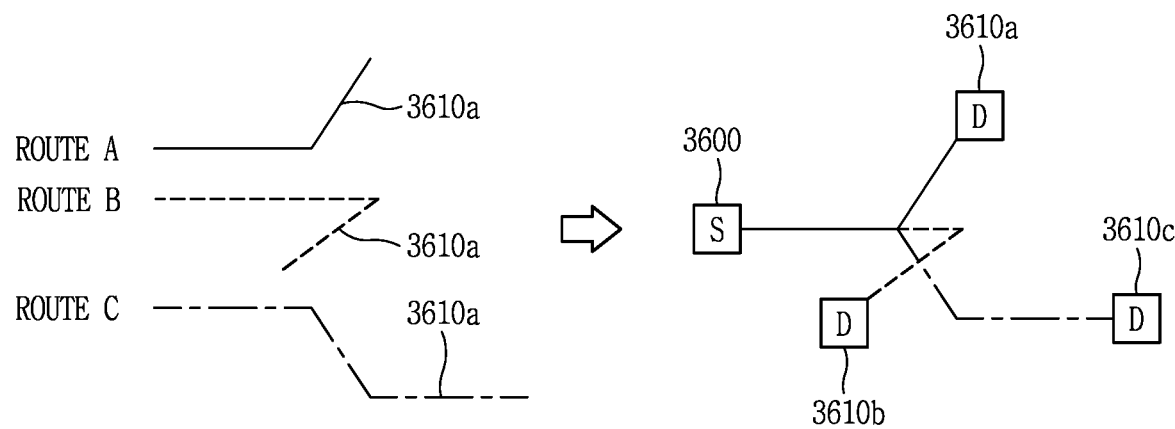

On the other hand, as illustrated in FIG. 36, a plurality of park-in drive information having the same starting point or a plurality of park-out drive information having the same starting point may be stored in the memory.

In this case, the processor 870 may display a plurality of park-in drive information (or a plurality of park-out drive information) 3610a, 3610b, 3610c in an overlapping manner on the display unit 830 based on one starting point (S) as illustrated in FIG. 36.

In this case, the ending points (D) of the plurality of park-in drive information (or the plurality of park-out drive information) 3610a, 3610b, 3610c may be different from each other.

When any one of the plurality of ending points (D) is selected, the processor 870 may allow the vehicle to perform autonomous parking-in or autonomous parking-out using the park-in drive information (or park-out drive information) including the selected ending point.

In addition, the processor 870 may select (automatically select) an ending point that satisfies a predetermined condition among the plurality of ending points (D) without a user's request, and allow the vehicle to perform autonomous parking-in (or autonomous parking-out) up to the selected ending point.

The ending point that satisfies a preset condition may be, for an example, an ending point having the largest number of histories of parking-in (parking-out), an ending point corresponding to an element designated by a driver (e.g., a space close to an entrance, a space next to a pillar, a space having a large parking space, a space having a sufficient opening and closing space, etc.), or the like.

Moreover, the processor 870 may automatically select an ending point at which there is no obstacle (for example, another vehicle) on an route to the relevant ending point (D) or an ending point at which there is no obstacle at the ending point among the plurality of park-in drive information (or the plurality of park-out drive information) 3610a, 3610b, 3610c, and allow the vehicle to perform autonomous parking-in or autonomous parking-out based on the park-in drive information (or park-out drive information) including the selected ending point.

According to an implementation of the present disclosure, there is one or more of the following effects.

First, the present disclosure may provide a new autonomous driving method configured to allow a vehicle to perform autonomous driving based on information related to driving trained through manual driving.

Second, the present disclosure may provide a vehicle control device configured to park a vehicle in or out through training, and a control method of the vehicle. Third, the present disclosure may provide a new user interface configured to train park-in drive information for parking a vehicle in and park-out drive information for parking the parked vehicle out in an optimized manner.

Fourth, the present disclosure may provide a new vehicle control device configured to control a vehicle in an optimized manner based on a user input received through a user interface during park-in/park-out training.

The effects of the present disclosure may not be limited to the above-mentioned effects, and other effects not mentioned herein may be clearly understood by those skilled in the art from the description of the claims.

The vehicle control device 800 described above may be included in the vehicle 100.

Furthermore, the operation or control method of the vehicle control device 800 described above will be analogically applied to the operation or control method of the vehicle 100 (or controller 170) in the same or similar manner.

For example, a control method of the vehicle 100 (or a control method of the vehicle control device 800) includes displaying screen information related to parking on the display unit based on the execution of a parking application, and controlling a vehicle in a preset manner, based on a function associated with a graphic object touched on the screen information.

A more specific implementation will be substituted by the earlier description, or will be analogically applied thereto in the same or similar manner.

Each of the above steps may be carried out not only by the vehicle control device 800 but also by the controller 170 provided in the vehicle 100.

Furthermore, all functions, configurations, or control methods carried out by the foregoing vehicle control device 800 may be carried out by the controller 170 provided in the vehicle 100. In other words, all the control methods described in this specification may be applied to a control method of a vehicle or a control method of a control device.

In addition, the foregoing vehicle control device 800 may be a mobile terminal. In this case, all functions, configurations, or control methods carried out by the vehicle control device 800 may be carried out by the controller of the mobile terminal. In addition, all the control methods described in this specification will be analogically applied to a control method of a mobile terminal in the same or similar manner.

Specifically, the mobile terminal may be formed in a wearable device shape (e.g., watch, glass, etc.) as well as a smart phone shape.

Further, the mobile terminal may be connected to perform communication with the vehicle control device through the communication unit.

The mobile terminal may transmit and receive all types of screen information, signals related to vehicle control, and user input signals described in herein through the communication unit.

In addition, the mobile terminal may receive all types of screen information described herein through the communication unit and display them on the display unit of the mobile terminal. Further, when a touch (or selection) is carried out through the display unit of the mobile terminal, the touched (selected) information may be transmitted to the vehicle control device. The vehicle may be controlled based on the touched information.

Further, when the gear of the vehicle is changed or the driving state of the vehicle is changed, the vehicle control device may transmit information related to the gear change of the vehicle or the driving state of the vehicle to the mobile terminal through the communication portion. In this case, screen information related to parking displayed on the mobile terminal may be changed by applying the contents described herein.

The foregoing present disclosure may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like. In addition, the computer may include a processor or controller. Accordingly, the detailed description thereof should not be construed as restrictive in all aspects but considered as illustrative. The scope of the disclosure should be determined by reasonable interpretation of the appended claims and all changes that come within the equivalent scope of the disclosure are included in the scope of the disclosure.

What is claimed is:

1. A method of assisted parking for a vehicle performed by a parking control device, the method comprising:
    initiating training of the vehicle for parking;
    in response to initiation of the training of the vehicle for parking, determining an initial position of the vehicle based on at least one of GPS information or surrounding environment information of the vehicle;
    generating, based on at least one input received through a vehicle manipulation device and at least one sensor value acquired through at least one sensor, traveling map information during driving of the vehicle for the training of the vehicle for parking, wherein the traveling map information comprises a traveling path of the vehicle from the initial position of the vehicle towards a destination position for parking;
    prior to reaching the destination position for parking, receiving a rollback request signal during the training of the vehicle for parking;
    transmitting, based on the rollback request signal and prior to reaching the destination position for parking, a rollback control signal that causes the vehicle to autonomously drive in a reverse direction along a portion of the traveling path from a rollback starting position of the vehicle to a rollback ending position of the vehicle, the rollback ending position of the vehicle being located on the traveling path between the initial position of the vehicle and the rollback starting position of the vehicle; and
    continuing the training of the vehicle for parking from the rollback ending position of the vehicle by resuming the traveling path of the vehicle from the rollback ending position of the vehicle.

2. The method of claim 1, wherein the rollback starting position corresponds to a location at which the rollback request signal was received.

3. The method of claim 1, wherein transmitting the rollback control signal comprises:
    transmitting the rollback control signal that causes the vehicle to autonomously drive to the rollback ending position,
    wherein the rollback ending position comprises a location that is designated by a user input.

4. The method of claim 3, wherein the user input designating the rollback ending position comprises at least one of (i) a termination of the rollback request signal, or (ii) a selection of a location corresponding to the rollback ending position.

5. The method of claim 1, wherein generating the traveling map information comprises storing the generated traveling map information in at least one memory device, and
    wherein the parking control device is further configured to, based on receiving the rollback request signal, terminate generating the traveling map information or terminate the storage of the traveling map information in the at least one memory device.

6. The method of claim 5, further comprising, based on the parking control device terminating the generating the traveling map information or terminating the storage of the traveling map information in the at least one memory device, loading data that was stored in the at least one memory device prior to the rollback request signal being received,
    wherein transmitting the rollback control signal comprises transmitting the rollback control signal calculated based on the data loaded from the at least one memory device.

7. The method of claim 3, further comprising generating a second control signal for deviating from the traveling path from the rollback starting position to the rollback ending position based on the vehicle having reversed direction a plurality of times along the traveling path or based on at least one obstacle being detected on the traveling path between the rollback starting position and the rollback ending position.

8. The method of claim 5, further comprising resuming generation of the traveling map information or resuming storage of the traveling map information in the at least one memory device based on a termination of rollback driving that corresponds to automatic driving of the vehicle in a reverse direction along the traveling path.

9. The method of claim 7, further comprising:
    receiving an input indicating a termination of generating the traveling map information; and generating, on a display unit and based on the generated traveling map information, display information for displaying at least one of (i) the initial position, (ii) a vehicle position at a time when generation of the traveling map information terminates, (iii) an image of an environment of the vehicle, (iv) a graphic object generated using the image of the environment of the vehicle, or (v) the traveling path.

10. The method of claim 1, wherein transmitting the rollback control signal further comprises generating the rollback control signal based on at least one of (i) speed information of the vehicle, which is detected through the at least one sensor, or (ii) information regarding at least one obstacle detected on the traveling path.

11. The method of claim 5, further comprising, based on the vehicle reaching the rollback ending position or a new input being received from the rollback ending position, deleting, from the at least one memory device, the portion of the traveling map information from the rollback starting position to the rollback ending position.

12. The method of claim 1, wherein generating the traveling map information comprises: based on an input value received through the vehicle manipulation device exceeding a predetermined value, generating a traveling path that mitigates the input value exceeding the predetermined value,
wherein the predetermined value depends on whether the vehicle is traveling or parking.

13. The method of claim 8, further comprising: as the vehicle resumes traveling at the rollback ending position, generating extended traveling map information, which comprises an extended traveling path that is extended from the traveling path from the initial position to the rollback ending position, based on the generated traveling map information and the sensor values.

14. At least one computer-readable storage medium encoded with at least one computer program comprising instructions that, when executed, operate to cause at least one processor of a parking control device provided in a vehicle to perform operations comprising:
initiating training of the vehicle for parking;
receiving, through at least one interface apparatus of the vehicle, traveling control data that indicates information regarding travelling of the vehicle from an initial position of the vehicle;
generating, based on the received traveling control data, traveling map information during driving of the vehicle for the training of the vehicle for parking, wherein the traveling map information comprises a traveling path of the vehicle from the initial position of the vehicle toward a destination position for parking;
prior to reaching the destination position for parking, receiving a rollback request signal during the training of the vehicle for parking;
transmitting, based on the rollback request signal and prior to reaching the destination position for parking, a rollback control signal that causes the vehicle to autonomously drive in a reverse direction along a portion of the traveling path from a rollback starting position of the vehicle to a rollback ending position of the vehicle, the rollback ending position of the vehicle being located on the traveling path between the initial position of the vehicle and the rollback starting position of the vehicle; and
continuing the training of the vehicle for parking from the rollback ending position of the vehicle by resuming the traveling path of the vehicle from the rollback ending position of the vehicle.

15. The at least one computer-readable storage medium of claim 14, wherein the traveling control data comprises (i) sensing data, which comprises GPS information and surrounding environment information of the vehicle, and (ii) an input related to the vehicle, which is input through a vehicle manipulation device.

16. The at least one computer-readable storage medium of claim 14, wherein transmitting the rollback control signal comprises:
transmitting the rollback control signal that causes the vehicle to autonomously drive to the rollback ending position,
wherein the rollback ending position comprises a location that is designated by a user input.

17. The at least one computer-readable storage medium of claim 14, wherein the operations further comprise:
storing the generated traveling map information in at least one memory device, and
based on receiving the rollback request signal, terminating the generation of the traveling map information or terminating the storage of the traveling map information in the at least one memory device.

18. The at least one computer-readable storage medium of claim 17, wherein the operations further comprise:
based on the parking control device terminating the generation of the traveling map information or terminating the storage of the traveling map information in the at least one memory device, loading data that was stored in the at least one memory device prior to the rollback request signal being received,
wherein transmitting the rollback control signal comprises transmitting the rollback control signal calculated based on the data loaded from the at least one memory device.

19. A device configured to provide assisted parking of a vehicle comprising an autonomous parking engine that is configured to:
initiate training of the vehicle for parking;
identify a traveling path for the vehicle based on processing at least one traveling data received during traveling of the vehicle; and
generate, based on an input being received prior to an end of the travelling of the vehicle, a rollback control signal that causes the vehicle to autonomously drive in a reverse direction along a portion of the traveling path from a rollback starting position of the vehicle to a rollback ending position of the vehicle, the rollback ending position of the vehicle being located on the traveling path between an initial position of the vehicle and the rollback starting position of the vehicle; and
continue the training of the vehicle for parking from the rollback ending position of the vehicle by resuming the traveling path of the vehicle from the rollback ending position of the vehicle,
wherein the autonomous parking engine is configured to acquire the at least one traveling data through at least one sensor comprising a camera and through a vehicle manipulation device comprising a steering unit and a brake unit.

20. The device of claim 19, wherein the autonomous parking engine is further configured to store the traveling path in at least one memory device, and terminates the storage of the traveling path in the at least one memory device based on receiving the input.

21. The device of claim 20, wherein the autonomous parking engine is further configured to:
based on terminating the storage of the traveling path in the at least one memory device, load data that was stored in the at least one memory device prior to the input being received; and
transmit the rollback control signal that was generated based on the data loaded from the at least one memory device.

22. The device of claim 20, wherein the autonomous parking engine is further configured to resume storage of the traveling path in the at least one memory device based on a termination of rollback driving that corresponds to automatic driving of the vehicle in a reverse direction along the traveling path.

* * * * *